United States Patent
Kimura et al.

(10) Patent No.: US 7,317,582 B2
(45) Date of Patent: Jan. 8, 2008

(54) ZOOM LENS, VIDEO ENLARGING/PROJECTING SYSTEM, VIDEO PROJECTOR, REAR PROJECTOR, AND MULTIVISION SYSTEM

(75) Inventors: Syunsuke Kimura, Nishinomiya (JP); Masayuki Takahashi, Kawanishi (JP); Yoshiharu Yamamoto, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 215 days.

(21) Appl. No.: 10/530,528

(22) PCT Filed: Oct. 15, 2003

(86) PCT No.: PCT/JP03/13167

§ 371 (c)(1),
(2), (4) Date: Apr. 7, 2005

(87) PCT Pub. No.: WO2004/040350

PCT Pub. Date: May 13, 2004

(65) Prior Publication Data
US 2006/0023320 A1    Feb. 2, 2006

(30) Foreign Application Priority Data
Oct. 15, 2002  (JP) ............................. 2002-301028
Oct. 15, 2002  (JP) ............................. 2002-301029
Oct. 15, 2002  (JP) ............................. 2002-301030

(51) Int. Cl.
G02B 15/14    (2006.01)
(52) U.S. Cl. ...................................... 359/689; 359/692

(58) Field of Classification Search ........ 359/676–679, 359/682, 683, 686, 689, 649; 396/72–82
See application file for complete search history.

(56) References Cited

U.S. PATENT DOCUMENTS

| | | | |
|---|---|---|---|
| 4,824,236 A | | 4/1989 | Ueda .......................... 359/690 |
| 5,835,285 A | * | 11/1998 | Matsuzawa et al. ........ 359/754 |
| 5,930,049 A | * | 7/1999 | Suenaga et al. ............ 359/650 |
| 6,028,715 A | | 2/2000 | Takamoto et al. .......... 359/688 |
| 2002/0024708 A1 | * | 2/2002 | Lewis et al. ................ 359/197 |

FOREIGN PATENT DOCUMENTS

| | | |
|---|---|---|
| JP | 62-237415 | 10/1987 |
| JP | 2-48623 | 2/1990 |
| JP | 7-325272 | 12/1995 |
| JP | 10-161027 | 6/1998 |
| JP | 11-109227 | 4/1999 |
| JP | 2001-215411 | 8/2001 |
| JP | 2002-131636 | 5/2002 |
| JP | 2002-131639 | 5/2002 |
| JP | 2002-296501 | 10/2002 |

* cited by examiner

*Primary Examiner*—M. Hasan
(74) *Attorney, Agent, or Firm*—Hamre, Schumann, Mueller & Larson, P.C.

(57) ABSTRACT

The present invention includes three or more lens groups. These are arranged in the order of a first lens group (11) that has positive refractive power and a second lens group (12) that has negative refractive power, as seen from the side having the longer conjugate distance, wherein a first lens (12a) of the lenses of the second lens group (12), as seen from the side having the longer conjugate distance, has positive refractive power. Thus, it is possible to suppress distortion aberration to a small value.

23 Claims, 37 Drawing Sheets

ZOOM LENS, VIDEO ENLARGING/PROJECTING SYSTEM, VIDEO PROJECTOR, REAR PROJECTOR, AND MULTIVISION SYSTEM

TECHNICAL FIELD

The present invention relates to zoom lenses, and particularly relates to zoom lenses used in devices such as projectors for enlarging and projecting images, which are converted by spatial optical modulating elements, onto a screen.

BACKGROUND ART

In projectors that use reflecting-type spatial modulating elements for the three primary colors red, green and blue, prisms for guiding the illuminating light and prisms for combining colors are disposed between the projecting lens and the spatial modulating elements. Because of this, the projecting lens requires a long back focus. Since spectral characteristics of prisms for combining colors are dependent on the incident angle, it is necessary to have an optical system in which the pupil on the shorter side conjugate distance is a sufficient distance from the spatial modulating elements, that is to say, it is necessary to have telecentricity.

For a forward convex group four-group zoom lens in which the long back focus and telecentricity do not vary with zoom, there is the zoom lens proposed in Patent Reference 1 below, for example. Furthermore, as a forward convex group three-group zoom lens, there is the zoom lens that is proposed in Patent Reference 2 below, for example. As a forward concave group four-group zoom lens, there is the zoom lens proposed in Patent Reference 3 below, for example.

Furthermore, as a telecentric wide angle lens, there is the wide angle lens proposed in Patent Reference 4 below.

There is also a demand for projectors in which the projection distance from the screen to the projector is short and that can be used in a small space, and there is also a demand for wide angle lenses that can be used over a short projection distance for projecting lenses.

Furthermore, in the case of wide angle lenses, the manner in which distortions are corrected is very important. Aspheric surfaces have a great ability to correct distortions, and can reduce the outside diameter of the lens and the number of constituent lenses. As a telecentric wide angle lens in which aspheric surfaces are used, there is the wide angle lens proposed in Patent Reference 5, for example.

Furthermore, methods are proposed for obtaining a bright image by combining the image from two projectors onto a screen, and for obtaining an image having a large aspect ratio by lining up two projected screens next to each other.

However, in such projection methods in which two projectors or two screens are used, it is necessary that the corresponding pixels are projected onto the same position by two projectors. If used under these conditions, distortions that were not conventionally a problem become a significant issue.

That is to say, the position of the corresponding pixels that are projected from the two projectors onto a screen shifts with distortions of conventional projection lenses, and there is a considerable loss of resolution. Thus, it is necessary that the distortion of the projecting lens is sufficiently small, however the zoom lens proposed in the above noted Patent Reference 1 has a large distortion value of about −2% at the wide angle end and about +0.3% at the telephoto end.

Furthermore, in addition to the distortions being sufficiently small, it is desirable to have a compact projecting lens that also has a long back focus. However in the zoom lens proposed in the above-noted Patent Reference 2, in addition to the fact that the back focus is insufficient, the distortion is as large at about −2% at the wide angle end and about −1% at the telephoto end and the overall length of the lens is about 11 times the focal length at the wide angle end, thus posing problems for miniaturization.

Furthermore, in the case of the zoom lens proposed in the above-noted Patent Reference 3, the distortion is as large at about −2.7% at the wide angle end and about −1.2% at the telephoto end, the F number is dim at about 3.5 and brightness cannot be ensured.

Next, in the case of the wide angle lens proposed in the above-noted Patent Reference 4, there is insufficient back focus for use as a projecting lens for a projector that uses reflecting-type spatial modulating elements.

Furthermore, in the case of the wide angle lens in which aspheric surfaces are used, proposed in the above-noted Patent Reference 5, there is insufficient correction of axial chromatic aberration and chromatic coma (a condition in which there is no coma aberration with respect to the standard wavelength, but there is downward coma aberration with a red color of 620 nm, and upward coma aberration with a blue color of 460 nm). This is because the aspheric surface has no ability to correct colors.

Accordingly, many wide angle lenses for projectors are used in a rear aspect, and these also may be combined with a backing mirror and used as a single unit. In this case, the lens is projected onto an approximately 178 cm diagonally dimensioned screen, and therefore the lens requires a capability at close distances.

However, the performance of wide angle lenses fluctuates greatly with projecting distance. In particular, as noted above, wide angle lenses for projectors require a long back focus, and the lenses are arranged in a sequence of concave to convex from the side with the longer conjugate distance. This is what is known as a reverse telephoto-type (retro focus-type). In this configuration, asymmetry of the lens arrangement with respect to the aperture stop increases, and change of performance with respect to the change of projection distance becomes larger. On the other hand, in the case of a wide angle lens that is symmetrical with respect to the aperture stop, even if the height of the light beams that pass through the lens changes, there is little change in the performance of the lens because the lens is operated so as to compensate for the aberration around the aperture stop.

That is to say, for a retro focus-type lens such as is described above, since the asymmetry of the lens arrangement with respect to the aperture stop is large, if there is a change in the height of the light beams that pass through the lens due to a change in the projection distance, then the aberrations are not cancelled out and there is a change in the performance.

Consequently, it is a significant problem to ensure the performance of wide angle lenses for projectors, with changes in projection distance when projecting onto screens having a size of 782 to 178 cm, for example.

[Patent Reference 1]
JP H10-161027A
[Patent Reference 2]
JP 2001-215411A
[Patent Reference 3]
JP 2002-131639A
[Patent Reference 4]
JP H11-109227A

[Patent Reference 5]
JP 2002-131636A

DISCLOSURE OF INVENTION

The present invention is to solve the above problem, and it is an object of the present invention to provide a compact zoom lens that has a long back focus, and that has little distortion, and little lateral chromatic aberration in order to realize a bright, high definition projector. It is a further object of the present invention to provide a wide angle lens that has a long back focus, that has little distortion, little chromatic aberration, and whose performance changes little with respect to changes in the projection distance in order to realize a bright, high definition projector.

In order to achieve these objectives, a first zoom lens according to an aspect of the present invention comprises at least three lens groups that are arranged in an order of a first lens group that has positive refractive power, and a second lens group that has negative refractive power, as seen from the side having the longer conjugate distance, wherein the first lens of the lenses of the second lens group as seen from the side having the longer conjugate distance has positive refractive power.

A second zoom lens according to an aspect of the present invention comprises a front lens that is a negative lens, as seen from the side having the longer conjugate distance, wherein the following relationships are satisfied:

$$-0.018 < (1/f1/abe1)/(1/frear) < 0$$

$$1.7 < nd11 < 1.79$$

where f1 is the focal length of the negative lens, where abe1 is the Abbe number and where nd11 is the refractive index at the d line, and where frear is the focal length of the lens group on the side having the shorter conjugate distance, with respect to an aperture stop.

A third zoom lens according to an aspect of the present invention comprises four lenses, as seen from the side having the shorter conjugate distance, wherein in the order from the side having the longer conjugate distance, a negative meniscus lens whose convex surface faces the side having the longer conjugate distance, a positive lens, a negative meniscus lens whose convex surface faces the side having the shorter conjugate distance and a positive lens, and wherein the following relationships are satisfied:

$$nd4 > 1.75$$

$$vd4 > 40$$

$$1 < f4r/bfw < 4$$

where nd4 is the refractive index at the d line of the negative meniscus lens that is on the side having the longer conjugate distance, where vd4 is the Abbe number, where f4r is the focal length of the four lenses and where bfw is the air equivalent back focus that does not include a prism and a cover glass when at the wide angle end.

A fourth zoom lens according to an aspect of the present invention comprises a first lens group that has positive refractive power, a second lens group that has a negative refractive index and a third lens group that has a positive refractive index, arranged in that order from the side having the longer conjugate distance, wherein when changing magnification from the wide angle end to the telephoto end, the first lens group, the second lens group and the third lens group move along the optical axis, wherein the first lens group moves monotonically toward the side having the longer conjugate distance, the second lens group moves monotonically toward the side having the shorter conjugate distance and the third lens group moves monotonically toward the side having the longer conjugate distance, and wherein the following relationship is satisfied:

$$1.6 < bfw/fw < 2.4$$

where bfw is the air equivalent back focus of the zoom lens at the wide angle end when at infinity and where fw is the focal length of the zoom lens at the wide angle end.

A fifth zoom lens according to an aspect of the present invention comprises a first lens group that has positive refractive power, a second lens group that has a negative refractive index and a third lens group that has a positive refractive index, arranged in that order from the side having the longer conjugate distance, wherein when changing magnification from the wide angle end to the telephoto end, the first lens group, the second lens group and the third lens group move along the optical axis, wherein the first lens group moves monotonically toward the side having the longer conjugate distance, the second lens group moves monotonically toward the side having the shorter conjugate distance and the third lens group moves monotonically toward the side having the longer conjugate distance, and wherein the following relationship is satisfied:

$$1 < bfw/fw < 1.8$$

where bfw is the air equivalent back focus of the zoom lens at the wide angle end when at infinity and where fw is the focal length of the zoom lens at the wide angle end.

A sixth zoom lens according to an aspect of the present invention comprises a first lens group that has positive refractive power, a second lens group that has a negative refractive index and a third lens group that has a positive refractive index, arranged in that order from the side having the longer conjugate distance, wherein when changing magnification from the wide angle end to the telephoto end, the first lens group, the second lens group and the third lens group move along the optical axis wherein the first lens group moves monotonically toward the side having the longer conjugate distance, the second lens group moves monotonically toward the side having the shorter conjugate distance and the third lens group moves monotonically toward the side having the longer conjugate distance, and wherein the following relationship is satisfied:

$$0.5 < bfw/fw < 1.3$$

where bfw is the air equivalent back focus of the zoom lens at the wide angle end when at infinity and where fw is the focal length of the zoom lens at the wide angle end.

A seventh zoom lens according to an aspect of the present invention comprises a first lens group that has positive refractive power, a second lens group that has a negative refractive index and a third lens group that has a positive refractive index, arranged in that order from the side having the longer conjugate distance, wherein when changing magnification from the wide angle end to the telephoto end, the first lens group, the second lens group and the third lens group move along the optical axis, wherein the first lens group moves monotonically toward the side having the longer conjugate distance, the second lens group moves monotonically toward the side having the shorter conjugate distance and the third lens group moves monotonically toward the side having the longer conjugate distance and an aperture stop moves in conjunction with the third lens group, and wherein the following relationship is satisfied:

$$|(DG1 - DG3)/fw| < 0.15$$

where DG1 is the amount that the first lens group moves from the wide angle end to the telephoto end, where DG3 is the amount that the third lens group moves from the wide angle end to the telephoto end and where fw is the focal length of the zoom lens at the wide angle end.

An eighth zoom lens according to an aspect of the present invention comprises a first lens group that has positive refractive power, a second lens group that has a negative refractive index and a third lens group that has a positive refractive index, arranged in that order from the side having the longer conjugate distance, wherein when changing magnification from the wide angle end to the telephoto end, the first lens group is fixed, and the second lens group and the third lens group move along the optical axis, wherein the second lens group moves monotonically toward the side having the shorter conjugate distance and the third lens group moves monotonically toward the side having the longer conjugate distance and an aperture stop moves in conjunction with the third lens group, and wherein the following relationship is satisfied:

$$|DG3/fw|<0.15$$

where DG3 is the amount that the third lens group moves from the wide angle end to the telephoto end and where fw is the focal length of the zoom lens at the wide angle end.

A ninth zoom lens according to an aspect of the present invention comprises a first lens group that has negative refractive power, a second lens group that has positive refractive index, a third lens group that has positive refractive index and a fourth lens group that has positive refractive index, arranged in that order from the side having the longer conjugate distance, wherein when changing magnification from the wide angle end to the telephoto end, the first lens group, the second lens group, the third lens group and the fourth lens group move along the optical axis, wherein the first lens group moves monotonically toward the side having the longer conjugate distance, and the second lens group, the third lens group and the fourth lens group move monotonically toward the side having the longer conjugate distance, wherein an aperture stop is positioned within the second lens group and moves along the optical axis with the second lens group when the magnification changes, and wherein the following relationship is satisfied:

$$2.5<bfw/fw<4$$

where bfw is the air equivalent back focus of the zoom lens at the wide angle end when at infinity and where fw is the focal length of the zoom lens at the wide angle end.

A tenth zoom lens according to an aspect of the present invention satisfies the relationships:

$$-0.018<(1/f1/abe1)/(1/frear)<0$$

$$1.7<nd11<1.79$$

where f1 is the focal length of the first negative lens as seen from the side having the longer conjugate distance, where abe1 is the Abbe number and where nd11 is the refractive index at the d line, and where frear is the synthetic focal length from the second lens group to the fourth lens group at the wide angle end.

An eleventh zoom lens according to an aspect of the present invention comprises, as seen from the side having the shorter conjugate distance, four lenses, wherein in the order from the side having the longer conjugate distance, a negative meniscus lens whose convex surface faces the side having the longer conjugate distance, a positive lens, a negative meniscus lens whose convex surface faces the side having the shorter conjugate distance and a positive lens, and the zoom lens satisfies the relationships:

$$nd4>1.75$$

$$vd4>40$$

$$1<f4r/bfw<4$$

where nd4 is the refractive index at the d line of the negative meniscus lens that is on the side having the longer conjugate distance, where vd4 is the Abbe number, where f4r is the focal length of the four lenses and where bfw is the air equivalent back focus that does not include a prism and a cover glass when at the wide angle end.

A first wide angle lens according to an aspect of the present invention comprises, in the order from the side having the longer conjugate distance, a first lens group having negative refractive power, a second lens group, and a third lens group having positive refractive power, wherein the refractive power of the second lens group is weaker than the refractive power of the first lens group and the third lens group, wherein when the magnification is changed from near to far, the first lens group, the second lens group and the third lens group move along the optical axis, wherein when the magnification is changed from near to far, the air space between the first lens group and the second lens group reduces, the air space between the second lens group and the third lens group increases, wherein an aperture stop is positioned between the second lens group and the third lens group, and wherein the following relationship is satisfied:

$$4<bf/f<6$$

where bf is the air equivalent back focus when the wide angle lens is at infinity and where f is the focal length of the wide angle lens.

A second wide angle lens according to an aspect of the present invention, comprises at least three lens groups, wherein, as seen from the side having the longer conjugate distance, the front lens is a negative lens and wherein the following relationships are satisfied:

$$-0.025<(1/f1/abe1)/(1/f3g)<-0.008$$

$$1.7<nd11<1.79$$

where f1 is the focal length of the negative lens, where abe1 is the Abbe number and where nd11 is the refractive index at the d line, and where f3g is the focal length of the third lens group.

A third wide angle lens according to an aspect of the present invention comprises, as seen from the side having the shorter conjugate distance, four lenses, wherein in the order from the side having the longer conjugate distance, a negative meniscus lens whose convex surface faces the side having the longer conjugate distance, a positive lens, a negative meniscus lens whose convex surface faces the side having the shorter conjugate distance and a positive lens, and wherein the following relationships are satisfied:

$$nd4>1.75$$

$$vd4>35$$

$$1<f4r/bf<1.5$$

where nd4 is the refractive index at the d line of the negative meniscus lens that is on the side having the longer conjugate distance, where vd4 is the Abbe number, where f4r is the focal length of the four lenses and where bf is the air equivalent back focus that does not include a prism and a cover glass.

A video enlarging/projecting system according to an aspect of the present invention comprises a projecting lens in which the above-noted zoom lens or wide angle lens is used, a light source, and a spatial optical modulating element that is illuminated by the light irradiated from the light source, and that forms an optical image, wherein the projecting lens projects the optical image that is formed on the spatial optical modulating element.

A video projector according to an aspect of the present invention comprises a projecting lens in which the above-noted zoom lens or wide angle lens is used, a light source, means for temporally restricting light from the light source to three colors of blue, green and red, and a spatial optical modulating element that is illuminated by the light irradiated from the light source, and that forms an optical image that corresponds to three colors of blue, green and red that temporally change.

A rear projector according to an aspect of the present invention comprises the above noted video projector, a mirror that bends light that is projected from a projecting lens, and a transmissive-type screen for reflecting an image of projected light.

A multivision system according to an aspect of the present invention comprises a plurality of systems that comprise the above noted video projector, a transmissive-type screen for reflecting an image of projected light, and a casing, and further comprises an image separating circuit for separating images.

BEST MODE FOR CARRYING OUT THE INVENTION

Figure 1:
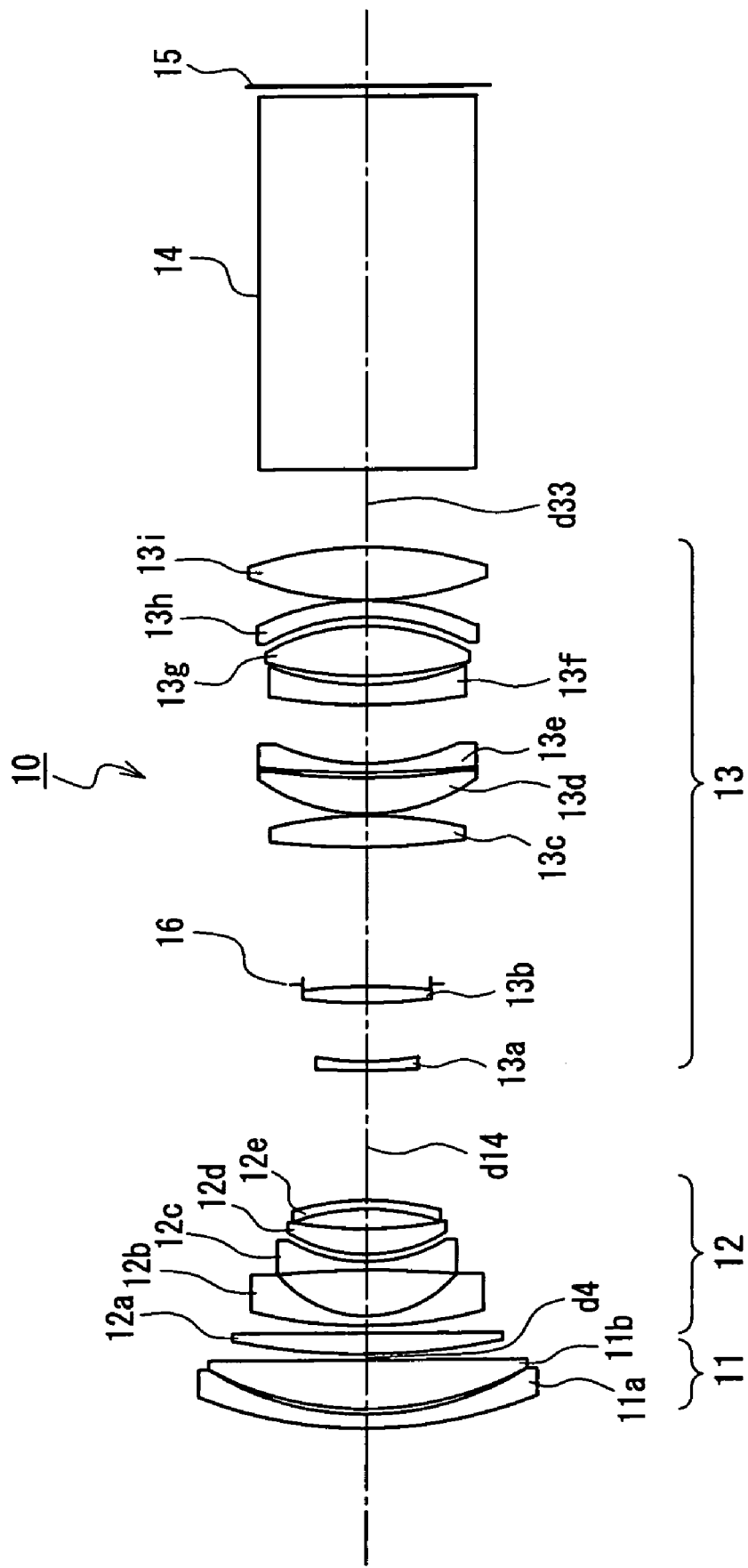
FIG. 1 is a view of the configuration of the wide angle end of a zoom lens according to Embodiment 1 of the present invention.

With the first zoom lens of the present invention, the zoom lens has a lens that has positive refractive power on the side having the longer conjugate distance of a second lens group that has negative refractive power, and thus it is possible to suppress distortion aberration to a small value.

With the second zoom lens of the present invention, it is possible to reduce lateral chromatic aberration to a small value. frear is the focal length of the lens group on the side having the shorter conjugate distance, with respect to the aperture stop, and it represents the amount of over-correction of blue lateral chromatic aberration of the lens group on the side having the shorter conjugate distance, with respect to the aperture stop. f1/abe1 represents the amount of blue lateral chromatic aberration that is generated. It is possible to cancel out the over-correction of the blue lateral chromatic aberration that is generated by the lens group on the side having the shorter conjugate distance, with respect to the aperture stop, with the amount of blue lateral chromatic aberration that is generated by the front lens, as seen from the side having the longer conjugate distance, and to suppress lateral chromatic aberration to a small value. nd11 is the refractive index at the d line, of the front lens, as seen from the side having the longer conjugate distance, and the amount of blue lateral chromatic aberration that is generated increases with increasing refractive index. However, since the blue internal transmittance worsens with increasing refractive index, the brightness of blue becomes darker.

With the third zoom lens according to the present invention it is possible to suppress distortion aberration and lateral chromatic aberration to small values. There is significant generation of distortion aberration and lateral chromatic aberration in lenses on the side having the shorter conjugate distance, and the refractive power and shape of the lenses are important in the correction of this aberration. The configuration of the four lenses, as seen from the side having the longer conjugate distance, includes, from the side having the longer conjugate distance, a negative meniscus lens whose convex surface faces the side having the longer conjugate distance, and is such that it has great ability to correct distortion aberration and lateral chromatic aberration. nd4 and vd4 are the refractive index and Abbe number of the negative meniscus lens, and they represent conditions for suppressing over-correction of blue lateral chromatic aberration. f4r/bfw represents the ratio of the focal length of the four lenses from the side having the shorter conjugate distance to the air equivalent back focus that does not include prisms or the cover glass at the wide angle end, and relates to correction of distortion aberration and lateral chromatic aberration, the overall length of the lens, and the outer diameter of the lens on the side having the longer conjugate distance.

With the fourth to sixth zoom lenses of the present invention, it is possible to realize a high definition zoom lens while obtaining a long back focus at a wide angle.

With the seventh to eighth zoom lens of the present invention, it is possible to provide a compact zoom lens, and whose lens outside diameter is small.

With the ninth zoom lens of the present invention, the first lens group has negative power, and since the pupil on the side having the longer conjugate distance is moved toward the side having the longer conjugate distance, it is possible to make the outside diameter of the first lens group small. Furthermore, since the second to fourth lens groups have favorable aberration correction across the entire region when changing magnification from the wide angle end to the telephoto end, each are moved to the side having the longer conjugate distance. The aperture stop is within the second lens group, and this prevents fluctuations in the position of the pupil on the side having the shorter conjugate distance. With this configuration, it is possible to realize a compact zoom lens while realizing a long back focus.

With the tenth zoom lens of the present invention, it is possible to suppress lateral chromatic aberration to a small value. frear is the combined focal length of the lens groups from the second lens group to the fourth lens group when at the wide angle end, and represents the amount of over-correction of blue lateral chromatic aberration of the lens groups from the second lens group to the fourth lens group. f1/abe1 represents the amount of blue lateral chromatic aberration that is generated by the front negative lens, as seen from the side having the longer conjugate distance. By satisfying the above-noted relationship, it is possible to cancel out the over-correction of blue lateral chromatic aberration that occurs in the lens groups from the second lens group to the fourth lens group with the amount of blue lateral chromatic aberration that is generated by the front negative lens, as seen from the side having the longer conjugate distance, and to suppress lateral chromatic aberration to a small value. nd11 is the refractive index at the d line of the front negative lens, as seen from the side having the longer conjugate distance, and the amount of blue lateral chromatic aberration that is generated increases with increasing refractive index. However, since the blue internal transmittance worsens with increasing refractive index, the brightness of blue becomes darker. Thus, it is possible to achieve a balance between the amount of lateral chromatic aberration that is generated and the internal transmittance by the above-noted relationship.

With the eleventh zoom lens of the present invention, it is possible to suppress distortion aberration and lateral chromatic aberration to small values. There is significant generation of distortion aberration and lateral chromatic aberration in lenses on the side having the shorter conjugate distance, and refractive power and shape of the lenses are important in the correction of this aberration. Thus, two of the four lenses that are on the side having the shorter conjugate distance are negative meniscus lenses that have a great ability to correct distortion aberration and lateral chromatic aberration. nd4 and vd4 are the refractive index and Abbe number of the negative meniscus lens and they represent conditions for suppressing over-correction of blue lateral chromatic aberration. f4r/bfw represents the ratio of the focal length of the four lenses from the side having the shorter conjugate distance to the air equivalent back focus that does not include prisms or the cover glass at the wide angle end, and relates to correction of distortion aberration and lateral chromatic aberration, the overall length of the lens, and the outer diameter of the lens on the side having the longer conjugate distance.

With the first wide angle lens of the present invention, it is possible to realize a wide angle lens whose performance changes little with changes in the projection distance, while realizing a long back focus. With the second wide angle lens of the present invention, it is possible to provide lateral chromatic aberration that is small. With the third wide angle lens of the present invention, it is possible to suppress distortion aberration and lateral chromatic aberration to small values.

With the video projecting/enlarging system of the present invention, it is possible to project an image that has little distortion.

With the video projector of the present invention, since the lateral chromatic aberration is favorably corrected, it is possible to project images in three colors of blue, green and red onto a screen without color offset, and to obtain a high definition image.

With the rear projector of the present invention, it is possible to realize a set in which a high definition screen may be obtained.

With the multivision system of the present invention, since distortions are corrected favorably, the joints between the video projectors correspond favorably, and it is possible to obtain a high definition screen.

In the first zoom lens, it is preferable that the refractive power of the lenses of the second lens group is, as seen from the side having the longer conjugate distance, positive, negative, negative, positive, negative. It is also preferable that the refractive power of the lenses of the second lens group is, as seen from the side having the longer conjugate distance, positive, negative, negative, negative, positive, negative.

It is possible to suppress distortion aberration and lateral chromatic aberration to small values, and to provide favorable balance with other aberrations by arranging the refractive power in a similar manner to the above noted second lens group. It is usual that the second group having negative refractive power is constituted by lenses having, from the side having the longer conjugate distance, negative, negative and positive refractive power. Attaching a lens having positive refractive power to the side having the longer conjugate distance means increasing the refractive power of the negative lens, and it is possible to realize a zoom lens that has little distortion aberration and lateral chromatic aberration by attaching a lens having negative refractive power to the side having the shorter conjugate distance in order to ensure favorable performance.

Furthermore, it is preferable to satisfy the relationship:

$$-0.6 < f2g/f2top < -0.15$$

where f2top is the focal length of a first lens as seen from the side having the longer conjugate distance of the lenses of the second lens group and where f2g is the focal length of the second lens group. With this configuration, it is possible to suppress distortion aberration and lateral chromatic aberration to small values and to provide favorable balance with other aberrations.

Furthermore, it is preferable to satisfy the relationship:

$$0.25 < frear/f2top < 0.95$$

where f2top is the focal length of a first lens as seen from the side having the longer conjugate distance of the lenses of the second lens group, and where frear is the focal length of the lens group on the side having the shorter conjugate distance, with respect to an aperture stop. With this configuration, it is possible to suppress distortion aberration and lateral chromatic aberration to small values, and to provide favorable balance with other aberrations. frear is the focal length of the lens group on the side having the shorter conjugate distance, with respect to an aperture stop, and represents the amount of distortion aberration of the lens group on the side having the shorter conjugate distance, with respect to the aperture stop. f2top represents the amount of distortion aberration that is generated by the second lens group. It is possible to suppress the amount of distortion aberration to a small value by balancing the two.

In the fourth zoom lens, it is preferable to satisfy the relationships:

$$0.05 < fw/f1g < 0.2$$

$$-0.9 < fw/f2g < -0.6$$

$$0.5 < fw/f3g < 0.7$$

where f1g is the focal length of the first lens group, where f2g is the focal length of the second lens group, where f3g is the focal length of the third lens group, and where fw is the focal length of the zoom lens at the wide angle end. With this configuration, it is possible to realize a high definition zoom lens while suppressing the overall lens length and the outside diameter of the lens.

In the fifth zoom lens, it is preferable to satisfy the relationships:

$$0.3 < fw/f1g < 0.4$$

$$-1.6 < fw/f2g < -1.3$$

$$0.7 < fw/f3g < 0.9$$

where f1g is the focal length of the first lens group, where f2g is the focal length of the second lens group, where f3g is the focal length of the third lens group, and where fw is the focal length of the zoom lens at the wide angle end. With this configuration, it is possible to realize a high definition zoom lens while suppressing the overall lens length and the outside diameter of the lens.

In the sixth zoom lens, it is preferable to satisfy the relationships:

$$0.45 < fw/f1g < 0.6$$

$$-2.0 < fw/f2g < -1.6$$

$$0.9 < fw/f3g < 1.3$$

where f1g is the focal length of the first lens group, where f2g is the focal length of the second lens group, where f3g is the focal length of the third lens group, and where fw is the focal length of the zoom lens at the wide angle end. With this configuration, it is possible to realize a high definition zoom lens while suppressing the overall lens length and the outside diameter of the lens.

In the fourth to sixth zoom lens, it is preferable that the Abbe number of all lenses having positive refractive power that are arranged on the side having the shorter conjugate distance with respect to an aperture stop is at least 80. With this configuration, it is possible to realize a zoom lens that has little lateral chromatic aberration.

Furthermore, it is preferable that the Abbe number of all lenses having negative refractive power that are arranged on the side having the shorter conjugate distance with respect to an aperture stop is at least 35.

With this configuration, it is possible to realize a zoom lens that has little lateral chromatic aberration.

In the first zoom lens to the seventh zoom lens, it is preferable that the zoom lens is a projecting lens for a projector.

Furthermore, it is preferable that the magnification ratio of the entire lens system is used in a range of −0.00058 times to −0.0188 times.

Furthermore, it is preferable that the F number is 2.5 or 2.4.

Furthermore, it is preferable that the zoom ratio is 1.5, 1.6 or 1.65.

Furthermore, it is preferable that the zoom lens does not have a joined surface.

In the ninth zoom lens, it is preferable that the second lens group is constituted by at least three lenses, and that the first lens, as seen from the side having the longer conjugate distance, has negative refractive power, and that the second lens has positive refractive power. With this configuration, it is possible to achieve a long back focus and it is possible to have favorable balance with other aberrations.

Furthermore, it is preferable that when changing magnification from the wide angle end to the telephoto end, that the second lens group and the fourth lens group move in the same way along the optical axis from the side having the shorter conjugate distance to the side having the longer conjugate distance. With this configuration, it is possible to suppress changes in telecentricity over the entire magnification region from the wide angle end to the telephoto end and also to correct coma aberration favorably corrected, and it is possible to simplify the structure of the lens barrel that holds the lens groups and to provide a zoom lens that has high optical performance at low cost.

It is preferable that the following relationships are satisfied:

$$-0.45 < fw/f1g < -0.3$$

$$0.01 < fw/f2g < 0.3$$

$$0.18 < fw/f3g < 0.29$$

$$0.05 < fw/f4g < 0.2$$

where the focal length of the first lens group is f1g, where the focal length of the second lens group is f2g, where the focal length of the third lens group is f3g, where the focal length of the fourth lens group is f4g and where the focal length of the above-noted zoom lens at the wide angle end is fw. With this configuration, it is possible to provide a zoom lens that has a long back focus while being compact, to suppress distortion aberration and lateral chromatic aberration to small values and to provide favorable balance with other aberrations.

In the ninth to the eleventh zoom lens, it is preferable that the Abbe number of all lenses having positive refractive power that constitute the third lens group and the fourth lens group is at least 80. With this configuration, it is possible to realize a zoom lens having small lateral aberration.

Furthermore, it is preferable that the zoom lens is a projecting lens for a projector.

Furthermore, it is preferable that the magnification ratio of the entire lens system is used in a range of -0.00058 times to -0.0188 times.

Furthermore, it is preferable that the F number is 2.5.

Furthermore, it is preferable that the zoom ratio is 1.3.

Furthermore, it is preferable that the zoom lens does not have a joined surface.

In the first wide angle lens, it is preferable that when changing magnification from near to far, the first lens group and the third lens group move in the same way along the optical axis. With this configuration, it is possible to simplify the construction of the lens barrel, and to lower the cost.

Furthermore, it is preferable to satisfy the following relationships:

$$-0.4 < f/f1g < -0.15$$

$$-0.2 < f/f2g < 0.05$$

$$0.15 < f/f3g < 0.25$$

where f1g is the focal length of the first lens group, where f2g is the focal length of the second lens group, where f3g is the focal length of the third lens group, and where f is the focal length of the wide angle lens. With this configuration, it is possible to realize a wide angle lens that is compact, and in which distortion aberration and chromatic aberration are favorably corrected.

In the first to the third wide angle lens of the present invention, it is preferable that all the lenses having positive refractive power that constitute the third lens group have a refractive index at the d line of 1.65 or less. With this configuration, the Petzval Sum can be suppressed to a small value, and it is possible to suppress curvature of the field and astigmatic aberration to small values.

Furthermore, it is preferable that the zoom lens is a projecting lens for a projector.

Furthermore, it is preferable that the magnification ratio of the entire lens system is used in a range of -0.00058 times to -0.0188 times.

Furthermore, it is preferable that the F number is 2.5.

Furthermore, it is preferable that the zoom lens does not have a joined surface.

Embodiments of the present invention are described below with reference to the drawings.

EMBODIMENT 1

Figure 2:
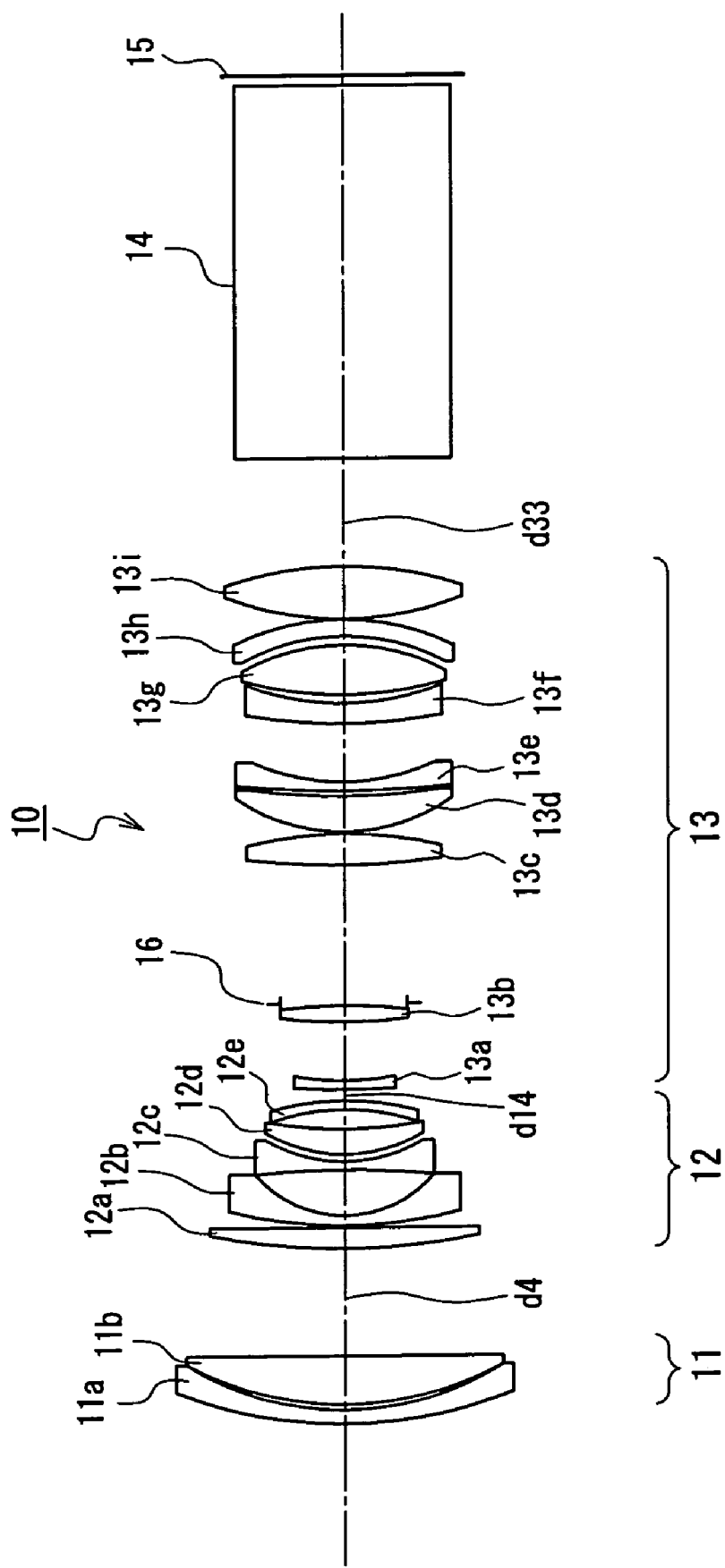
FIG. 2 is a view of the configuration of the telephoto end of the zoom lens according to Embodiment 1 of the present invention.

FIG. 1 shows a view of a configuration of the wide angle end of a zoom lens according to Embodiment 1 of the present invention. FIG. 2 shows a view of a configuration of the telephoto end of the zoom lens shown in FIG. 1. A zoom lens 10 shown in FIG. 1 is provided with a first lens group 11 that has positive refractive power, a second lens group 12 that has negative refractive power, and a third lens group 13 that has positive refractive power, in the order as seen from the side with the longer conjugate distance. Numeral 14 denotes a glass block such as a prism. Numeral 15 denotes an image surface, and in the case of an image-taking system denotes film or CCDs, and in the case of a projection device, it denotes LCDs, for example, which are spatial modulating elements. In the figure, the side with the longer conjugate distance is the side that is opposite the image surface 15.

When changing magnification from the wide angle end (FIG. 1) to the telephoto end (FIG. 2), the first lens group 11 and the third lens group 13 move to the side having the longer conjugate distance, and the second lens group 12 moves to the side having the shorter conjugate distance.

The first lens group 11, which has positive refractive power, is configured by two lenses, a negative lens 11a and a positive lens 11b from the side having the longer conjugate distance. A glass material that has a high refractive index and a small Abbe number is used for the negative lens 11a. Since lateral chromatic aberration on the blue side rapidly increases when lateral chromatic aberration is reduced, blue side lateral chromatic aberration is reduced by using a glass material with a small Abbe number.

The second lens group 12 having negative refractive power is a variable magnification lens group. The second lens group 12 is configured by five lenses, a positive lens 12a, a negative lens 12b, a negative lens 12c a positive lens 12d and a negative lens 12e, from the side having the longer conjugate distance. The positive lens 12a on the side having the longer conjugate distance generates positive distortion on the wide angle end side. In particular, it generates higher order distortions. Since the overall lens system has a negative distortion at the wide angle end, the positive distortion of the positive lens 12a corrects the negative distortion of the entire lens system and reduces the distortion at the wide angle end. The positive lens 12a uses a glass material that has a high refractive index, and a large Abbe number. Accordingly, this reduces blue side lateral chromatic aberration. Distortion aberration is generated at the same time as lateral chromatic aberration and thus lateral chromatic aberration is reduced by using glass material that has a large Abbe number.

The third lens group 13 having positive refractive power is a variable magnification lens group. An aperture stop 16 is positioned within the third lens group 13, and moves with the third lens group 13 when changing magnification, thus suppressing fluctuations in telecentricity when changing magnification.

The present embodiment realizes a projecting lens that has low distortion through a zoom configuration that is constituted by three groups, wherein the first lens group 11 having positive refractive power is at the front when viewed from the side having the longer conjugate distance, and wherein when viewed from the side having the longer conjugate distance, the first lens 12a of the second lens group 12, which has negative refractive power, is provided with positive refractive power. This is described more specifically below.

Distortion of the zoom lens is determined by the refractive power of the lens groups, and the distance of each lens group from the aperture stop. Thus, although the refractive power of the lens groups does not change due to movement of the lens groups when changing magnification, since the distance between the lens groups and the aperture stop does change, fluctuations in distortion occur. In this case, distortions may be reduced by providing the lenses with a shape that is advantageous with respect to distortion, such as one that is concentric with respect to the aperture stop, however coma aberration and astigmatic aberration increase, and a zoom lens having favorable capabilities may not be obtained.

A zoom lens in which a lens group having positive refractive power is provided at the front when viewed from the side having the longer conjugate distance is a favorable configuration in that the zoom magnification ratio is easily increased giving a bright lens with a low F number. For example, a four-group zoom lens that contains lens groups whose refractive power is positive, negative, positive, positive, when viewed from the side having the longer conjugate distance, and in which the second lens group and the third lens group, when viewed from the side having the longer conjugate distance, move along the optical axis when changing the magnification from the wide angle end to the telephoto end, has a fourth lens group that is fixed at the conjugate point on the side that has the shorter conjugate distance. Thus, light bundles that pass through the fourth lens group are constant without changing aberrations generated by the fourth lens group due to changes in magnification, and it is possible to realize high optical performance. Furthermore, since the position of the principal light ray that passes through the fourth lens group also does not change, if used in a projector, then the pupil of the illumination system and the pupil of the projector coincide, and it is possible to realize a projector that is bright up to the periphery of the image.

Furthermore, for a reverse telephoto-type lens, what is known as a retro focus-type lens, that has lens groups that have negative and positive refractive power when viewed from the side having the longer conjugate distance, significant distortions occur because of the large asymmetry in the refractive power of the lens groups on either side of the aperture stop, however the pupil is advanced because the first lens group has negative refractive power, and since the principal light beam that passes through the first lens group does so at a position close to the optical axis, the amount of distortion aberration generated at the first lens group is small. In this configuration, the distortion of the overall lens system is suppressed by attaching a positive lens to the side of the negative first lens group that has the longer conjugate distance to generate higher order distortion aberration.

Thus, the capacity of such a retro focus-type two-group zoom lens to correct distortion is high, and such lenses often are used as wide angle zoom lenses. Furthermore, the back focus also may be lengthened. However, it is difficult to lower the F number, the F number changes when the magnification is altered with zoom, and it is difficult to obtain a large zoom ratio. Moreover, the back focus changes with magnification ratio of the zoom, and the position of the pupil on the side having the shorter conjugate distance also moves from the conjugate point of the side having the shorter conjugate distance.

By arranging the first lens group 11 that has positive refractive power at the front, when viewed from the side having the longer conjugate distance, the F number of the zoom lens 10 shown in FIG. 1 may be reduced and a large zoom ratio is ensured in the same way as with the above-noted 4-group zoom lens. Furthermore, for the second lens group 12, since the positive lens 12a is attached to the side having the longer conjugate distance, it is possible to obtain a similar effect to that of a positive lens attached to the front of the negative lens group of a retro focus-type lens, such as is noted above, and it is possible to suppress distortion aberrations to a small value.

That is to say, by arranging the first lens group 11, having positive refractive power, at the front, when viewed from the side having the longer conjugate distance, and by attaching the positive lens 12a on the side of the second lens group 12 that has the longer conjugate distance, the F number of the zoom lens according to the present embodiment can be reduced, a large zoom ratio may be ensured, and it is possible to suppress distortion aberration to a small value.

Furthermore, the change in the magnification ratio of the second lens group 12 with zoom is large, and having a second lens group 12 whose aberration is independently small is a necessary condition for demonstrating high optical performance over the entire zoom range. The second lens group 12 of the zoom lens 10 shown in FIG. 1 is constituted by lenses having positive, negative, negative, positive and negative refractive power, as viewed from the side having the longer conjugate distance, and thus the aberration of the second lens group 12 can be corrected down to a small value, and high optical performance may be demonstrated across the entire zoom range.

A configuration of the zoom lens according to the present invention that is favorable in terms of optical performance is described below. It is preferable that the following Expression (1) is satisfied:

$$-0.6 < f2g/f2\text{top} < -0.15 \qquad (1)$$

where f2top is the focal length of the lens 12a, which is the first lens 12a of the second lens group 12 from the side having the longer conjugate distance and where the focal length of the second lens group 12 is f2g.

Expression (1) is an expression that prescribes the refractive power of the first lens 12a from the side having the longer conjugate distance of the second lens group 12 with respect to the overall refractive power of the second lens group 12. By satisfying expression (1), it is possible to suppress distortion aberration and lateral chromatic aberration to small values, and to achieve an excellent balance with other aberrations.

If the lower limit of Expression (1) is not met, then the refractive power of the first lens 12a of the second lens group 12 increases, the aberration of the second lens group 12 increases, and changes in optical performance with zoom also increase. If the upper limit is exceeded, then the refractive power of the first lens 12a of the second lens group 12 becomes small, the distortion correcting effect decreases, and fluctuations in distortion aberration with zoom increase.

Next, it is preferable to satisfy the following Expression (2):

$$0.25 < frear/f2top < 0.95 \tag{2}$$

where f2top is the focal length of the lens 12a, which is the first lens of the second lens group 12 from the side having the longer conjugate distance, and frear is the focal length of the lens group on the side having the shorter conjugate distance with respect to the aperture stop 16 (rear side) (lens 13c to lens 13i).

Expression (2) is an expression that prescribes the refractive power of the first lens 12a from the side having the longer conjugate distance of the second lens group 12, with respect to the refractive power of the lens group that is on the side having the shorter conjugate distance with respect to the aperture stop 16.

The size of the refractive power of the lens group on the rear side of the aperture stop 16 is related to the amount of distortion aberration that is generated. The lens that cancels out the distortion aberration that is generated in the lens group on the rear side of the aperture stop 16 is the first positive lens 12a on the side having the longer conjugate distance of the second lens group 12. It is necessary to achieve a balance of the refractive power of both members, and Expression (2) represents that balance. It is possible to suppress the distortion aberration and the lateral chromatic aberration to a small value and to achieve an excellent balance with other aberrations by satisfying Expression (2).

If the lower limit of Expression (2) is not met, then the refractive power of the first lens 12a of the second lens group 12 decreases, then the distortion becomes increasingly negative, and fluctuations of the distortion with zoom also become large. If the upper limit of Expression (2) is exceeded, then the refractive power of the first lens 12a increases, the aberration of the second lens group 12 increases, and changes in optical performance with zoom become large.

Next, it is preferable to satisfy the following Expression (3) and Expression (4):

$$-0.018 < (1/f1/abe1)/(1/frear) < 0 \tag{3}$$

$$1.7 < nd11 < 1.79 \tag{4}$$

where f1 is the focal length of the front negative lens 11a of the front lens group (first lens group 11) as seen from the side having the longer conjugate distance, where abe1 is the Abbe number, where nd11 is the refractive index of the d line, and where frear is the focal length of the lens group on the side having the shorter conjugate distance with respect to the aperture stop 16 (rear side) (lens 13c to lens 13i).

When the chromatic aberration of the lens group on the side having the shorter conjugate distance with respect to the aperture stop 16 is corrected, blue lateral chromatic aberration is over corrected. The lens that cancels out the over-corrected blue lateral chromatic aberration is the front negative lens 11a, as seen from the side having the longer conjugate distance, of the front lens group 11.

Expression (3) is an expression that represents the relationship between the amount of blue lateral chromatic aberration generated by the front negative lens 11a of the front lens group 11 as seen from the side having the longer conjugate distance, and the amount of over correction of blue lateral chromatic aberration in the lens group that is on the side having the shorter conjugate distance with respect to the aperture stop 16 If the lower limit of Expression (3) is not met, then correction of blue lateral chromatic aberration is insufficient and correction of red lateral chromatic aberration is also insufficient. If the upper limit is exceeded, then blue lateral chromatic aberration increases due to over correction.

Furthermore, it is preferable that the negative lens 11a that is at the front as seen from the side having the longer conjugate distance has a high refractive index and a small Abbe number. However, the glass material as noted above is characterized in that the internal transmittance deteriorates. Expression (4) is an expression that prescribes the refractive index of the negative lens at the front of the lens group that is at the front as seen from the side having the longer conjugate distance. When the lower limit is not met, the over-correction of blue lateral chromatic aberration cannot be decreased, and when the upper limit is exceeded, the internal transmittance decreases and the color balance worsens.

Next, four lenses (lenses 13f, 13g, 13h and 13i) from the side having the shorter conjugate distance are constituted, in order from the side having the longer conjugate distance, by a negative meniscus lens 13f whose convex surface faces the side having the longer conjugate distance, a positive lens 13g, a negative meniscus lens 13h whose convex surface faces the side having the shorter conjugate distance and a positive lens 13i. It is preferable to satisfy Expression (5) to Expression (7) below:

$$nd4 > 1.75 \tag{5}$$

$$vd4 > 40 \tag{6}$$

$$1 < f4r/bfw < 4$$

where nd4 is the refractive index of the d line of the negative meniscus lens 13f on the side having the longer conjugate distance, where vd4 is the Abbe number, where f4r is the focal length of the four lenses (lens 13f, 13g, 13h and 13i) from the side having the shorter conjugate distance and where bfw is the air equivalent back focus at the wide angle end that does not include prisms or the cover glass.

Since the convex surfaces of the negative meniscus lenses 13f and 13h face different directions, they may be advantageously applied to reduce lateral chromatic aberration and distortion aberration. The negative meniscus lens 13f whose convex surface faces the end having the longer conjugate distance is used effectively to correct distortion aberration, and the negative meniscus lens 13h whose convex surface faces the side having the shorter conjugate distance is used effectively to correct lateral chromatic aberration.

Expression (5) represents the refractive index, at the d line, of the negative meniscus lens 13f that is on the side that has the longer conjugate distance, and when the lower limit is not met, the curvature of the field increases. Expression (6) represents the Abbe number of the negative meniscus lens 13f that is on the side having the longer conjugate distance, and when the lower limit is not met, the lateral chromatic aberration increases.

Expression (7) indicates that the focal length of the four lenses, from the end having the shorter conjugate distance is larger than the air equivalent back focus that does not include the prism or the cover glass at the wide angle end. That is to say, it shows the use of the lens in a manner in which when an F number light beam is incident on the four lenses from the side having the shorter conjugate distance the light converges toward the side having the shorter conjugate distance. When the lower limit is not met, the external diameter of the lens on the side having the longer conjugate distance increases, and distortion aberration and lateral chromatic aberration increase. When the upper limit is exceeded, the overall length of the lens increases, and it may be impossible to ensure the back focus.

Next, when the magnification changes from wide angle to telephoto, the first lens group 11, the second lens group 12 and the third lens group 13 move along the optical axis. The first lens group 11 moves monotonically toward the side having the longer conjugate distance, the second lens group 12 moves monotonically toward the side having the shorter conjugate distance and the third lens group 13 moves monotonically toward the side having the longer conjugate distance. It is preferable to satisfy Expression (8) below, and the relationship of Expression (8a) also may be satisfied:

$$0.5 < bfw/fw < 2.4 \tag{8}$$

$$1.6 < bfw/fw < 2.4 \tag{8a}$$

where bfw is the air equivalent back focus when the zoom lens 10 at the wide angle end at infinity, and where fw is the focal length of the zoom lens 10 at the wide angle end.

Expression (8) prescribes the back focus. If the projecting lens of a projector is not met, and in particular if reflective-type spatial modulation elements are used, then a long back focus is necessary. When the lower limit is not met, the arrangement of prisms that are inserted between the lens and the spatial modulating elements becomes complex, and configuration of the system may not be possible. It is not preferable to exceed the upper limit because the overall length of the lens and the outer diameter become large.

Next, it is preferable to satisfy the following Expressions (9) to (11), and Expressions (9a) to (11a) may also be satisfied:

$$0.05 < fw/f1g < 0.6 \tag{9}$$

$$-2 < fw/f2g < -0.6 \tag{10}$$

$$0.5 < fw/f3g < 1.3 \tag{11}$$

$$0.05 < fw/f1g < 0.2 \tag{9a}$$

$$-0.9 < fw/f2g < -0.6 \tag{10a}$$

$$0.5 < fw/f3g < 0.7 \tag{11a}$$

where f1g is the focal length of the first lens group 11, where f2g is the focal length of the second lens group 12, where f3g is the focal length of the third lens group 13 and where fw is the focal length of the zoom lens 10 at the wide angle end.

Expression (9) prescribes the focal length of the first lens group 11. When the lower limit is not met, the amount of magnification change with zoom is reduced. When the upper limit is exceeded, it is not possible to ensure the back focus. Expression (10) is an expression that prescribes the focal length of the second lens group 12. When the lower limit is not met, fluctuations of the coma aberration at the wide angle end and the telephoto end become large. When the upper limit is exceeded, in addition to not being able to ensure the back focus, the amount that the second lens group moves increases, and the size of the lens becomes large.

Expression (11) prescribes the focal length of the third lens group 13. When the lower limit is not met, it is not possible to ensure the telecentricity, and the overall length of the lens increases. When the upper limit is exceeded, it is not possible to ensure the telecentricity, and the outside diameter of the lens increases.

Next, it is preferable that all the lenses that have positive refractive power that are positioned on the side that has the shorter conjugation distance with respect to the aperture stop 16 (lenses 13c, 13d, 13g and 13i) are configured with an Abbe number of at least 80. The total refractive power of the lens group on the side that has the shorter conjugate distance with respect to the aperture stop 16 is positive, the principal light beam is significantly bent in order to ensure telecentricity, and there is significant chromatic aberration. Lateral chromatic aberration is particularly large. If all the lenses having positive refractive power that are positioned on the side of the aperture stop 16 that has the shorter conjugate distance are constituted with an Abbe number of at least 80, then it is possible to reduce lateral chromatic aberration to a small value.

Next, it is preferable that all the lenses that have negative refractive power that are positioned on the side of the aperture stop 16 that has the shorter conjugation distance (lenses 13e, 13f and 13h) are configured with an Abbe number of at least 35. The total refractive power of the lens group on the side of the aperture stop 16 that has the shorter conjugate distance is positive, the principal light beam is significantly bent in order to ensure telecentricity, and there is significant chromatic aberration. Lateral chromatic aberration particularly increases. It is possible to reduce lateral chromatic aberration to a small value by configuring all the lenses having negative refractive power that are positioned on the side of the aperture stop 16 that has the shorter conjugate distance, with material having an Abbe number of at least 35.

Next, when the magnification changes from wide angle to telephoto, the first lens group 11, the second lens group 12 and the third lens group 13 move along the optical axis. The first lens group 11 moves monotonically toward the side having the longer conjugate distance, the second lens group 12 moves monotonically toward the side having the shorter conjugate distance, the third lens group 13 moves monotonically toward the side having the longer conjugate distance and the aperture stop 16 moves with the third lens group 13. It is preferable to satisfy the following Expression (12):

$$|(DG1-DG3)/fw| < 0.15 \tag{12}$$

where DG1 is the amount that the first lens group 11 moves from the wide angle end to the telephoto end, where DG3 is the amount that the third lens group 13 moves from the wide angle end to the telephoto end, and where fw is the focal length of the zoom lens 10 at the wide angle end.

Expression (12) is an expression that prescribes the difference in the amount of movement of the first lens group 11 and the third lens group 13, and when this range is exceeded, the outer diameter of the lenses become larger.

WORKING EXAMPLE 1

Working Example 1 according to Embodiment 1 is described below. The lens configuration of Working Example 1 is the same as the configuration in FIG. 1 and FIG. 2, and is a design example in which $F_{NO}=2.5$ at the wide angle end, focal length f=37.08 and a half angle of view is 24.2°. The values of the above noted Expressions (1) to (12) in Working Example 1 are as follows:

| | |
|---|---|
| f2g/f2top=−0.22 | Expression (1) |
| frear/f2top=0.33 | Expression (2) |
| (1/f1abe1)/(1/frear)=−0.01 | Expression (3) |
| nd11=1.78472 | Expression (4) |
| nd4=1.7725 | Expression (5) |
| vd4=49.62 | Expression (6) |
| f4r/bfw=1.08 | Expression (7) |
| bfw/fw=2.07 | Expression (8) |
| fw/f1g=0.16 | Expression (9) |
| fw/f2g=−0.78 | Expression (10) |
| fw/f3g=0.59 | Expression (11) |
| |(DG1−DG3)/fw|=0.11 | Expression (12) |

Next, specific figures are shown in Table 1, and zoom data is shown in Table 2. In Table 1, ri (mm) is the radius of curvature of the lens surface, di (mm) is the lens thickness or the interval between lenses, ni is the refractive index of the lens at the d line, and vi is the Abbe number of the lens at the d line. This is the same in Tables 3, 5 and 7 below. In the example of Table 1, r1 to r4 is the first lens group, r5 to r14 is the second lens group, r15 to r33 is the third lens group, and r19 is the aperture stop.

TABLE 1

| ri | di | Nd | vd |
|---|---|---|---|
| r1 = 106.344 | d1 = 3.4 | n1 = 1.78472 | v1 = 25.72 |
| r2 = 72.165 | d2 = 0.8 | | |
| r3 = 76.842 | d3 = 11.3 | n2 = 1.62299 | v2 = 58.12 |
| r4 = 1533.061 | d4 = Variable | | |
| r5 = 160.815 | d5 = 4.8 | n3 = 1.77250 | v3 = 49.62 |
| r6 = 2545.794 | d6 = 0.8 | | |
| r7 = 114.985 | d7 = 2.5 | n4 = 1.49700 | v4 = 81.61 |
| r8 = 26.964 | d8 = 10.8 | | |
| r9 = −197.147 | d9 = 2.1 | n5 = 1.49700 | v5 = 81.61 |
| r10 = 35.249 | d10 = 1.6 | | |
| r11 = 34.148 | d11 = 6.2 | n6 = 1.74950 | v6 = 35.04 |
| r12 = 83.884 | d12 = 5.8 | | |
| r13 = −40.964 | d13 = 2.0 | n7 = 1.80420 | v7 = 46.50 |
| r14 = −66.146 | d14 = Variable | | |
| r15 = 195.658 | d15 = 2.0 | n8 = 1.88300 | v8 = 40.80 |
| r16 = 54.286 | d16 = 14.2 | | |
| r17 = 115.173 | d17 = 4.0 | n9 = 1.59270 | v9 = 35.45 |
| r18 = −132.468 | d18 = 0.0 | | |
| r19 = 0.000 | d19 = 33.7 | | |
| r20 = 192.792 | d20 = 7.5 | n10 = 1.49700 | v10 = 81.61 |
| r21 = −91.057 | d21 = 0.6 | | |
| r22 = 44.779 | d22 = 8.9 | n11 = 1.49700 | v11 = 81.61 |
| r23 = 189.368 | d23 = 0.4 | | |
| r24 = 225.543 | d24 = 2.6 | n12 = 1.80420 | v12 = 46.50 |
| r25 = 50.710 | d25 = 14.2 | | |
| r26 = 179.268 | d26 = 4.7 | n13 = 1.77250 | v13 = 49.62 |
| r27 = 59.193 | d27 = 1.9 | | |
| r28 = 83.147 | d28 = 12.0 | n14 = 1.45650 | v14 = 90.27 |
| r29 = −51.009 | d29 = 2.5 | | |
| r30 = −45.165 | d30 = 3.5 | n15 = 1.83400 | v15 = 37.34 |
| r31 = −63.789 | d31 = 0.3 | | |

TABLE 1-continued

| ri | di | Nd | vd |
|---|---|---|---|
| r32 = 77.189 | d32 = 12.2 | n16 = 1.45650 | v16 = 90.27 |
| r33 = −90.597 | d33 = Variable | | |
| r34 = 0.000 | d34 = 88.0 | n17 = 1.51680 | v17 = 64.20 |

TABLE 2

| | Wide angle end | Telephoto end |
|---|---|---|
| d4 | 2.0 | 25.97 |
| d14 | 30.0 | 2.0 |
| d33 | 19.38 | 28.0 |

Figure 3:
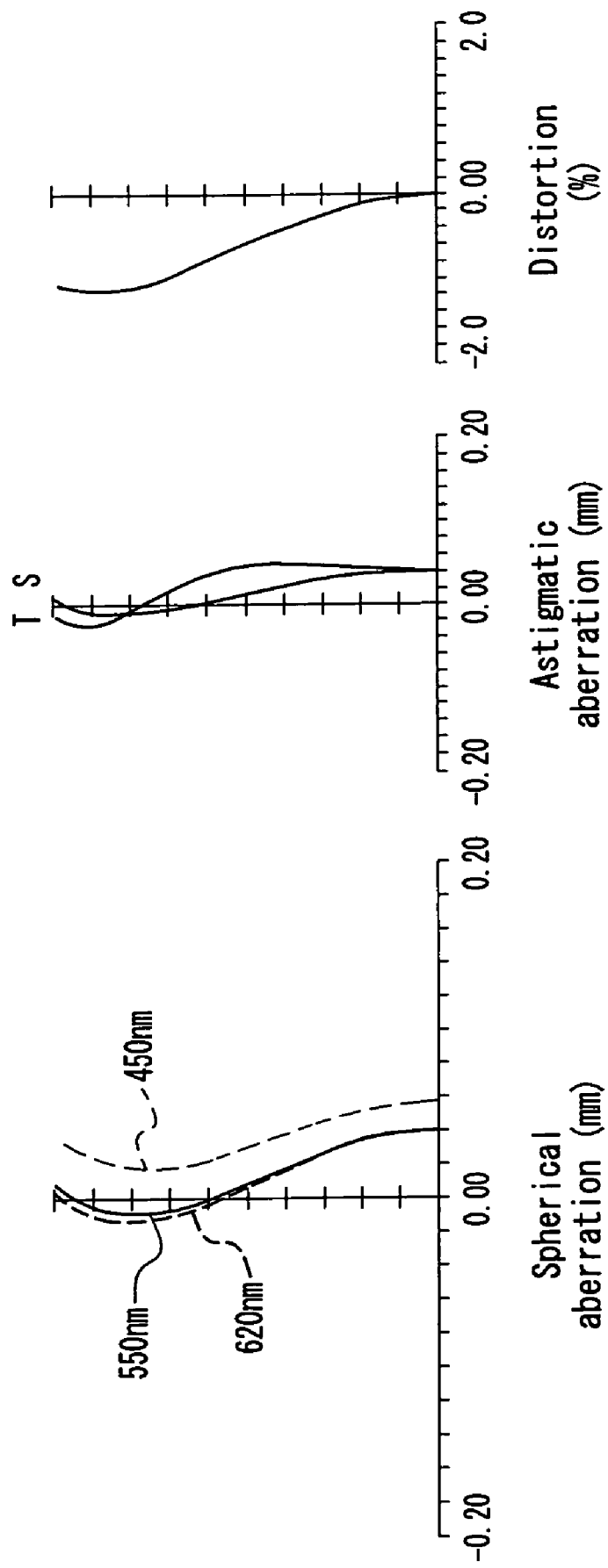
FIG. 3 shows aberration charts for the wide angle end according to Working Example 1 of the present invention.
Figure 4:
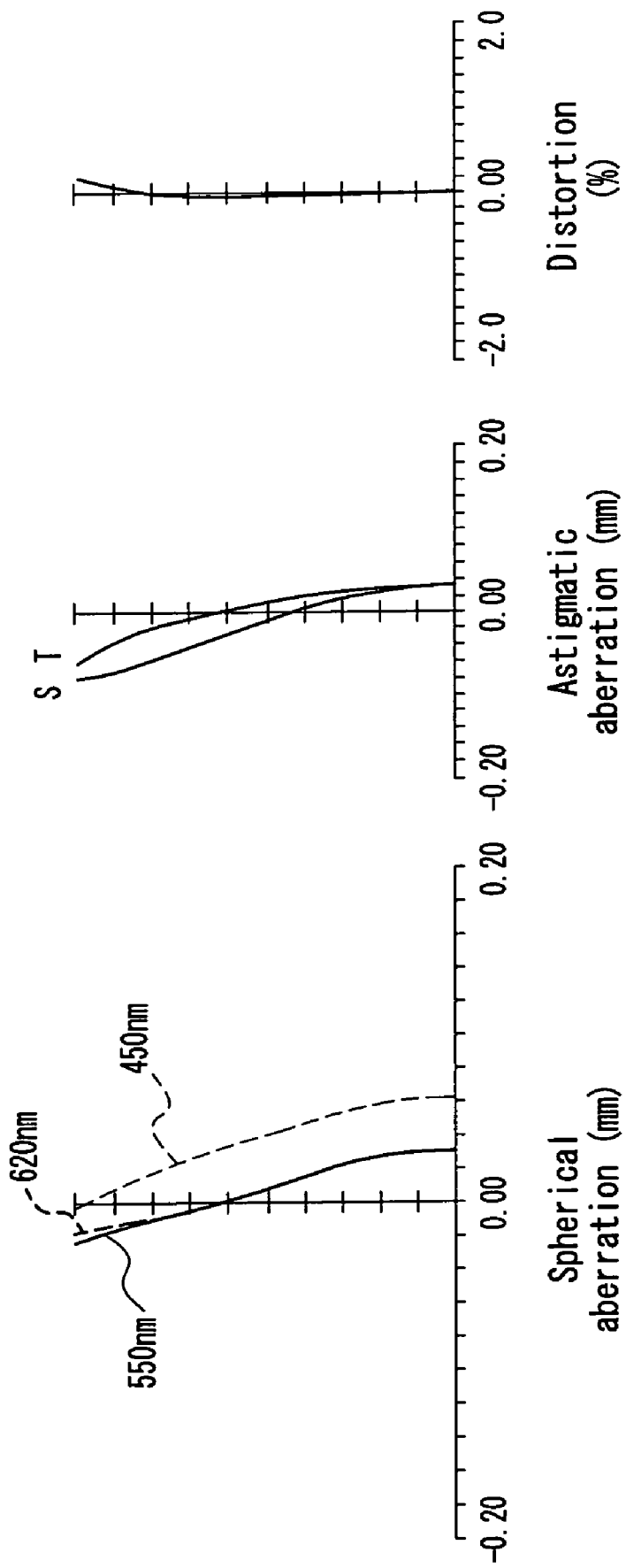
FIG. 4 shows aberration charts for the telephoto end according to Working Example 1 of the present invention.

The charts in FIG. 3 show the spherical aberration (mm), astigmatic aberration (mm) and distortion aberration (%) at the wide angle end in Working Example 1, and these are the same as in FIG. 7, FIG. 11 and FIG. 15 below. The charts in FIG. 4 show the spherical aberration (mm), astigmatic aberration (mm) and distortion aberration (%) at the telephoto end of Working Example 1, and these are the same as in FIG. 8, FIG. 12 and FIG. 16 below. As can be seen in FIG. 3 and FIG. 4, the zoom lens according to Working Example 1 shows favorable performance with respect to aberration.

EMBODIMENT 2

Figure 5:
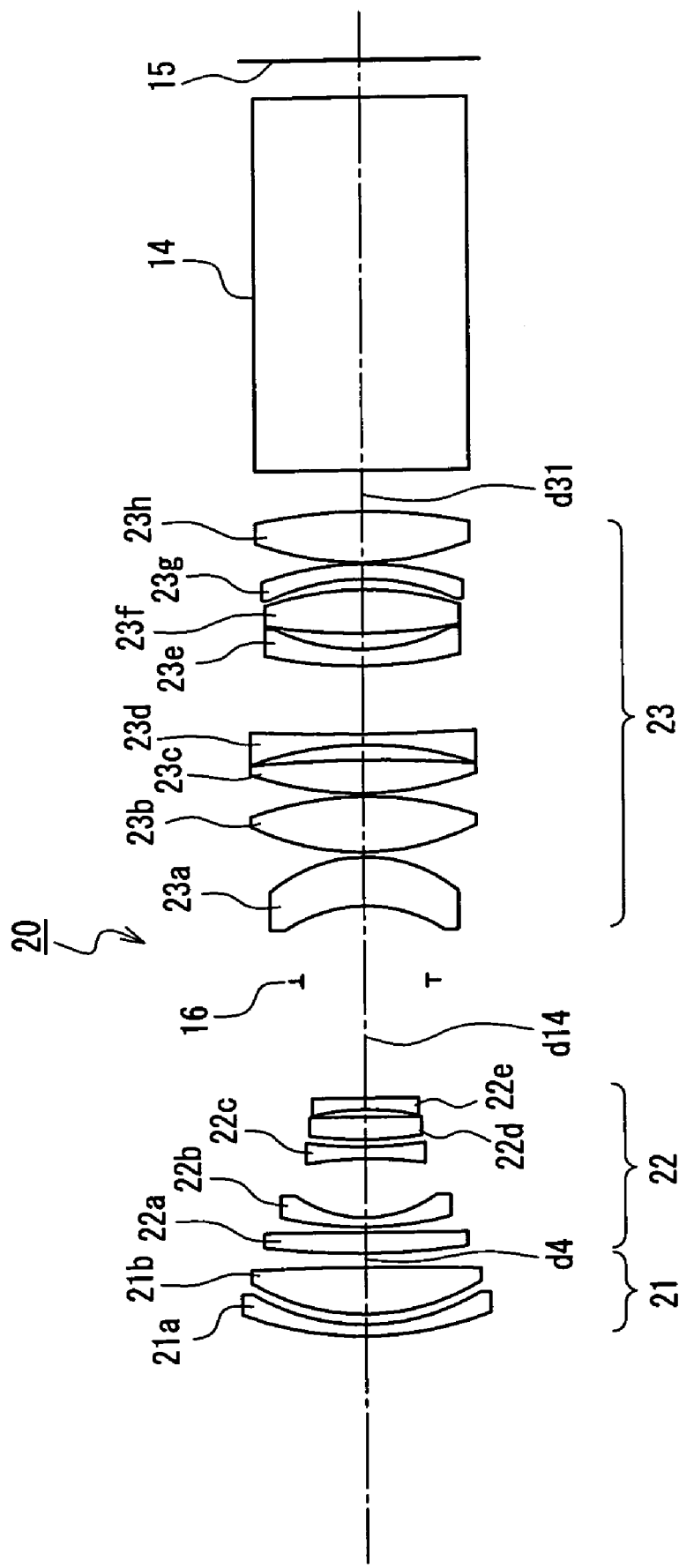
FIG. 5 is a view of the configuration of the wide angle end of a zoom lens according to Embodiment 2 of the present invention.
Figure 6:
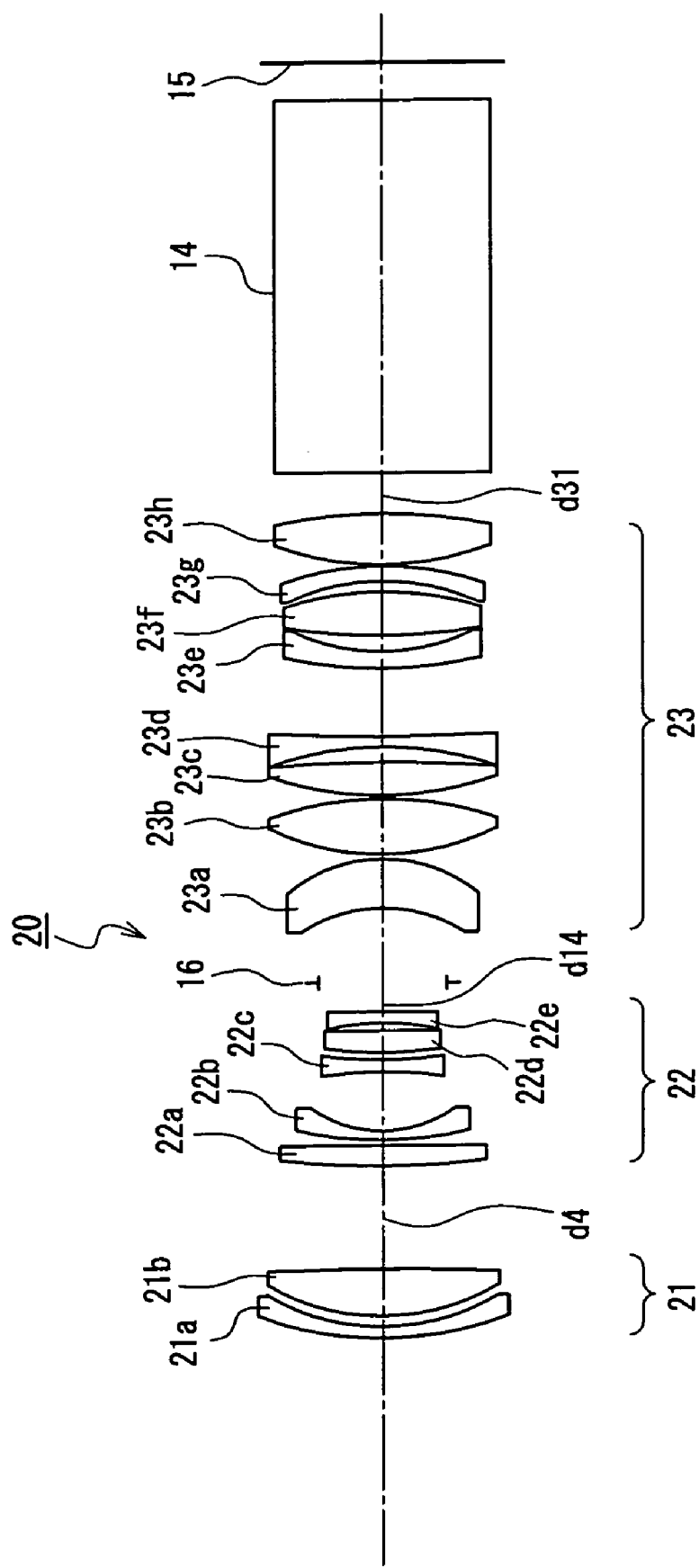
FIG. 6 is a view of the configuration of the telephoto end of the zoom lens according to Embodiment 2 of the present invention.

FIG. 5 shows a view of a configuration of the wide angle end of a zoom lens according to Embodiment 2 of the present invention. FIG. 6 shows a view of a configuration of the telephoto end of the zoom lens shown in FIG. 5. A zoom lens 20 shown in FIG. 5 is provided with a first lens group 21 that has positive refractive power, a second lens group 22 that has negative refractive power, and a third lens group 23 that has positive refractive power, in the order as seen from the side with the longer conjugate distance. The glass block 14, the image surface 15 and the aperture stop 16 are configured in the same way as in FIG. 1 and are provided with the same symbols, so their description is hereby omitted. In this drawing also, the side having the longer conjugate distance is the side opposite the image surface 15.

When changing magnification from the wide angle end (FIG. 5) to the telephoto end (FIG. 6), the first lens group 21 and the third lens group 23 move to the side having the longer conjugate distance, and the second lens group 22 moves to the side having the shorter conjugate distance.

The first lens group 21, which has positive refractive power, is configured by two lenses, a negative lens 21a and a positive lens 21b from the side having the longer conjugate distance. The negative lens uses a glass material that has a high refractive index and a small Abbe number. Since the blue side lateral chromatic aberration rapidly increases when the lateral chromatic aberration is reduced, the lateral chromatic aberration on the blue side is reduced by using a glass material with a small Abbe number.

The second lens group 22, which has negative refractive power, is a variable magnification lens group. The second lens group 22 is constituted by five lenses, a positive lens 22a, a negative lens 22b, a negative lens 22c a positive lens 22d and a negative lens 22e from the side having the longer conjugate distance. The positive lens 22a on the side having the longer conjugate distance generates positive distortion on the wide angle end side. In particular, this generates higher order distortions. Since the overall lens system is negatively distorted at the wide angle end, the positive distortion of the positive lens 22a corrects the overall negative distortion of the optical system and reduces the distortion at the wide angle end. The positive lens 22a uses a glass material that has a high refractive index, and a large Abbe number. Accordingly, this reduces blue side chromatic aberration. Distortion aberration is generated at the same time as the lateral chromatic aberration, and thus lateral chromatic aberration is reduced by using glass material that has a large Abbe number.

The third lens group 23 (lens 23a to lens 23h), which has positive refractive power, is a variable magnification lens group. An aperture stop 16 is positioned within the third lens group 23, and moves with the third lens group 23 when changing magnification, thus suppressing fluctuations in telecentricity when changing magnification.

Also the present embodiment preferably satisfies the above-noted expressions. It is also preferable to substitute Expression (8) and satisfy Expression (8b) below:

$$1 < bfw/fw < 1.8. \qquad (8b)$$

As a substitute for the above noted Expressions (9) to (11), it is preferable to satisfy Expressions (9b) to (11b), and to satisfy the above-noted Expression (12)

$$0.3 < fw/f1g < 0.4 \qquad (9b)$$

$$-1.6 < fw/f2g < -1.3 \qquad (10b)$$

$$0.7 < fw/f3g < 0.9. \qquad (11b)$$

WORKING EXAMPLE 2

Working Example 2 according to Embodiment 2 is described below. The lens configuration of Working Example 2 is the same as the configuration in FIG. 5 and FIG. 6, and is a design example in which $F_{NO}$=2.4 at the wide angle end, focal length f=55.83 and a half angle of view is 16.7°. The values of the above noted Expressions (1) to (7), (8b) to (11b) and (12) in Working Example 2 are as follows:

| | |
|---|---|
| f2g/f2top=−0.15 | Expression (1) |
| frear/f2top=0.276 | Expression (2) |
| (1/f1/abe1)/(1/frear)=−0.0144 | Expression (3) |
| nd11=1.78472 | Expression (4) |
| nd4=1.7725 | Expression (5) |
| vd4=49.62 | Expression (6) |
| f4r/bfw=1.67 | Expression (7) |
| bfw/fw=1.39 | Expression (8b) |
| fw/f1g=0.394 | Expression (9b) |
| fw/f2g=−1.5 | Expression (10b) |
| fw/f3g=0.82 | Expression (11b) |
| $|(DG1-DG3)/fw|=7.5\times10^{-5}$ | Expression (12) |

Next, specific figures are shown in Table 3, and zoom data is shown in Table 4. In Table 3, r1 to r4 is the first lens group, r5 to r14 is the second lens group, r15 to r31 is the third lens group, and r15 is the aperture stop.

TABLE 3

| ri | di | Nd | vd |
|---|---|---|---|
| r1 = 85.995 | d1 = 2.9 | n1 = 1.78472 | v1 = 25.72 |
| r2 = 53.333 | d2 = 2.6 | | |
| r3 = 55.903 | d3 = 10.7 | n2 = 1.69680 | v2 = 55.46 |
| r4 = 24386.946 | d4 = Variable | | |
| r5 = 201.376 | d5 = 5.2 | n3 = 1.77250 | v3 = 49.62 |
| r6 = −4186.792 | d6 = 1.0 | | |
| r7 = 95.797 | d7 = 2.2 | n4 = 1.49700 | v4 = 81.61 |
| r8 = 29.920 | d8 = 14.4 | | |
| r9 = −77.957 | d9 = 2.5 | n5 = 1.77250 | v5 = 49.62 |
| r10 = 87.234 | d10 = 1.7 | | |
| r11 = 58.021 | d11 = 5.9 | n6 = 1.84666 | v6 = 23.78 |
| r12 = −343.528 | d12 = 1.7 | | |
| r13 = −55.209 | d13 = 2.4 | n7 = 1.83500 | v7 = 42.98 |
| r14 = 916.120 | d14 = Variable | | |
| r15 = 0.000 | d15 = 18.2 | | |
| r16 = −29.443 | d16 = 11.2 | n8 = 1.51680 | v8 = 64.20 |
| r17 = −37.176 | d17 = 1.5 | | |
| r18 = 62.585 | d18 = 12.8 | n9 = 1.49700 | v9 = 81.61 |
| r19 = −77.869 | d19 = 0.6 | | |
| r20 = 73.217 | d20 = 8.2 | n10 = 1.49700 | v10 = 81.61 |
| r21 = −228.864 | d21 = 3.4 | | |
| r22 = −75.455 | d22 = 3.0 | n11 = 1.80420 | v11 = 46.50 |
| r23 = 553.971 | d23 = 16.5 | | |
| r24 = 106.906 | d24 = 3.5 | n12 = 1.77250 | v12 = 49.62 |
| r25 = 47.664 | d25 = 4.1 | | |
| r26 = 144.895 | d26 = 10.5 | n13 = 1.45650 | v13 = 90.27 |
| r27 = −68.374 | d27 = 2.5 | | |
| r28 = −51.129 | d28 = 3.5 | n14 = 1.83400 | v14 = 37.34 |
| r29 = −72.664 | d29 = 0.3 | | |
| r30 = 66.746 | d30 = 12.2 | n15 = 1.45650 | v15 = 90.27 |
| r31 = −139.985 | d31 = Variable | | |
| r32 = 0.000 | d32 = 88.0 | n16 = 1.51680 | v16 = 64.17 |

TABLE 4

| | Wide angle end | Telephoto end |
|---|---|---|
| d4 | 3.6 | 24.6284 |
| d14 | 28.32 | 7.2592 |
| d31 | 10.0 | 20.9021 |

Figure 7:
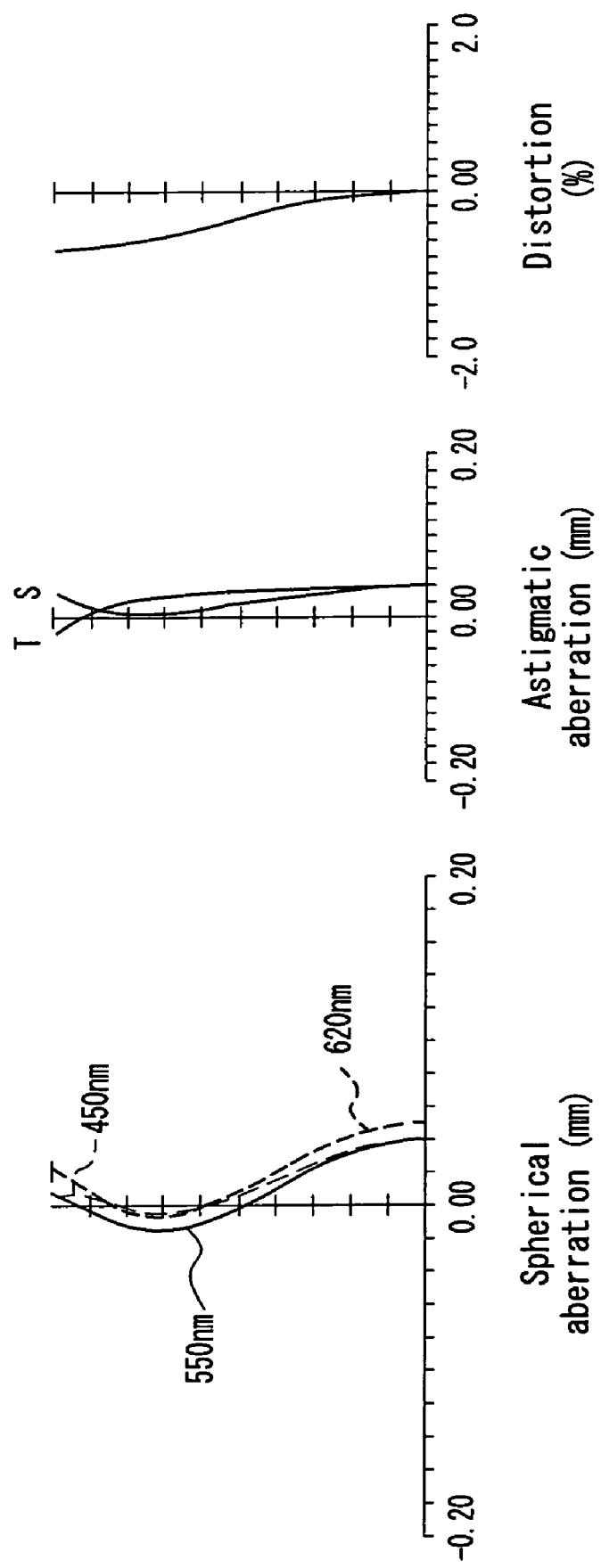
FIG. 7 shows aberration charts for the wide angle end according to Working Example 2 of the present invention.
Figure 8:
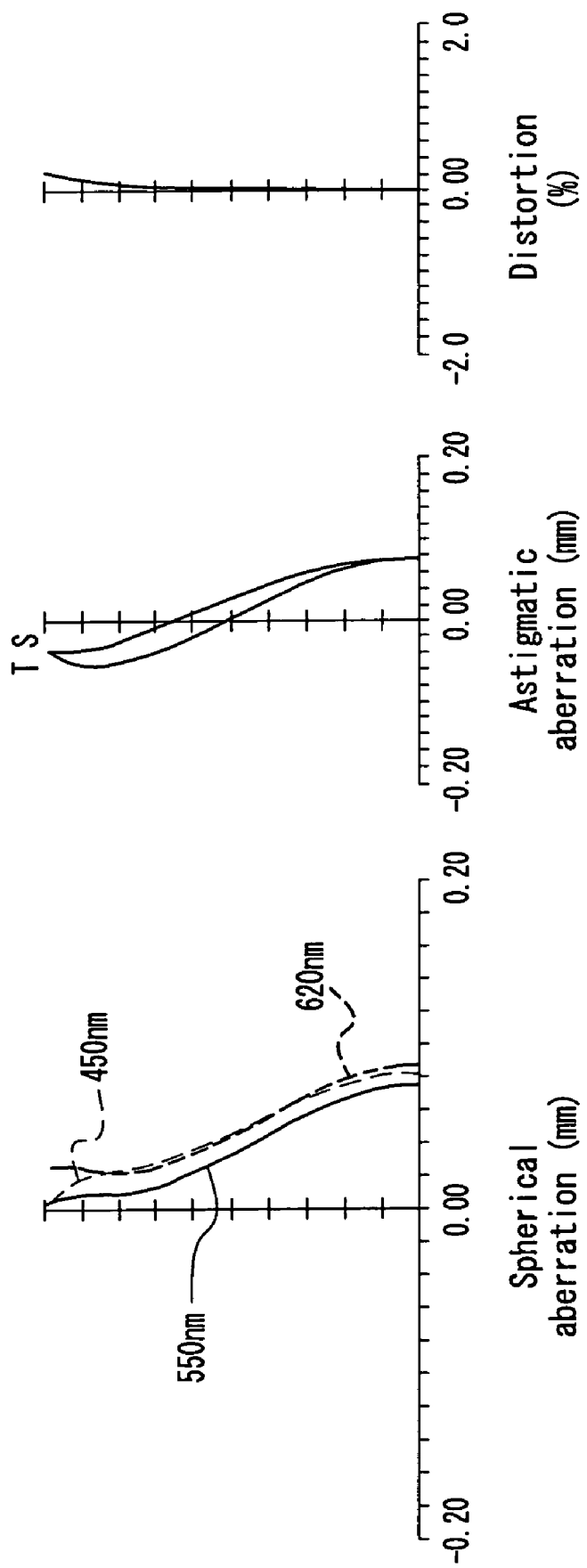
FIG. 8 shows aberration charts for the telephoto end according to Working Example 2 of the present invention.

The charts in FIG. 7 and FIG. 8 show the distortion performances of Working Example 2, and the zoom lens according to Working Example 2 shows favorable performance with respect to aberration.

COMPARATIVE EXAMPLE 1

Figure 9:
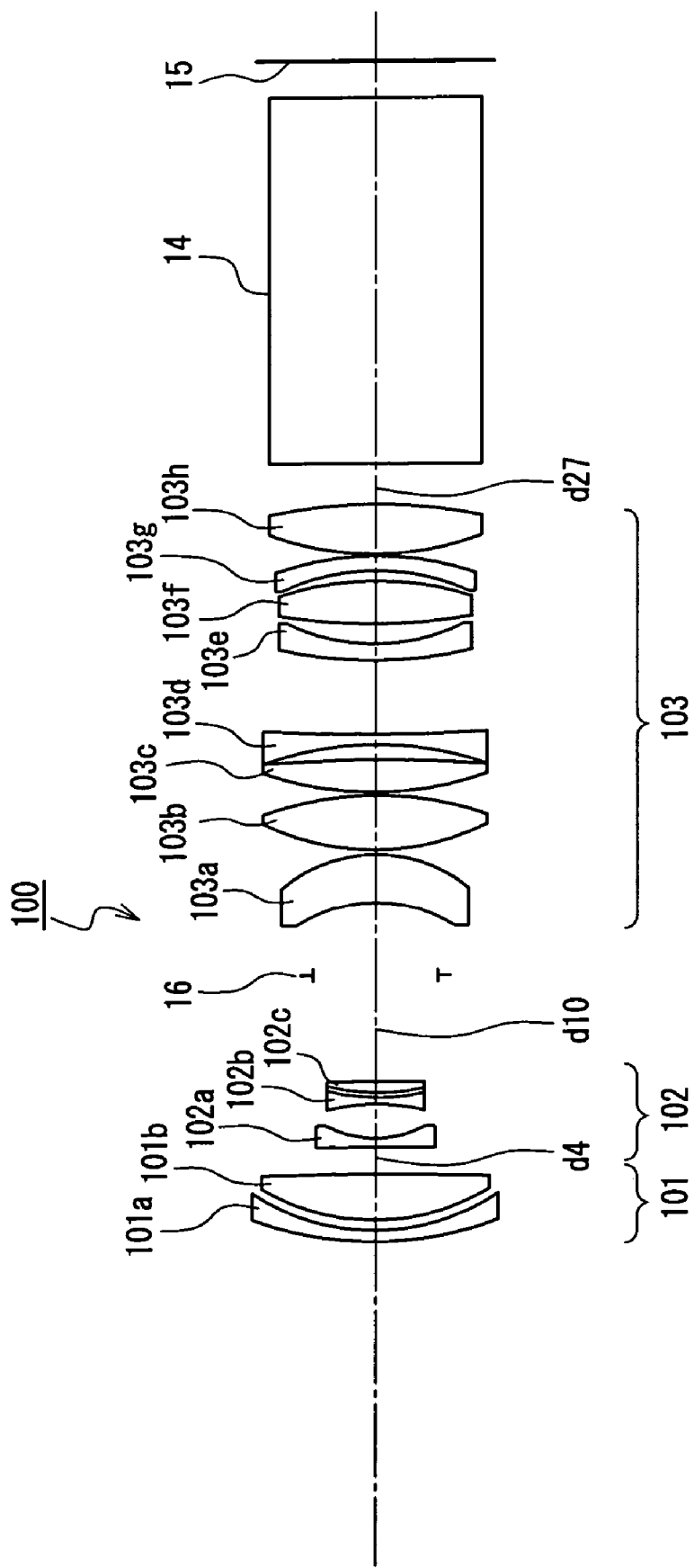
FIG. 9 is a view of the configuration of the wide angle end of a zoom lens according to a comparative example of the present invention.
Figure 10:
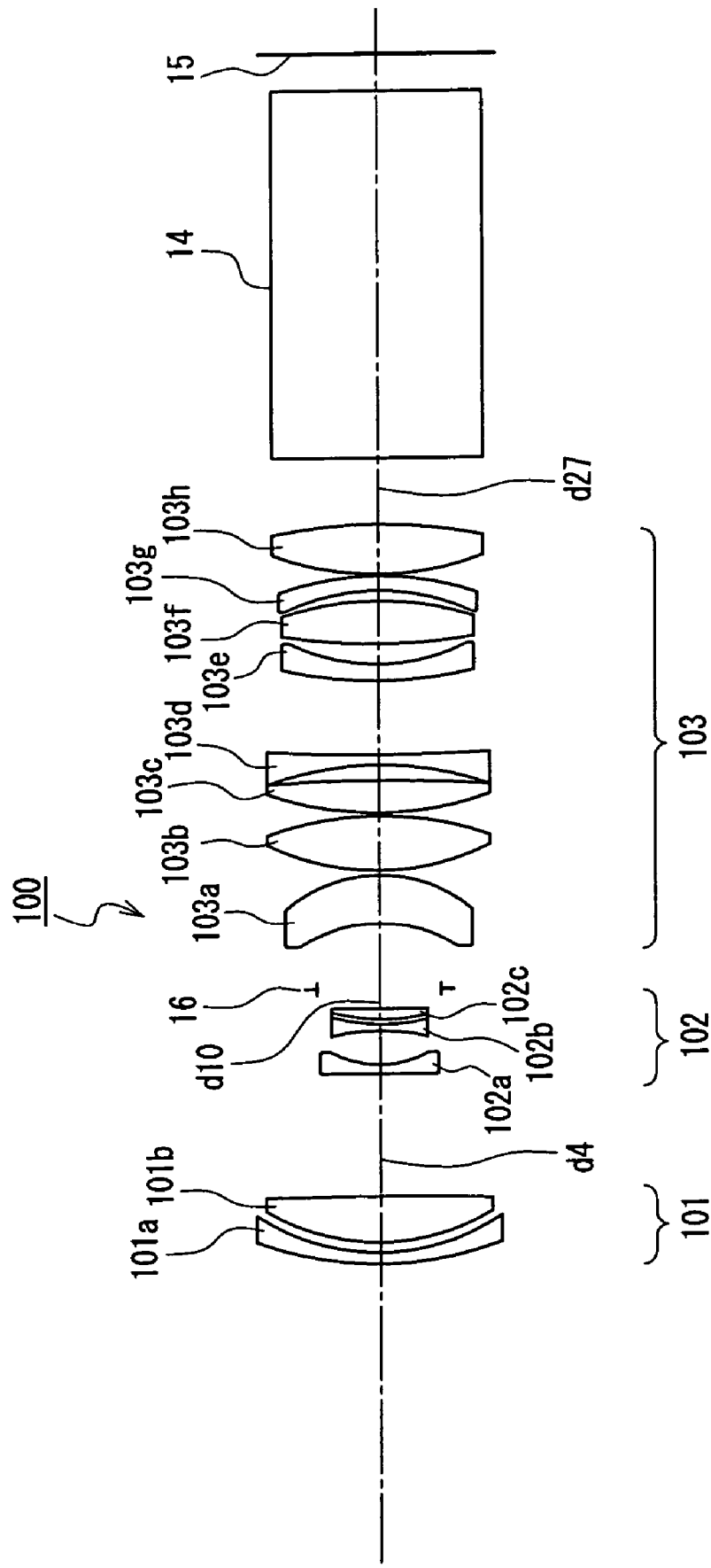
FIG. 10 is a view of the configuration of the telephoto end of the zoom lens according to a comparative example of the present invention.

FIG. 9 shows a view of a configuration of the wide angle end of a zoom lens according to Comparative Example 1. FIG. 10 shows a view of a configuration of the telephoto end of the zoom lens shown in FIG. 9. A zoom lens 100 shown in FIG. 9 is provided with a first lens group 101 (101a and 101b) that has positive refractive power, a second lens group 102 (102a to 102c) that has negative refractive power, and a third lens group 103 (103a to 103h) that has positive refractive power, in the order as seen from the side with the longer conjugate distance. The glass block 14, the image surface 15 and the aperture stop 16 are configured the same as in FIG. 5, and the side having the longer conjugate distance is also the same as in FIG. 5.

In Working Example 1 shown in FIG. 5, the second lens group 22 is constituted by five lenses, having positive, negative, negative positive and negative refractive power, from the side having the longer conjugate distance, while in Comparative Example 1 shown in FIG. 9 the second lens group 102 is constituted by three lenses, having negative, negative and positive refractive power. That is to say that while the front lens 22a of the second lens group 22 of Working Example 1, as seen from the side having the longer conjugate distance has positive refractive power, the equivalent lens 102a in Comparative Example 1 has negative refractive power.

Comparative Example 1 is a design example having $F_{NO}=2.5$ at the wide angle end, focal length f=55.87 and a half angle of view of 16.7°. Specific figures are shown below in Table 5, and zoom data is shown in Table 6. In Table 5, r1 to r4 is the first lens group, r5 to r10 is the second lens group, r11 to r27 is the third lens group, and r11 is the aperture stop.

TABLE 5

| ri | di | Nd | vd |
|---|---|---|---|
| r1 = 95.131 | d1 = 3.0 | n1 = 1.78472 | v1 = 25.72 |
| r2 = 56.899 | d2 = 2.0 | | |
| r3 = 63.005 | d3 = 10.9 | n2 = 1.69680 | v2 = 55.46 |
| r4 = −338.163 | d4 = Variable | | |
| r5 = 796.702 | d5 = 1.6 | n3 = 1.49700 | v3 = 81.61 |
| r6 = 29.716 | d6 = 9.8 | | |
| r7 = −45.343 | d7 = 1.3 | n4 = 1.49700 | v4 = 81.61 |
| r8 = 72.031 | d8 = 0.2 | | |
| r9 = 54.448 | d9 = 2.5 | n5 = 1.74950 | v5 = 35.30 |
| r10 = 390.826 | d10 = Variable | | |
| r11 = 0.000 | d11 = 17.7 | | |
| r12 = −28.802 | d12 = 11.9 | n6 = 1.51680 | v6 = 64.20 |
| r13 = −36.578 | d13 = 1.6 | | |
| r14 = 66.302 | d14 = 13.5 | n7 = 1.49700 | v7 = 81.61 |
| r15 = −79.659 | d15 = 0.6 | | |
| r16 = 73.506 | d16 = 8.6 | n8 = 1.49700 | v8 = 81.61 |
| r17 = −3758.630 | d17 = 3.6 | | |
| r18 = −80.693 | d18 = 3.2 | n9 = 1.80420 | v9 = 46.50 |
| r19 = −2013.269 | d19 = 17.6 | | |
| r20 = 102.089 | d20 = 3.7 | n10 = 1.77250 | v10 = 49.62 |
| r21 = 50.320 | d21 = 4.3 | | |
| r22 = 114.274 | d22 = 11.1 | n11 = 1.45650 | v11 = 90.27 |
| r23 = −57.604 | d23 = 2.6 | | |
| r24 = −46.139 | d24 = 3.7 | n12 = 1.83400 | v12 = 37.34 |
| r25 = −78.213 | d25 = 0.3 | | |
| r26 = 108.833 | d26 = 12.9 | n13 = 1.45650 | v13 = 90.27 |
| r27 = −87.624 | d27 = Variable | | |
| r28 = 0.000 | d28 = 88.0 | n14 = 1.51680 | v14 = 64.17 |

TABLE 6

| | Wide angle end | Telephoto end |
|---|---|---|
| d4 | 6.7 | 30.55 |
| d10 | 26.63 | 3.83 |
| d27 | 10.56 | 16.29 |

Figure 11:
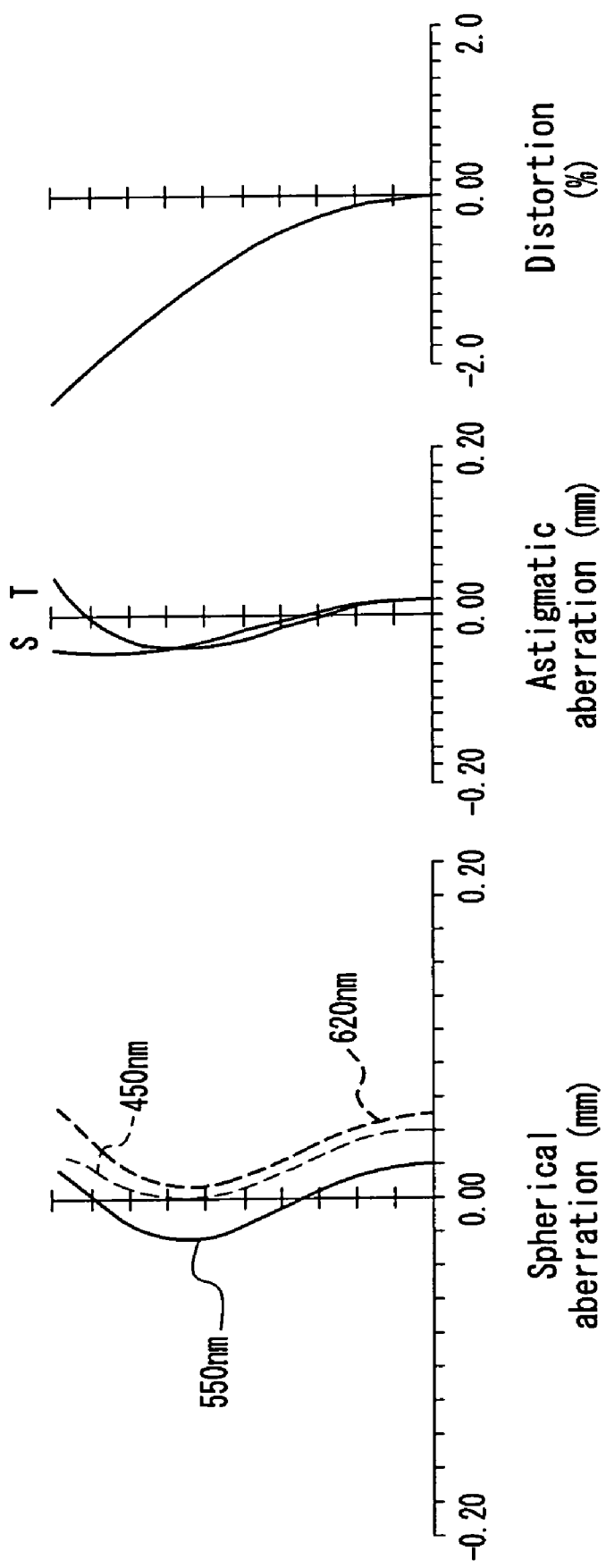
FIG. 11 shows aberration charts for the wide angle end according to a comparative example of the present invention.
Figure 12:
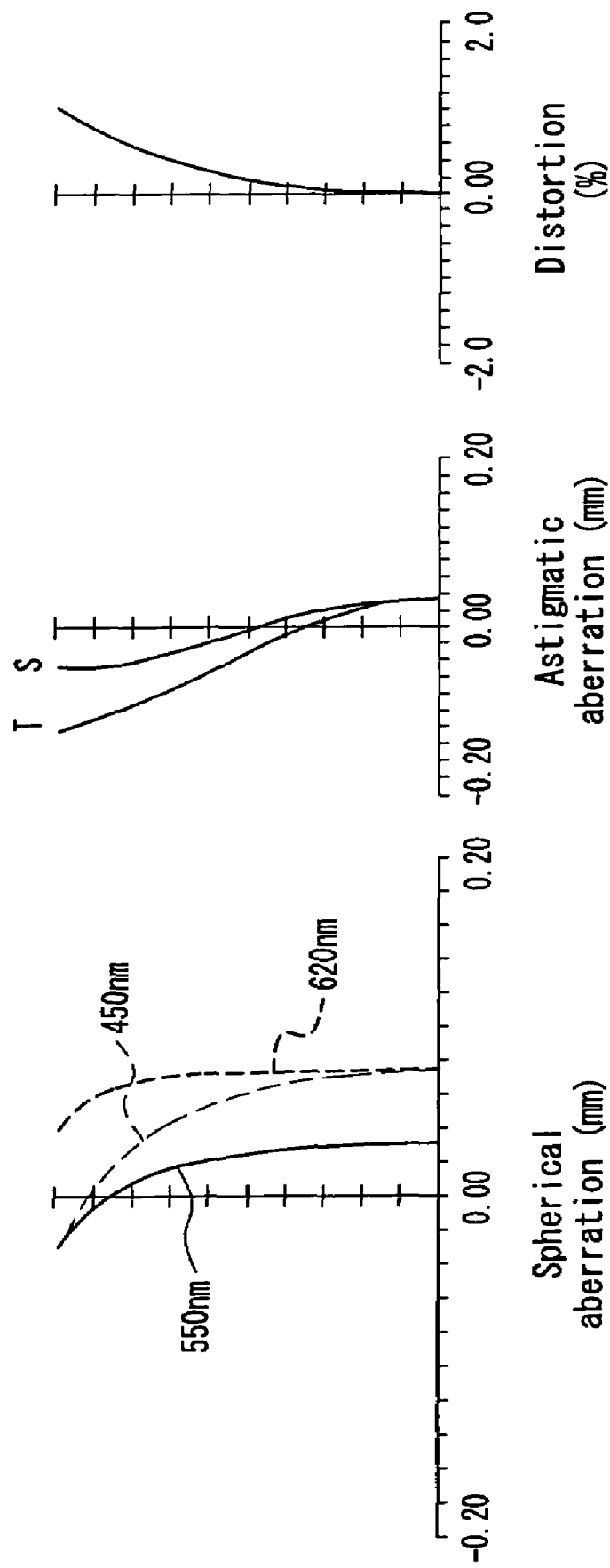
FIG. 12 shows aberration charts for the telephoto end according to a comparative example of the present invention.

FIG. 11 shows aberration charts of the wide angle end of the comparative example. FIG. 12 shows aberration charts of the wide angle end of the comparative example. Apart from the second lens group, Comparative Example 1 has substantially the same configuration as Working Example 2, and the distortion at the wide angle end is −2.4% and is +1% at the telephoto end. If the aberration charts are compared with those of Working Example 2 in FIG. 7 and FIG. 8, it can be seen that the distortion aberration of Working Example 2 is reduced by adding a positive lens onto the side of the second lens group that has the longer conjugate distance.

EMBODIMENT 3

Figure 13:
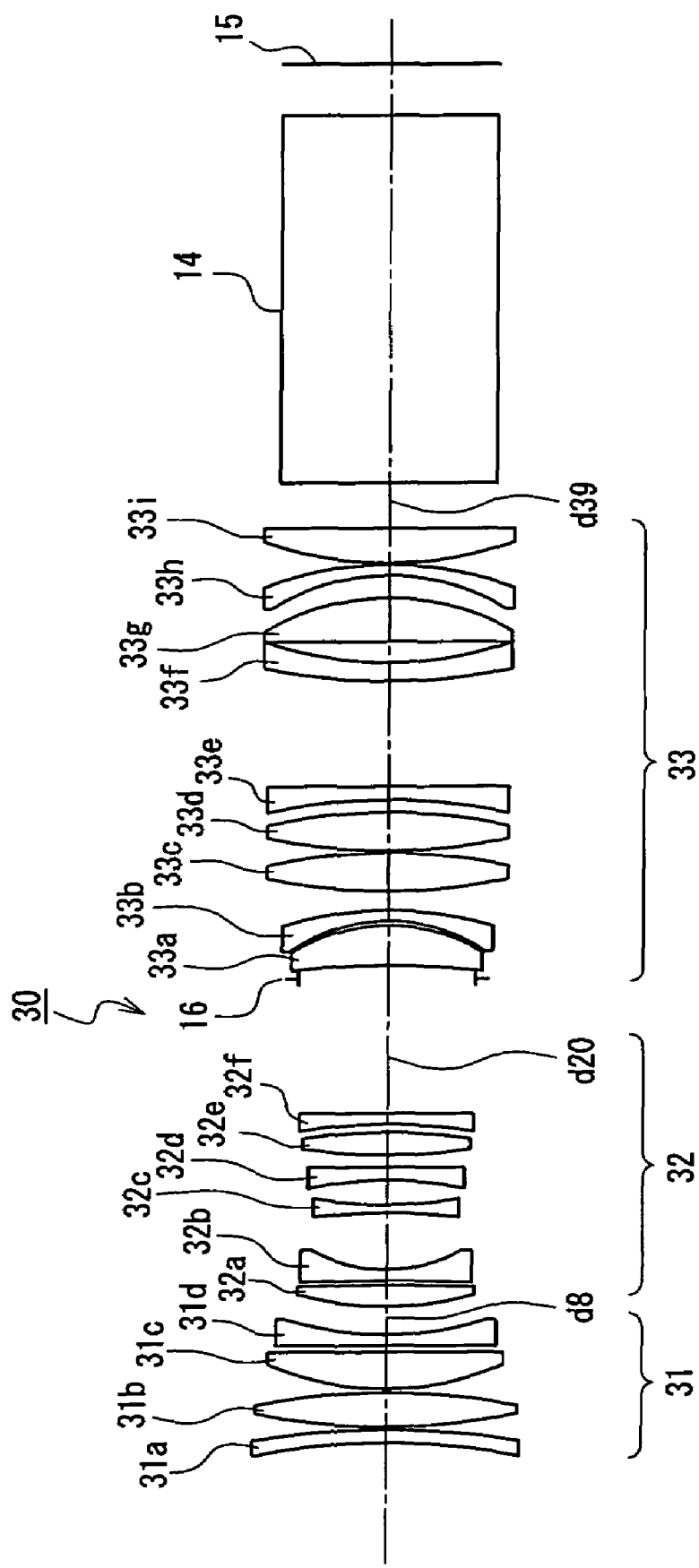
FIG. 13 is a view of the configuration of the wide angle end of a zoom lens according to Embodiment 3 of the present invention.
Figure 14:
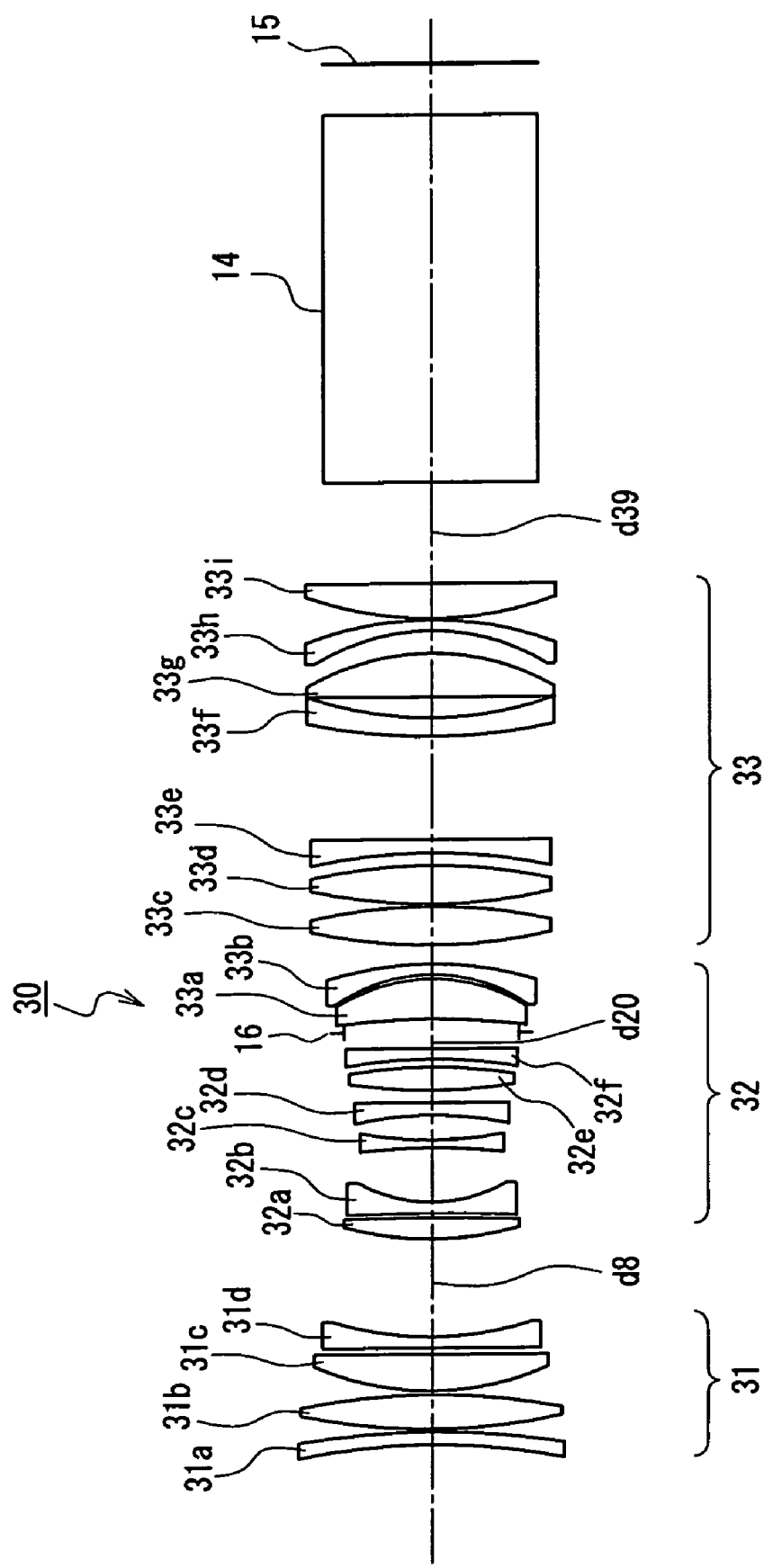
FIG. 14 is a view of the configuration of the telephoto end of the zoom lens according to Embodiment 3 of the present invention.

FIG. 13 shows a view of a configuration of the wide angle end of a zoom lens according to Embodiment 3 of the present invention. FIG. 14 shows a view of a configuration of the telephoto end of the zoom lens shown in FIG. 13. A zoom lens 30 shown in FIG. 13 is provided with a first lens group 31 that has positive refractive power, a second lens group 32 that has negative refractive power, and a third lens group 33 that has positive refractive power, in the order as seen from the side with the longer conjugate distance. The glass block 14, the image surface 15 and the aperture stop 16 are configured the same as in FIG. 1 and are provided with the same symbols, so their description is hereby omitted. In this drawing also, the side having the longer conjugate distance is the side opposite the image surface 15.

When changing magnification from the wide angle end (FIG. 13) to the telephoto end (FIG. 14), the first lens group 31 is fixed, the third lens group 33 moves to the side having the longer conjugate distance, and the second lens group 32 moves to the side having the shorter conjugate distance.

The first lens group 31 (lenses 31a to 31d) is constituted by four lenses, that is to say negative, positive, positive and negative lenses as seen from the side having the longer conjugate distance. The second lens group (lenses 32a to 32f) has negative refractive power, and is a variable magnification lens group. The second lens group 32 is constituted by five lenses, that is to say positive, negative, negative, negative, positive and negative lenses as seen from the side having the longer conjugate distance. The positive lens 32a on the side having the longer conjugate distance generates positive distortion at the wide angle end side. It particularly generates high order distortions. Since the wide angle end of the entire lens system has negative distortion, the positive distortion of the positive lens 32a corrects the negative distortion of the entire lens system, and reduces the distortion at the wide angle end.

The positive lens 32 is made of a glass material that has a high refractive index and a large Abbe number. Thus, blue side lateral chromatic aberration may be reduced. Because the lens generates distortion aberration at the same time as lateral chromatic aberration, the lateral chromatic aberration is reduced by using a glass material that has a large Abbe number.

The third lens group 33 (lenses 33a to 33i) has positive refractive power, and is a variable magnification lens group. The aperture stop 16 is positioned between the second lens group 32 and the third lens group 33, it moves together with the third lens group 33 when changing magnification, and it suppresses fluctuations in telecentricity when the magnification changes.

The present embodiment preferably satisfies at least any one of the above-noted Expressions (1), (2), (5), (6) and (7). Furthermore, as a substitute for the above-noted Expression (8), it is preferable to satisfy Expression (8c) below:

$$0.5 < bfw/fw < 1.3. \tag{8c}$$

As a substitute for the above noted Expressions (9) to (11), it is preferable to satisfy Expression (9c) to (11c) below:

$$0.45 < fw/f1g < 0.6 \tag{9c}$$

$$-2.0 < fw/f2g < -1.6 \tag{10c}$$

$$0.9 < fw/f3g < 1.3. \tag{11c}$$

Furthermore, as a substitute for the above-noted Expression (12), it is preferable to satisfy Expression (12a) below:

$$|DG3/fw| < 0.15. \tag{12a}$$

WORKING EXAMPLE 3

Working Example 3 according to Embodiment 3 is described below. The lens configuration of Working Example 3 is the same as the configuration in FIG. 13 and FIG. 14, and is a design example in which $F_{NO}$=2.5 at the wide angle end, focal length f=96.39 and a half angle of view is 10.25°. The values of the above noted Expressions (1), (2), (5) to (7), (8c) to (11c) and (12a) in Working Example 3 are as follows:

| | |
|---|---|
| f2g/f2top=−0.54 | Expression (1) |
| frear/f2top=0.86 | Expression (2) |
| nd4=1.7725 | Expression (5) |
| vd4=49.62 | Expression (6) |
| f4r/bfw=2.05 | Expression (7) |
| bfw/fw=0.89 | Expression (8c) |
| fw/f1g=0.53 | Expression (9c) |
| fw/f2g=−1.82 | Expression (10c) |
| fw/f3g=1.14 | Expression (11c) |
| |(DG1−DG3)/fw|=0.15. | Expression (12a) |

Next, specific figures are shown in Table 7, and zoom data is shown in Table 8. In Table 7, r1 to r8 is the first lens group, r9 to r20 is the second lens group, r21 to r39 is the third lens group, and r21 is the aperture stop.

TABLE 7

| ri | di | Nd | vd |
|---|---|---|---|
| r1 = −168.281 | d1 = 3.0 | n1 = 1.58913 | v1 = 61.25 |
| r2 = −250.323 | d2 = 1.2 | | |
| r3 = 182.115 | d3 = 8.5 | n2 = 1.49700 | v2 = 81.61 |
| r4 = −182.115 | d4 = 1.0 | | |
| r5 = 76.767 | d5 = 8.9 | n3 = 1.77250 | v3 = 49.62 |
| r6 = 1495.473 | d6 = 2.0 | | |
| r7 = −1659.724 | d7 = 3.0 | n4 = 1.80610 | v4 = 33.27 |
| r8 = 88.570 | d8 = Variable | | |
| r9 = 86.983 | d9 = 5.7 | n5 = 1.77250 | v5 = 49.62 |
| r10 = −596.427 | d10 = 1.1 | | |
| r11 = −281.532 | d11 = 2.6 | n6 = 1.48749 | v6 = 70.44 |
| r12 = 37.072 | d12 = 14.3 | | |
| r13 = −118.479 | d13 = 2.0 | n7 = 1.48749 | v7 = 70.44 |
| r14 = 86.916 | d14 = 6.5 | | |
| r15 = −65.186 | d15 = 2.8 | n8 = 1.48749 | v8 = 70.44 |
| r16 = 607.838 | d16 = 3.4 | | |
| r17 = 125.821 | d17 = 6.2 | n9 = 1.59270 | v9 = 35.45 |
| r18 = −134.162 | d18 = 2.1 | | |
| r19 = −96.116 | d19 = 2.6 | n10 = 1.58913 | v10 = 61.25 |
| r20 = −1236.869 | d20 = Variable | | |
| r21 = 0.000 | d21 = 3.0 | | |
| r22 = −202.574 | d22 = 10.9 | n11 = 1.4560 | v11 = 90.27 |
| r23 = −40.888 | d23 = 0.8 | | |
| r24 = −40.269 | d24 = 2.3 | n12 = 1.58913 | v12 = 61.25 |
| r25 = −92.130 | d25 = 5.1 | | |
| r26 = 129.693 | d26 = 10.0 | n13 = 1.45650 | v13 = 90.27 |
| r27 = −129.693 | d27 = 0.5 | | |
| r28 = 129.693 | d28 = 10.0 | n14 = 1.45650 | v14 = 90.27 |
| r29 = −129.693 | d29 = 4.0 | | |
| r30 = −101.932 | d30 = 3.0 | n15 = 1.58913 | v15 = 61.25 |
| r31 = −674.891 | d31 = 27.0 | | |
| r32 = 178.904 | d32 = 4.0 | n16 = 1.77250 | v16 = 49.62 |
| r33 = 85.847 | d33 = 5.0 | | |
| r34 = 927.613 | d34 = 11.5 | n17 = 1.49700 | v17 = 81.61 |
| r35 = −59.130 | d35 = 5.5 | | |
| r36 = −55.922 | d36 = 3.0 | n18 = 1.83400 | v18 = 37.34 |
| r37 = −82.040 | d37 = 0.3 | | |

TABLE 7-continued

| ri | di | Nd | vd |
|---|---|---|---|
| r38 = 91.980 | d38 = 8.9 | n19 = 1.49700 | v19 = 81.61 |
| r39 = 0.000 | d39 = Variable | | |
| r40 = 0.000 | d40 = 93.5 | n20 = 1.51680 | v20 = 64.17 |

TABLE 8

| | Wide angle end | Telephoto end |
|---|---|---|
| d8 | 6.9 | 24.7 |
| d20 | 34.15 | 2.33 |
| d39 | 11.0 | 25.03 |

Figure 15:
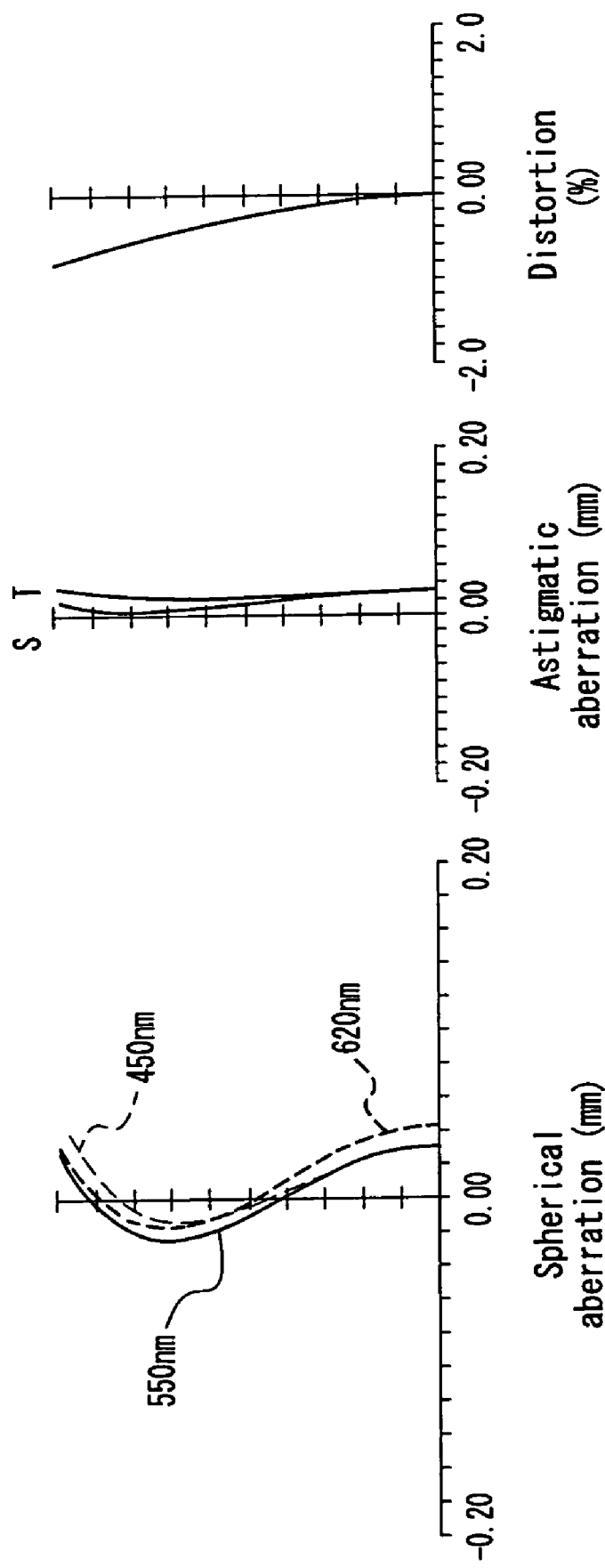
FIG. 15 shows aberration charts for the wide angle end according to Working Example 3 of the present invention.
Figure 16:
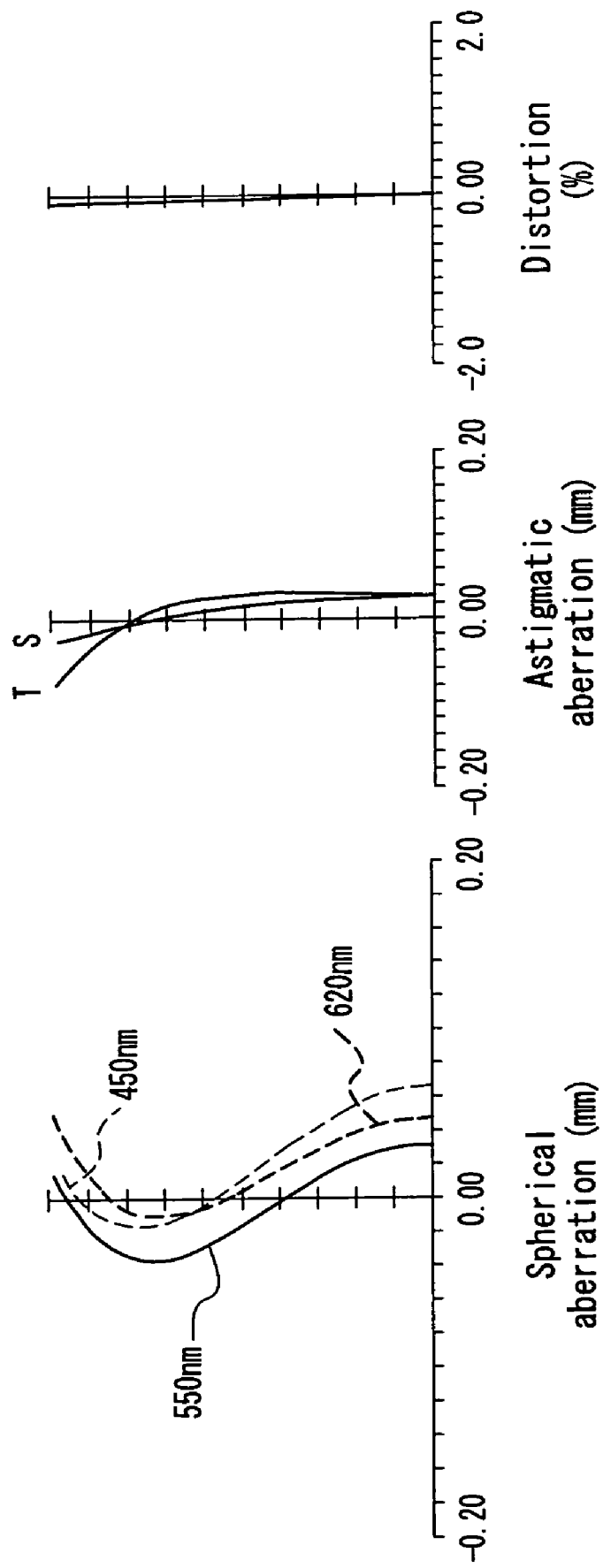
FIG. 16 shows aberration charts for the telephoto end according to Working Example 3 of the present invention.

The charts in FIG. 15 and FIG. 16 show the distortion performances of Working Example 3, and the zoom lens according to Working Example 3 shows favorable performance with respect to aberration.

It should be noted that Embodiments 1 to 3 were described by examples in which there were three lens groups, however the lens may be configured by four or more groups, and provided that the front lens of the second group, as seen from the side having the longer conjugate distance, has positive refractive power, the effect of the present invention may be obtained.

Furthermore, the configuration for satisfying the above-noted Expression (8), Expressions (9) to (11) and Expression (12) was described such that, as in Embodiments 1 to 3, the zoom lens is configured with 3 groups wherein it is a prerequisite that the front lens of the second group has positive refractive power, however there is no limitation to this configuration. That is to say, the effects of satisfying Expression (8), Expressions (9) to (11) as were noted above may be obtained by either applying such expressions to a zoom lens having four groups or more, or to a configuration in which the front lens of the second group has negative refractive power. Furthermore, even if Expression (12) were applied to a configuration in which the front lens of the second group has negative refractive power, the effect of satisfying an expression such as Expression (12) may be obtained. This is the same with Expressions (8a) to (8c), Expressions (9a) to (11a), Expressions (9b) to (11b), Expressions (9c) to (11c) and Expression (12a).

EMBODIMENT 4

Figure 17:
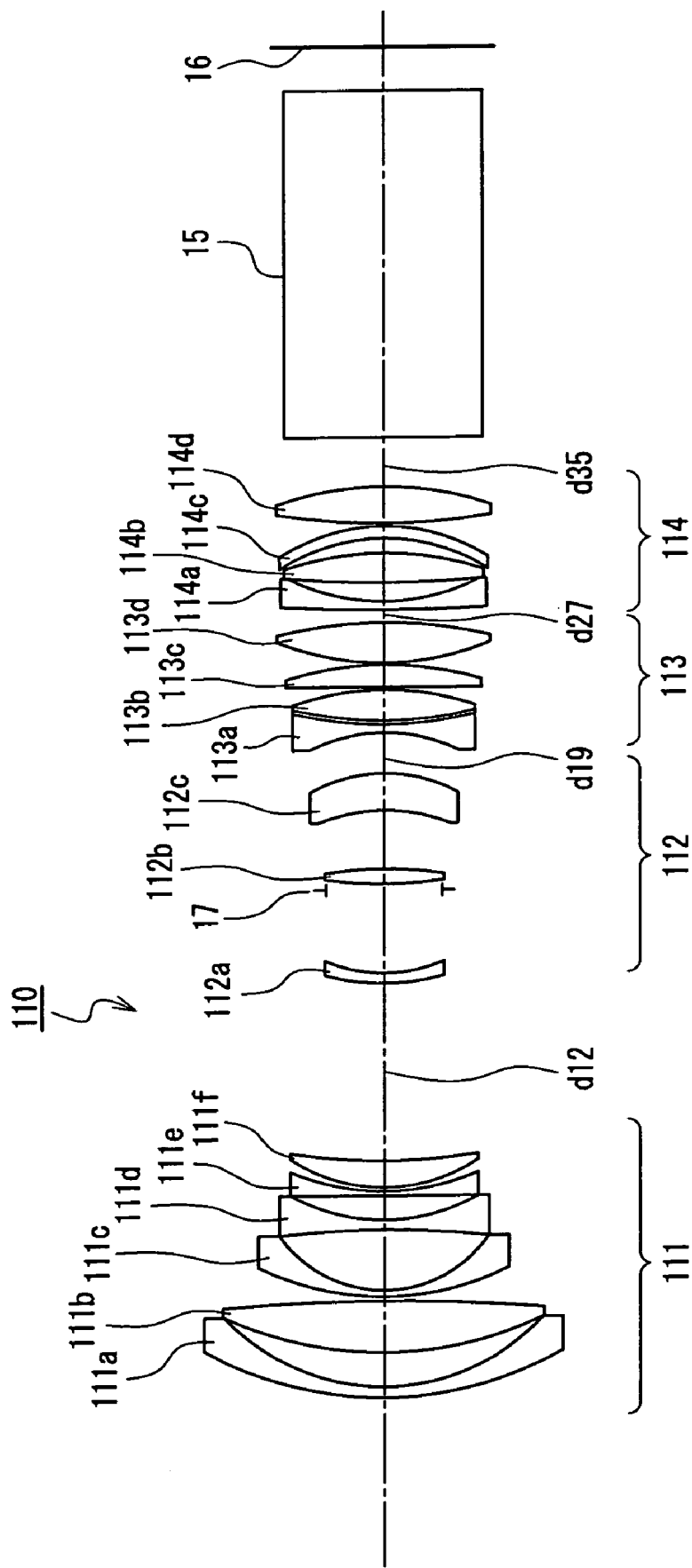
FIG. 17 is a view of the configuration of the wide angle end of a zoom lens according to Embodiment 4 of the present invention.
Figure 18:
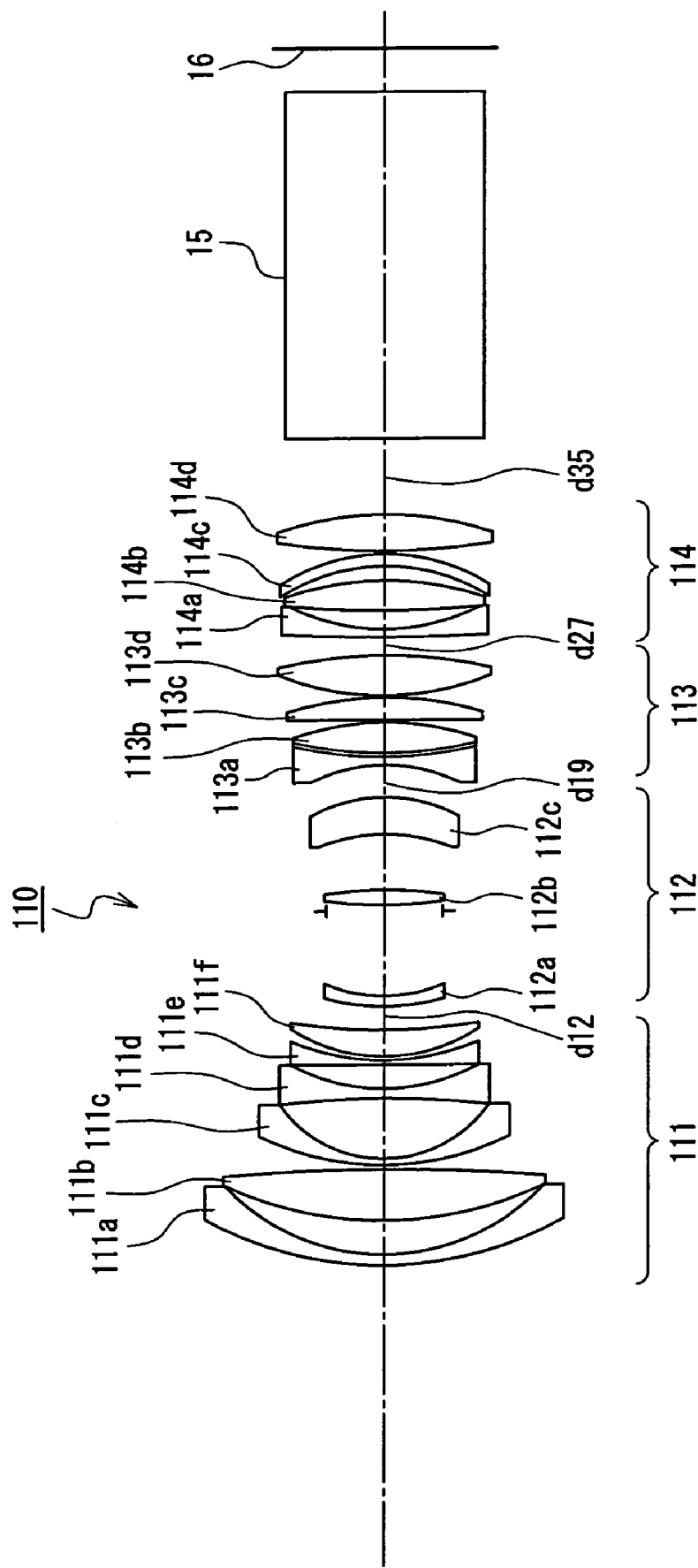
FIG. 18 is a view of the configuration of the telephoto end of the zoom lens according to Embodiment 4 of the present invention.

FIG. 17 is a view of a configuration of the wide angle end of a zoom lens according to Embodiment 4 of the present invention. FIG. 18 is a view of a configuration of the telephoto end of the zoom lens shown in FIG. 17. A zoom lens 110 shown in FIG. 17 is provided with a first lens group 111 that has negative refractive power, a second lens group 112 that has positive refractive power, and a third lens group 113 that has positive refractive power, and a fourth lens group 114 that has positive refractive power, in the order as seen from the side with the longer conjugate distance. Numeral 15 denotes a glass block such as a prism. Numeral 16 denotes an image surface, and in the case of an image-taking system denotes film or CCDs, and in the case of a projection device, it denotes LCDs, for example, which are spatial modulating elements. It should be noted that in the example in FIG. 17, the side with the longer conjugate distance is the side that is opposite the image surface 16 (the same as in the drawings below).

Furthermore, when changing magnification from the wide angle end (FIG. 17) to the telephoto end (FIG. 18), the first lens group 111 moves to the side having the shorter conjugate distance, the second lens group 112 moves to the side having the longer conjugate distance, the third lens group 113 moves to the side having the longer conjugate distance and the fourth lens group 114 moves to the side having the longer conjugate distance.

The first lens group 111 is configured by six lenses, a negative lens 111a, a positive lens 111b, a negative lens 111c, a negative lens 111d, a negative lens 111e and a positive lens 111f, in that order from the side having the longer conjugate distance.

The second lens group 112 is a variable magnification lens group. The second lens group 112 is configured by three lenses, a negative lens 112a, a positive lens 112b, and a positive lens 112c, from the side having the longer conjugate distance. In order to ensure the back focus of the entire zoom lens, the second lens group 112 is configured as a reverse telephoto-type lens.

The third lens group 113 has a relatively large positive refractive index, and has the effect of reducing the load on the fourth lens group and of moving the position of the aperture stop 17 toward the side having the longer conjugate distance. In order to suppress fluctuations in aberration due to the change in magnification between the wide angle end to the telephoto end, the third lens group 113 moves slightly differently from the second lens group 112 and the fourth lens group 114. That is to say, the third lens group 113 does not move as a single body with the second lens group 112 and the fourth lens group 114, and the amount that the third lens group moves also differs from these lens groups.

The fourth lens group 114 is a variable magnification lens group. When changing magnification, the fourth lens group 114 moves as one with the second lens group 112, and is set so as to suppress changes in telecentricity with changes in magnification. The fourth lens group 114 greatly influences the distortion and lateral chromatic aberration, and thus is configured to effectively suppress these aberrations. That is to say, the fourth lens group 114 is constituted by arrangement of a concave meniscus lens 114a whose convex surface faces the side having the longer conjugate distance, a positive lens 114b, a concave meniscus lens 114c whose convex surface faces the side having the shorter conjugate distance, and a positive lens 114d, in that order from the side having the longer conjugate distance.

As noted above, the present invention ensures the back focus and realizes a compact zoom lens by a zoom configuration of four groups, having negative, positive, positive and positive refractive power, as seen from the side having the longer conjugate distance. The zoom lens 110 is described more specifically below. The zoom lens 110 is basically a two-group zoom that is constituted by a negative and a positive lens group. Two-group zoom is suited to wide angles, and has the characteristic in that a long back focus is easily obtained. However, long zoom and large diameters are difficult, and the back focus and the F number changes when the magnification is changed from the wide angle end to the telephoto end.

Regarding what is known as a front positive power-type zoom lens having a four-group zoom of positive, negative, positive, and positive, or positive, negative, negative and positive, or a three-group zoom having positive, negative and positive refractive power, since the pupil on the side having the longer conjugate distance is positioned on the side having the shorter conjugate distance, the outer diameter of the positive first lens group increases when it is changed to wide angle. Moreover, in order to ensure that telecentricity does not change with changes in magnification, in all the configurations it is necessary to position the aperture stop within the positive lens group that has the shortest conjugate distance, and it is difficult to suppress fluctuations in distortion due to changes in magnification.

In order to use the lens as the projecting lens of a projector, it is necessary that both distortion and lateral chromatic aberration are small to obtain high picture quality, and compactness is desired to facilitate installation.

Accordingly, in the present embodiment, the external diameter of the negative first lens group is suppressed to a compact size by forming the zoom lens in a negative power front-type zoom configuration, and positioning the pupil on the side having the longer conjugate distance. Also, by positioning the position of the aperture stop on the side having the longer conjugate distance, the pupil may be moved further in the direction of the side having the longer conjugate distance, and thus it is possible to make the outside diameter of the negative first lens group more compact.

The position of the aperture stop determines the telecentricity, and thus is important in terms of the optical arrangement. In order to realize a long back focus, telecentricity and the arrangement of an aperture stop that is positioned on the side having the longer conjugate distance, it is important to provide as much positive power in the vicinity of the aperture stop as possible. In the present embodiment, in order to satisfy the above-noted conditions, the positive power of the second lens group and the third lens group is larger than the positive power of the fourth lens group 14.

A basic zoom lens generates minus distortion at the wide angle end, and plus distortion at the telephoto end that is larger than that of the wide angle end. In order to suppress distortion fluctuations due to changes in magnification, it is desirable that the lens groups move monotonically with changes in magnification. For example, in a four-group zoom that has positive, negative, positive and positive refractive power, if the positive first lens group is fixed during changes in magnification, and if the magnification ratio of the negative second lens group moves about the position of equal magnification ratio, then the third lens group, which is positive, has the same position at the wide angle end and at the telephoto end, and thus the maximum amount of movement is in between the wide angle end and the telephoto end. In this case, the distortion generated at the positive third lens group is substantially the same at the wide angle end and the telephoto end, and thus it is not possible to suppress distortion fluctuation caused by a change in the magnification of the overall lens system.

In the present embodiment, the zoom lens is arranged so that the magnification ratio from the second lens group 112 to the fourth lens group 114 does not move about the position of equal magnification, and is arranged so as to be used at a minus reduction ratio. By arranging the zoom lens in this manner, in the present embodiment, when changing magnification from the wide angle end to the telephoto end, the first lens group 111 moves monotonically from the end having the longer conjugate distance to the end having the shorter conjugate distance, and the lens groups from the second lens group 112 to the fourth lens group 114 move monotonically from the end having the shorter conjugate distance to the end having the longer conjugate distance. With the configuration noted above, it is possible to effectively suppress fluctuations in distortion as the magnification changes from the wide angle end to the telephoto end.

For zoom lenses in which the back focus fluctuates, if the aperture stop is not alterable with changes in magnification, then the F number will fluctuate. The amount by which the F number fluctuates is proportional to the amount that the back focus fluctuates. The amount of F number fluctuation may be reduced by reducing the amount of fluctuation in the back focus.

In the present embodiment, the absolute value of the magnification ratio of the lens groups from the second lens group 112 to the fourth lens group 114 is reduced. However, when this magnification ratio is reduced, the overall length of the lens increases, and it may be impossible to ensure a long back focus. Accordingly, in the present embodiment, a long back focus may be ensured by configuring the second lens group 112 with a lens 112a, which has negative refractive power, and a lens 112b, which has positive refractive power, in the order as seen from the side having the longer conjugate distance.

In the present embodiment, it is preferable to satisfy Expression (13) below:

$$2.5 < bfw/fw < 4 \quad (13)$$

where bfw is the air equivalent back focus when the wide angle end is at infinity and where fw is the focal length of the zoom lens 110 at the wide angle end.

Expression (13) is an expression that prescribes the back focus at the wide angle end with respect to the focal length at the wide angle end, and also prescribes the necessary back focus of a projecting lens for use in a projector Particularly, if reflecting type elements are used as the spatial modulating elements, then in addition to a prism for combining colors, a prism block for guiding the illuminating light is disposed between the projecting lens and the spatial modulating elements. Thus, the projecting lens for the projector requires a long back focus. When the lower limit of Expression (13) is not met, it is not possible to obtain the necessary space between the projecting lens and the spatial modulating elements, and it may not be possible to configure the projector. When the upper limit is exceeded, the overall length and outside diameter of the lens increases, and it is not possible to make the lens more compact.

A preferable configuration of the present embodiment is described below in terms of optical performance. First, the first lens of the second lens group 112, as seen from the side having the longer conjugate distance, has negative refractive power, the second lens, as seen from the side having the longer conjugate distance, has positive refractive power, and the second lens group 112 is constituted by at least three lenses. Thus, it is possible to ensure a long back focus by configuring the second lens group 112 with lenses having negative and positive refractive power, as seen from the side having the longer conjugate distance. It should be noted that in the example in FIG. 1, the second lens group 112 is constituted by three lenses, however provided that a negative lens and a positive lens are disposed in that order from the side having the longer conjugate distance, the second lens group 112 may be constituted by four or more lenses.

Next, when there is a change in magnification from the wide angle end to the telephoto end, the second lens group 112 and the fourth lens group 114 move in the same way on the optical axis, from the side having the shorter conjugate distance to the side having the longer conjugate distance. Since the aperture stop 17 is disposed within the second lens group 112, because the fourth lens group 114 moves in the same way as the second lens group 112, there is no change in telecentricity with the change in magnification form the wide angle end to the telephoto end. It is also possible to simplify the construction of the lens barrel, and this construction has the advantage of reducing costs while maintaining precision.

Next, it is preferable to satisfy Expressions (14) to (17) below:

$$-0.45 < fw/f1g < -0.3 \quad (14)$$

$$0.01 < fw/f2g < 0.3 \quad (15)$$

$$0.18 < fw/f3g < 0.29 \quad (16)$$

$$0.05 < fw/f4g < 0.2 \quad (17)$$

where f1g is the focal length of the first lens group 111, where f2g is the focal length of the second lens group 112, where f3g is the focal length of the third lens group 113, where f4g is the focal length of the fourth lens group 114 and where fw is the focal length of the above-noted zoom lens at the wide angle end, Expression (14) is an expression that prescribes the focal length of the first lens group 111 by the ratio to the focal length at the wide angle end, and thus, when the lower limit is not met, the Petzval Sum may not be able to be corrected, and curvature of the field and astigmatic aberration increases. When the upper limit is exceeded, it may be impossible to ensure the back focus. If an attempt is made to ensure the back focus, then the optical length of the entire zoom lens and the outside diameter of the first lens group increases.

Expression (15) is an expression that prescribes the focal length of the second lens group 112 by the ratio to the focal length of the zoom lens at the wide angle end. When the lower limit is not met, coma aberration increases, and when the upper limit is exceeded, it becomes impossible to ensure the back focus.

Expression (16) is an expression that prescribes the focal length of the third lens group 113 by the ratio to the focal length of the zoom lens at the wide angle end. When the lower limit is not met, the position of the aperture stop moves toward the side having the shorter conjugate distance, and the outer diameter of the first lens group 111 increases. When the upper limit is exceeded, it may come be impossible to correct spherical aberration.

Expression (17) is an expression that prescribes the focal length of the fourth lens group by the ratio to the focal length of the zoom lens at the wide angle end. When the lower limit is not met, it may be impossible to ensure the back focus. When the upper limit is exceeded, it may be impossible to correct distortion and lateral chromatic aberration.

Next, it is preferable to satisfy Expressions (18) and (19) below:

$$-0.018 < (1/f1/abe1)/(1/frear) < 0.0 \quad (18)$$

$$1.70 < nd11 < 1.79 \quad (19)$$

where f1 is the focal length of the front negative lens 111a when seen from the end having the longer conjugate distance, where abe1 is the Abbe number, where nd11 is the refractive index at the d line, and where frear is the synthetic focal length from the second lens group 112 to the fourth lens group 114, When the lens groups from the second lens group 112 to the fourth lens group 114 correct chromatic aberration, blue lateral chromatic aberration is over-corrected. The lens that cancels out this over-correction of blue lateral chromatic aberration is the negative lens 111a that is at the front as seen from the side having the longer conjugate distance.

Expression (18) represents the relationship between the amount of blue lateral chromatic aberration that is generated in the front negative lens, as seen from the side having the longer conjugate distance, and the amount of over-correction of blue lateral chromatic aberration by the lens groups from the second lens group to the fourth lens group. When the lower limit is not met, correction of the blue lateral chromatic aberration and the red lateral chromatic aberration is insufficient, and when the upper limit is exceeded, the blue lateral chromatic aberration increases due to over-correction.

It is preferable that the refractive index of the front negative lens 111a, as seen from the side having the longer conjugate distance is high, and that its Abbe number is small. However, glass material such as is noted above is characterized by degradation of its internal transmittance. Expression (19) prescribes the refractive index of the front negative lens 111a. When the lower limit is not met, it becomes impossible to make the over-correction of the blue lateral chromatic aberration smaller, and when the upper limit is exceeded, the internal transmittance decreases and the color balance worsens.

Next, the configuration of the four lenses as seen from the side having the shorter conjugate distance (114a to 114d) is, in the order from the side having the longer conjugate distance, a negative meniscus lens 114a whose convex surface faces the side having the longer conjugate distance, a positive lens 114b, a negative meniscus lens 114c whose convex surface faces the side having the shorter conjugate distance and a positive lens 114d. It is preferable to satisfy Expressions (20) to (22) below:

$$nd4 > 1.75 \quad (20)$$

$$vd4 > 35 \quad (21)$$

$$1 < f4r/bfw < 4 \quad (22)$$

where nd4 is the refractive index of the negative meniscus lens 114 on the side having the longer conjugate distance at the d line, where vd4 is the Abbe number, where f4r is the focal length of the four lenses on the side having the shorter conjugate distance and where bfw is the air equivalent back focus at the wide angle end that does not include prisms or the cover glass.

By facing the convex surfaces of the two negative meniscus lenses in different directions, they may be advantageously applied to reduce lateral chromatic aberration and distortion aberration. The negative meniscus lens 114a, whose convex surface faces the side having the longer conjugate distance, may be used effectively to correct distortion aberration, and the negative meniscus lens 114c, whose convex surface faces the side having the shorter conjugate distance may be used effectively to correct lateral chromatic aberration.

Expression (20) represents the refractive index, at the d line, of the negative meniscus lens that is on the side that has the longer conjugate distance, and when the lower limit is not met, the curvature of the field increases. Expression (9) represents the Abbe number of the negative meniscus lens on the side that has the longer conjugate distance, and when the lower limit is not met, the lateral chromatic aberration increases. Furthermore, in Expression (21), it is even more preferable to satisfy vd4>40.

Expression (22) represents the situation in which the focal length of the four lenses, which are on the side having the shorter conjugate distance, are larger than the air equivalent back focus that does not include the prism or the cover glass when at the wide angle end, and it shows use of the lens in a manner in which when an F number light beam is incident on the four lenses from the side having the shorter conjugate distance the light converges toward the side having the shorter conjugate distance. When the lower limit is not met, the outer diameter of the lens on the side having the longer conjugate distance increases, and the distortion aberration and the lateral chromatic aberration increase. When the upper limit is exceeded, the overall length of the lens increases, and it may be impossible to ensure the back focus.

Next, it is preferable that all the lenses having positive refractive power that constitute the third lens group 113 and the fourth lens group 114 are configured with an Abbe number of at least 80. The third lens group 113 and the fourth lens group 114 have positive refractive power, the principal light beam is significantly bent in order to ensure telecentricity, and there is significant chromatic aberration. Lateral chromatic aberration is particularly large. If all the lenses having positive refractive power that constitute the third lens group 113 and the fourth lens group 114 have an Abbe number of at least 80, then it is possible to reduce lateral chromatic aberration to a small value.

It should be noted that the configuration that satisfies the above-noted Expressions (18) and (19), and the configuration that satisfies the above-noted Expressions (20) to (22) have been described under the precondition that each may be applied to the configuration that satisfies Expression (13), however the effect of satisfying these expressions, such as was described above, may be obtained even with a configuration that does not satisfy the above-noted Expression (13).

WORKING EXAMPLE 4

Working Example 4 according to Embodiment 4 is described below. The lens configuration of Working Example 4 is the same as the configuration in FIG. 17 and FIG. 18, and is a design example in which $F_{NO}=2.5$ at the wide angle end, focal length f=27.84 and a half angle of view is 30.9°. The values of the above noted Expressions (13) to (22) in Working Example 4 are as follows:

| | |
|---|---|
| bfw/fw=2.78 | Expression (13) |
| fw/f1g=−0.39 | Expression (14) |
| fw/f2g=0.277 | Expression (15) |
| fw/f3g=0.228 | Expression (16) |
| fw/f4g=0.09 | Expression (17) |
| (1/f1/abe1)/(1/frear)=−0.011 | Expression (18) |
| nd11=1.784 | Expression (19) |
| nd4=1.834 | Expression (20) |
| vd4=37.3 | Expression (21) |
| f4r/bfw=3.94. | Expression (22) |

Next, specific figures are shown in Table 9, and zoom data is shown in Table 10. In Table 9, ri (mm) is the radius of curvature of the lens surface, di (mm) is the lens thickness or the interval between lenses, ni is the refractive index of the lens at the d line, and vi is the Abbe number of the lens at the d line. This is the same in Tables 11 and 13 below. In the example of Table 9, r1 to r12 is the first lens group, r13 to r19 is the second lens group, r20 to r27 is the third lens group, r28 to r35 is the fourth lens group, and r15 is the aperture stop.

TABLE 9

| ri | di | Nd | vd |
|---|---|---|---|
| r1 = 95.000 | d1 = 3.3 | n1 = 1.78472 | v1 = 25.72 |
| r2 = 59.510 | d2 = 8.4 | | |
| r3 = 102.250 | d3 = 13.2 | n2 = 1.58913 | v2 = 61.25 |
| r4 = −487.000 | d4 = 0.8 | | |
| r5 = 66.870 | d5 = 2.5 | n3 = 1.49700 | v3 = 81.61 |
| r6 = 33.580 | d6 = 15.0 | | |
| r7 = −221.560 | d7 = 2.0 | n4 = 1.49700 | v4 = 81.61 |
| r8 = 45.200 | d8 = 7.0 | | |
| r9 = 260.000 | d9 = 2.0 | n5 = 1.49700 | v5 = 81.61 |
| r10 = 65.240 | d10 = 0.9 | | |
| r11 = 46.300 | d11 = 7.0 | n6 = 1.71736 | v6 = 29.50 |
| r12 = 123.000 | d12 = Variabie | | |
| r13 = 67.700 | d13 = 2.6 | n7 = 1.88300 | v7 = 40.80 |
| r14 = 35.650 | d14 = 22.8 | | |
| r15 = 0.000 | d15 = 1.0 | | |
| r16 = 131.500 | d16 = 4.3 | n8 = 1.71736 | v8 = 29.50 |
| r17 = −90.800 | d17 = 15.2 | | |
| r18 = −54.200 | d18 = 9.8 | n9 = 1.56883 | v9 = 56.04 |
| r19 = −41.540 | d19 = Variable | | |
| r20 = −48.750 | d20 = 2.6 | n10 = 1.83500 | v10 = 42.98 |
| r21 = 133.500 | d21 = 0.5 | | |
| r22 = 169.000 | d22 = 8.6 | n11 = 1.49700 | v11 = 81.61 |
| r23 = −62.140 | d23 = 0.5 | | |
| r24 = −6982.000 | d24 = 5.7 | n12 = 1.49700 | v12 = 81.61 |
| r25 = −81.800 | d25 = 0.3 | | |
| r26 = 70.600 | d26 = 10.9 | n13 = 1.45650 | v13 = 90.27 |
| r27 = −120.000 | d27 = Variable | | |
| r28 = 380.000 | d28 = 2.7 | n14 = 1.83400 | v14 = 37.34 |
| r29 = 60.100 | d29 = 4.5 | | |
| r30 = 257.000 | d30 = 7.5 | n15 = 1.49700 | v15 = 81.61 |
| r31 = −102.000 | d31 = 4.7 | | |
| r32 = −46.300 | d32 = 2.5 | n16 = 1.83400 | v16 = 37.34 |
| r33 = −50.900 | d33 = 0.7 | | |
| r34 = 168.290 | d34 = 10.0 | n17 = 1.45650 | v17 = 90.27 |
| r35 = −93.800 | d35 = Variable | | |
| r36 = 0.000 | d36 = 88.0 | n18 = 1.51680 | v18 = 64.17 |

TABLE 10

| | Wide angle end | Telephoto end |
|---|---|---|
| d12 | 46.8 | 5.9 |
| d19 | 10.6 | 9.18 |
| d27 | 3.17 | 4.61 |
| d35 | 14.41 | 21.98 |

Figure 19:
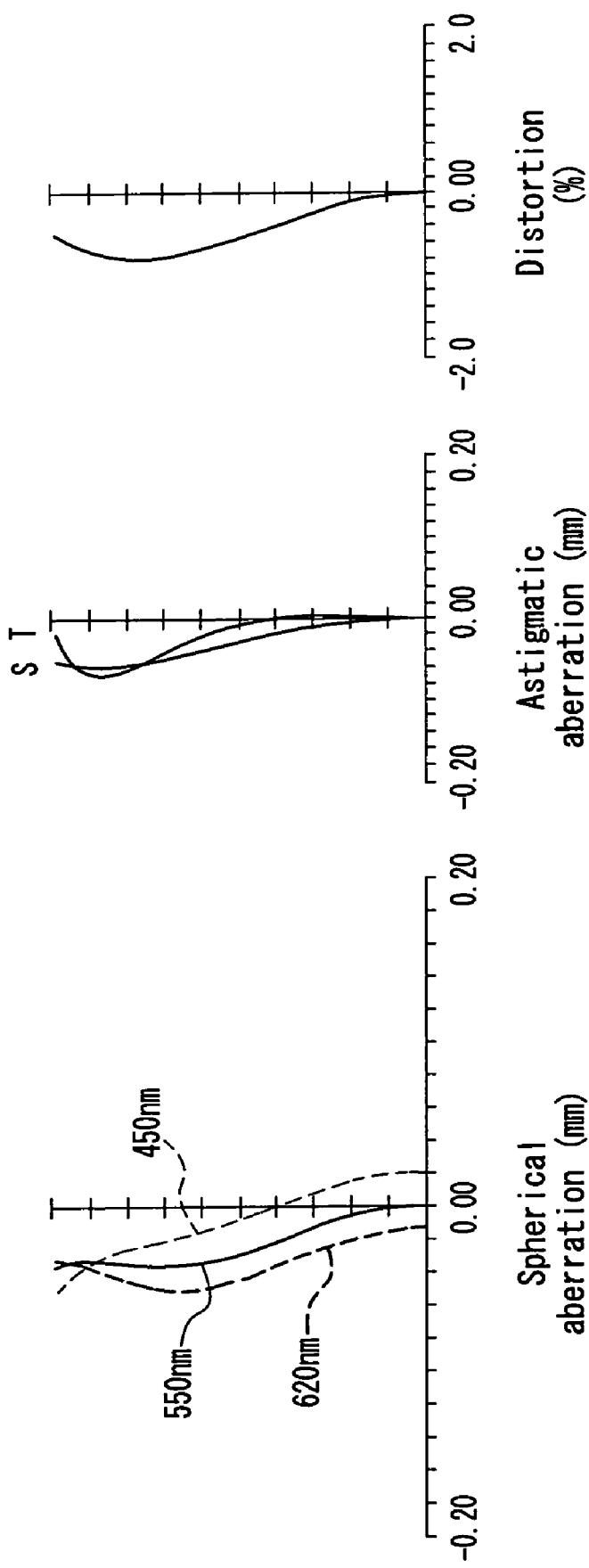
FIG. 19 shows aberration charts for the wide angle end according to Working Example 4 of the present invention.
Figure 20:
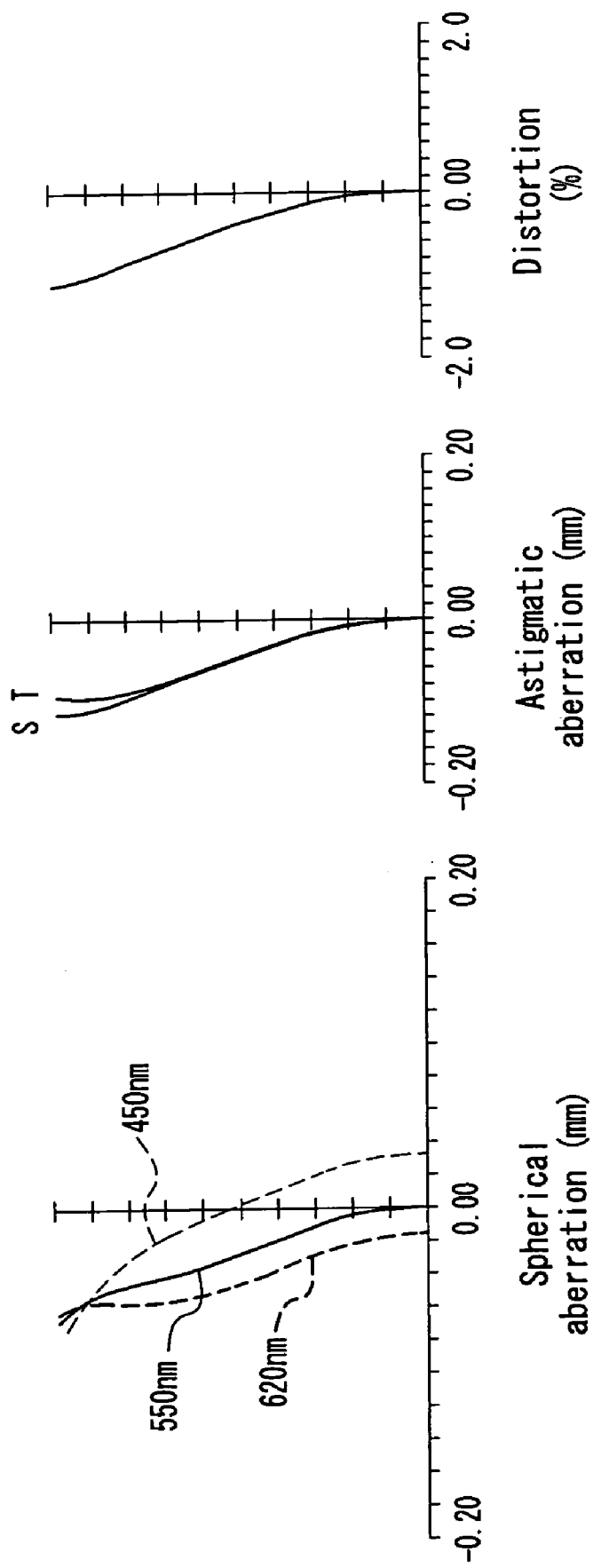
FIG. 20 shows aberration charts for the telephoto end according to Working Example 4 of the present invention.

The charts in FIG. 19 show the spherical aberration (mm), astigmatic aberration (mm) and distortion aberration (%) at the wide angle end of Working Example 4, and these are the same as in FIG. 7 and FIG. 11 below. The charts in FIG. 20 show the spherical aberration (mm), astigmatic aberration (mm) and distortion aberration (%) at the telephoto end of Working Example 4, and these are the same as in FIG. 24 and FIG. 28 below. As can be seen in FIG. 19 and FIG. 20, the zoom lens according to Working Example 4 shows favorable performance with respect to aberration.

WORKING EXAMPLE 5

Figure 21:
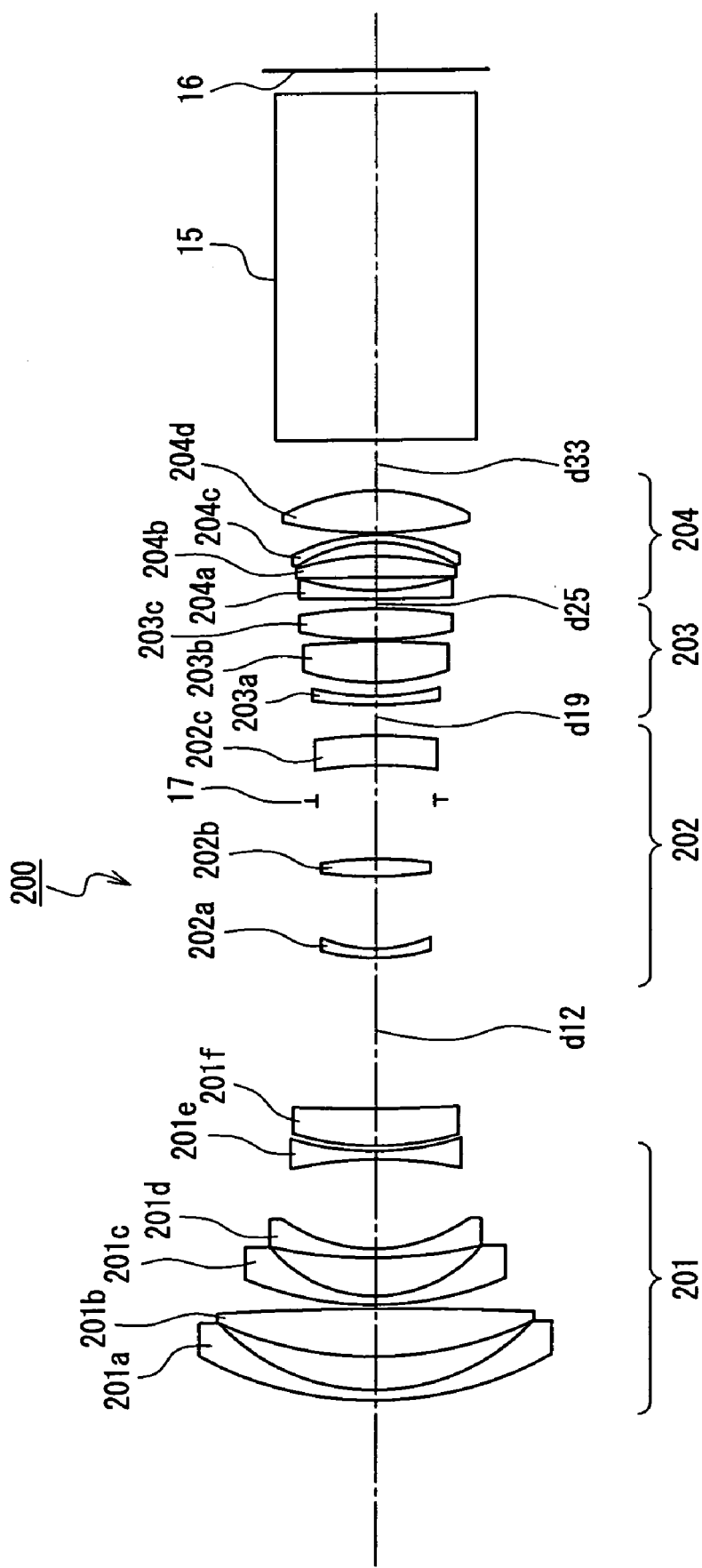
FIG. 21 is a view of the configuration of the wide angle end of a zoom lens according to Working Example 5 of the present invention.
Figure 22:
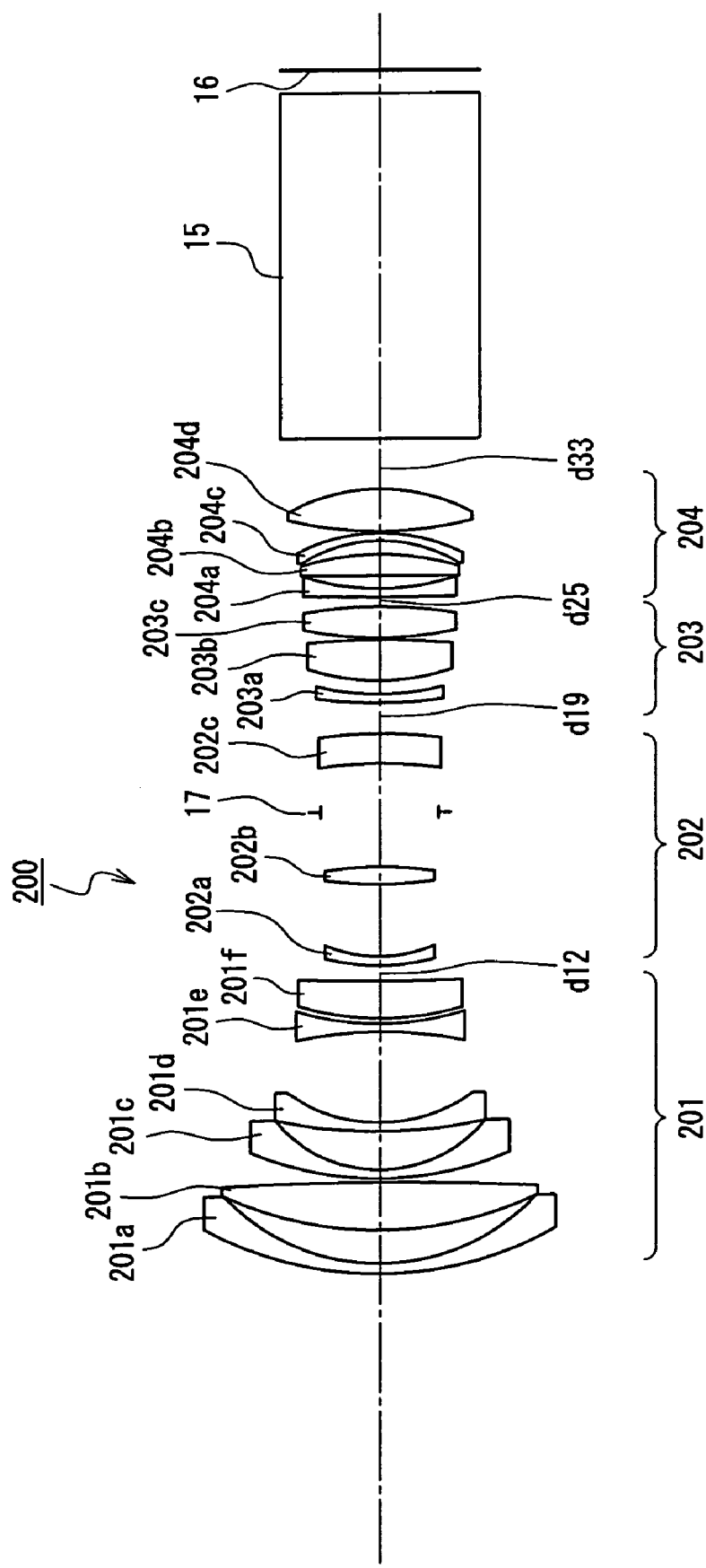
FIG. 22 is a view of the configuration of the telephoto end of the zoom lens according to Working Example 5 of the present invention.

FIG. 21 is a view of a configuration of the wide angle end of a zoom lens according to Working Example 5. FIG. 22 is a view of a configuration of the telephoto end of the zoom lens shown in FIG. 21. A zoom lens 200 shown in FIG. 21 has a four-group configuration, and is provided with a first lens group 201 that has negative refractive power (lens 201a to 201f), a second lens group 202 that has positive refractive power (lens 202a to 202c), a third lens group 203 that has positive refractive power (lens 203a to 203c) and a fourth lens group 204 that has positive refractive power (lens 204a to 204d), in the order as seen from the side with the longer conjugate distance.

Furthermore, when changing magnification from the wide angle end (FIG. 21) to the telephoto end (FIG. 22), the first lens group 201 moves to the side having the shorter conjugate distance, the second lens group 202 moves to the side having the longer conjugate distance, the third lens group 203 moves to the side having the longer conjugate distance, and the fourth lens group 204 moves to the side having the longer conjugate distance.

Working Example 5 is a design example having $F_{NO}$=2.3 at the wide angle end, a focal length f=21.32 and a half angle of view of 30.9°. The values of the above noted Expressions (13) to (22) in Working Example 5 are as follows:

$bfw/fw$=3.66  Expression (13)

$fw/f1g$=−0.37  Expression (14)

$fw/f2g$=0.01  Expression (15)

$fw/f3g$=0.222  Expression (16)

$fw/f4g$=0.175  Expression (17)

$(1/f1/abe1)/(1/frear)$=−0.009  Expression (18)

$nd11$=1.784  Expression (19)

$nd4$=1.834  Expression (20)

$vd4$=37.3  Expression (21)

$f4r/bfw$=1.56.  Expression (22)

Next, specific figures are shown in Table 11, and zoom data is shown in Table 12. In the example of Table 11, r1 to r12 is the first lens group, r13 to r19 is the second lens group, r20 to r25 is the third lens group, r26 to r33 is the fourth lens group, and r17 is the aperture stop.

TABLE 11

| ri | di | Nd | vd |
|---|---|---|---|
| r1 = 92.300 | d1 = 3.2 | n1 = 1.78472 | v1 = 25.72 |
| r2 = 61.092 | d2 = 7.6 | | |
| r3 = 100.539 | d3 = 13.0 | n2 = 1.58913 | v2 = 61.25 |
| r4 = −639.005 | d4 = 0.5 | | |
| r5 = 82.393 | d5 = 2.7 | n3 = 1.49700 | v3 = 81.61 |
| r6 = 35.903 | d6 = 10.4 | | |
| r7 = 127.653 | d7 = 2.3 | n4 = 1.49700 | v4 = 81.61 |
| r8 = 42.052 | d8 = 24.0 | | |
| r9 = −89.136 | d9 = 2.3 | n5 = 1.49700 | v5 = 81.61 |
| r10 = 79.123 | d10 = 0.7 | | |
| r11 = 57.850 | d11 = 10.0 | n6 = 1.71736 | v6 = 29.50 |
| r12 = 199.948 | d12 = Variable | | |
| r13 = 144.430 | d13 = 2.2 | n7 = 1.88300 | v7 = 40.80 |
| r14 = 46.361 | d14 = 19.0 | | |
| r15 = 109.950 | d15 = 5.2 | n8 = 1.71736 | v8 = 29.50 |
| r16 = −89.666 | d16 = 15.1 | | |
| r17 = 0.000 | d17 = 10.0 | | |
| r18 = −67.922 | d18 = 7.5 | n9 = 1.56883 | v9 = 56.04 |
| r19 = −143.285 | d19 = Variable | | |
| r20 = 114.850 | d20 = 2.1 | n10 = 1.83500 | v10 = 42.98 |
| r21 = 48.013 | d21 = 4.2 | | |
| r22 = 61.255 | d22 = 11.0 | n11 = 1.49700 | v11 = 81.61 |
| r23 = −196.811 | d23 = 0.4 | | |
| r24 = 110.430 | d24 = 8.3 | n12 = 1.45650 | v12 = 90.27 |
| r25 = −91.881 | d25 = Variable | | |
| r26 = 369.544 | d26 = 2.1 | n13 = 1.83400 | v13 = 37.34 |
| r27 = 53.799 | d27 = 3.5 | | |

TABLE 11-continued

| ri | di | Nd | vd |
|---|---|---|---|
| r28 = 452.303 | d28 = 5.9 | n14 = 1.49700 | v14 = 81.61 |
| r29 = −69.395 | d29 = 3.6 | | |
| r30 = −39.470 | d30 = 1.8 | n15 = 1.83400 | v15 = 37.34 |
| r31 = −47.130 | d31 = 0.5 | | |
| r32 = 92.644 | d32 = 11.5 | n16 = 1.45650 | v16 = 90.27 |
| r33 = −51.636 | d33 = Variable | | |
| r34 = 0.000 | d34 = 93.5 | n17 = 1.51680 | v17 = 64.17 |

TABLE 12

| | Wide angle end | Telephoto end |
|---|---|---|
| d12 | 40.8 | 4.5 |
| d19 | 8.15 | 6.62 |
| d25 | 2.43 | 3.95 |
| d33 | 10.88 | 16.03 |

Figure 23:
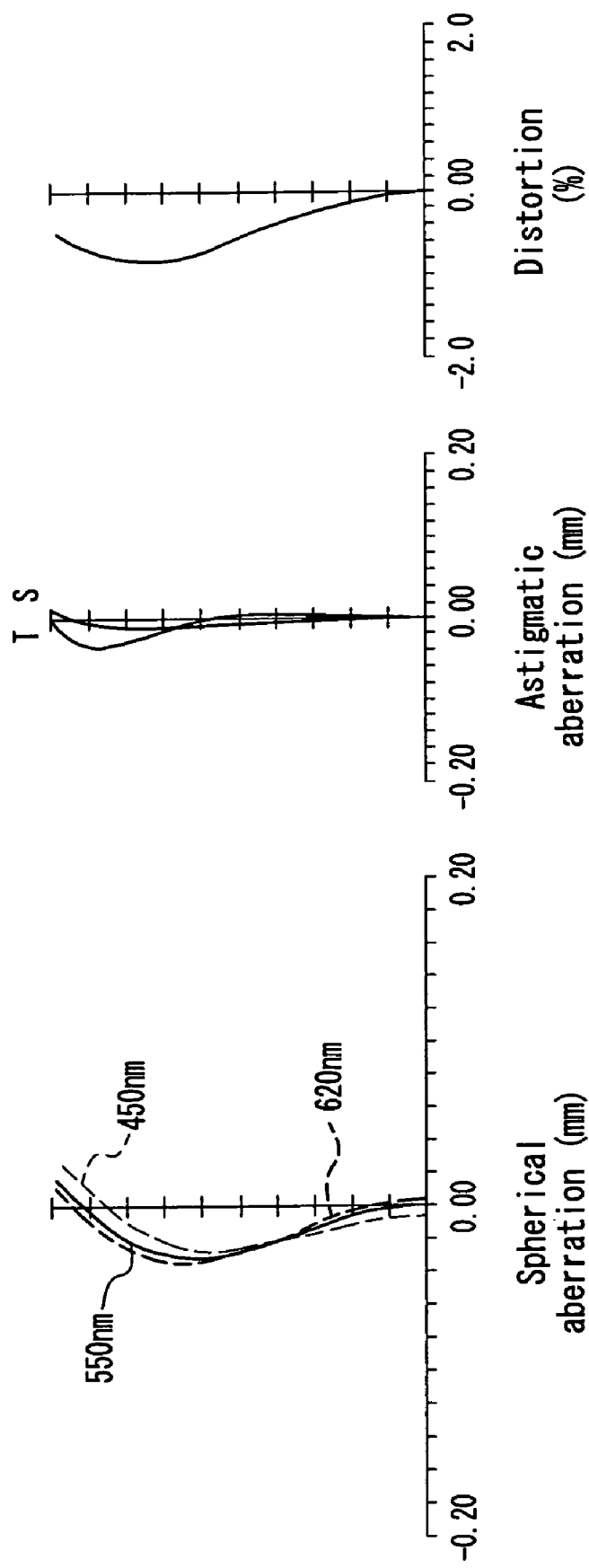
FIG. 23 shows aberration charts for the wide angle end according to Working Example 5 of the present invention.
Figure 24:
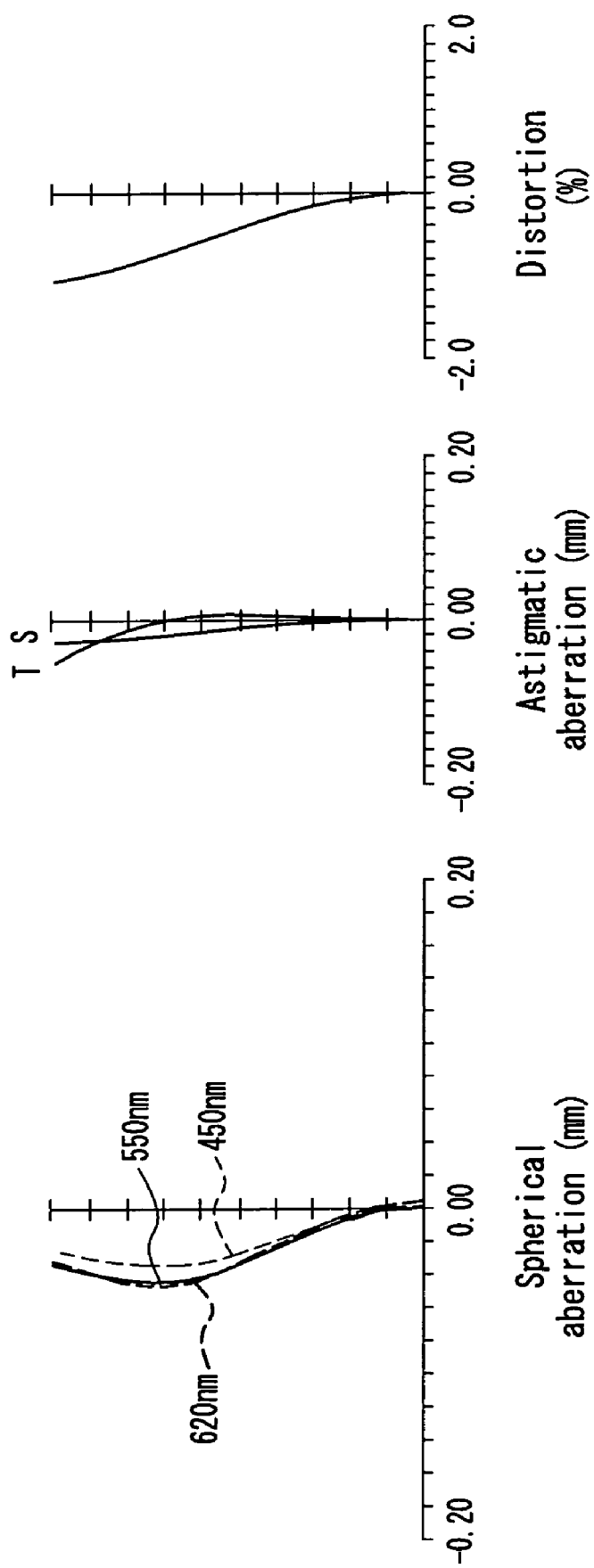
FIG. 24 shows aberration charts for the telephoto end according to Working Example 5 of the present invention.

The charts in FIG. 23 and FIG. 24 respectively show the aberration charts of the wide angle end of Working Example 5 and the telephoto end. It can be seen that the zoom lens according to Working Example 5 shows favorable performance with respect to aberration.

WORKING EXAMPLE 6

Figure 25:
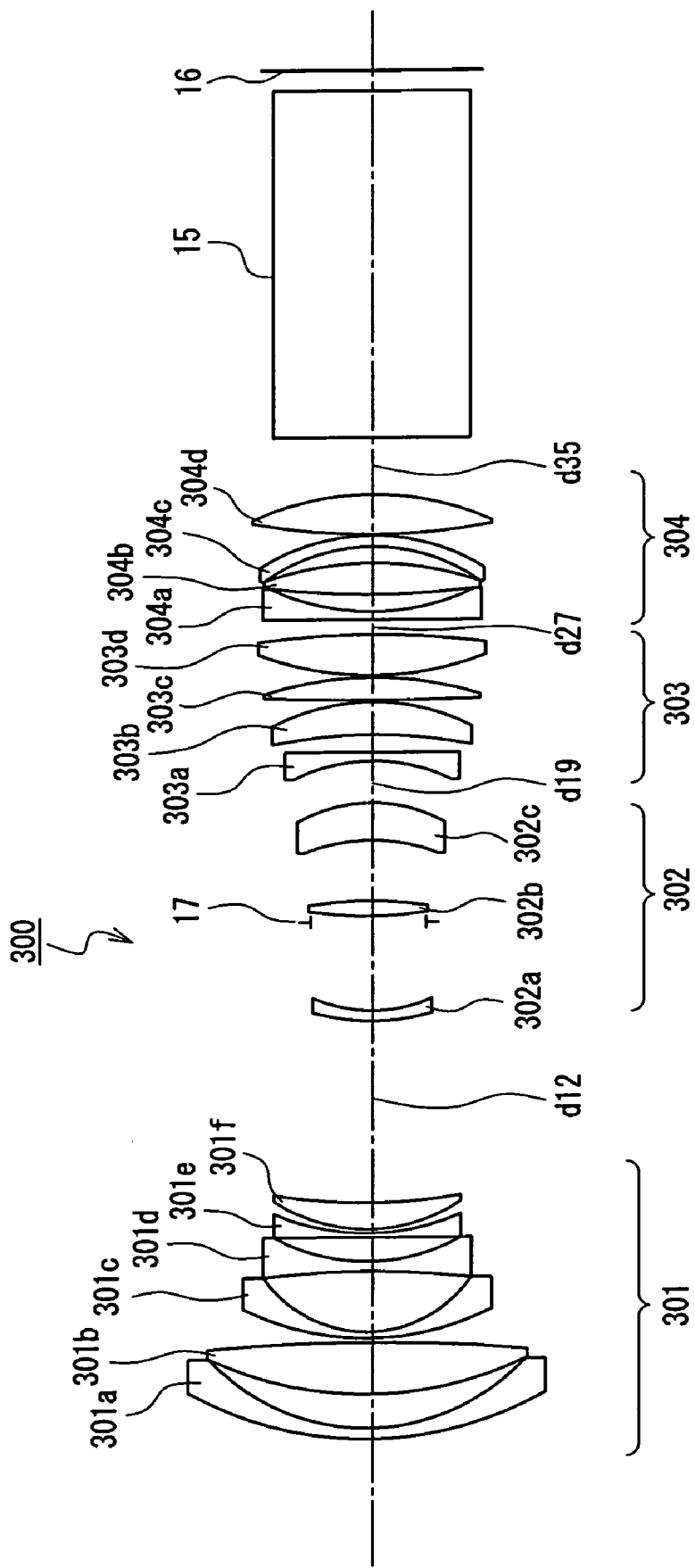
FIG. 25 is a view of the configuration of the wide angle end of a zoom lens according to Working Example 6 of the present invention.
Figure 26:
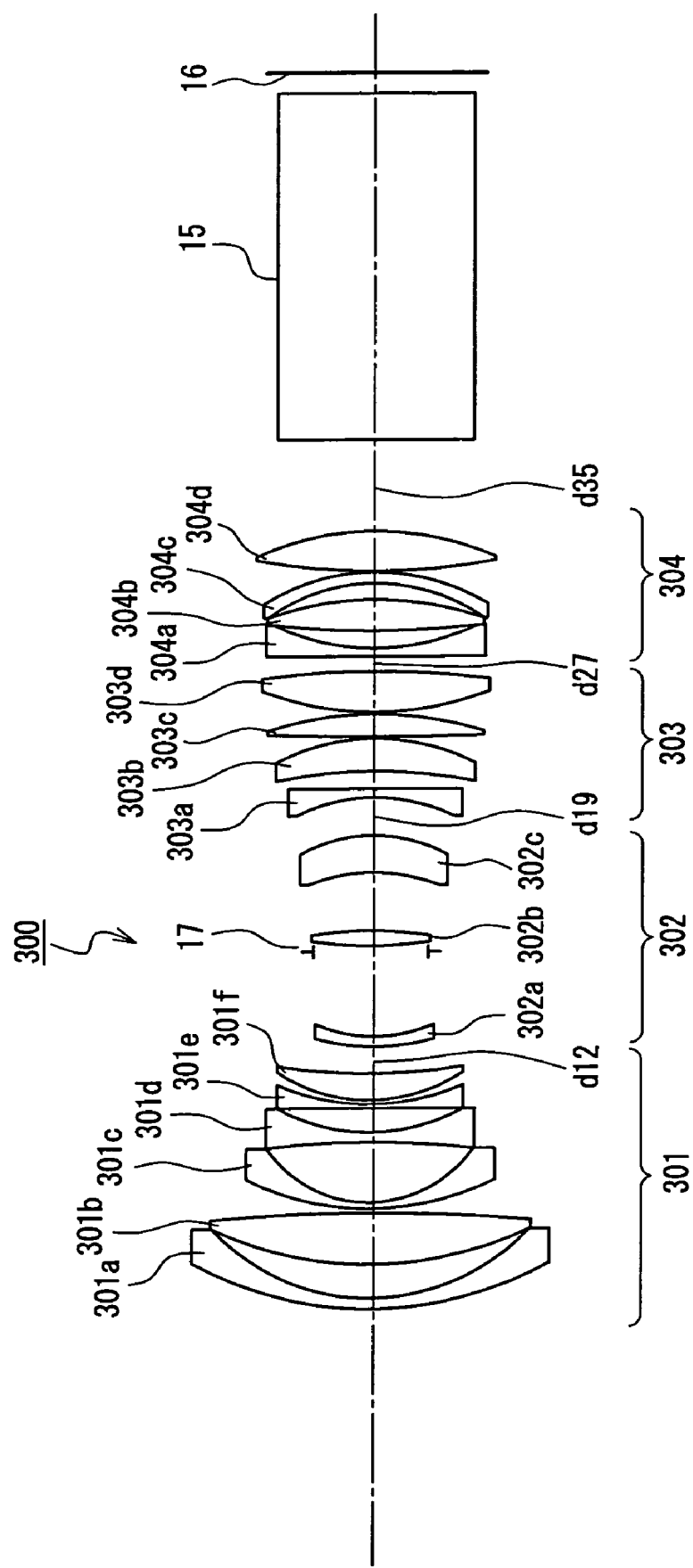
FIG. 26 is a view of the configuration of the telephoto end of the zoom lens according to Working Example 6 of the present invention.

FIG. 25 is a view of a configuration of the wide angle end of a zoom lens according to Working Example 6. FIG. 26 is a view of a configuration of the telephoto end of the zoom lens shown in FIG. 25. A zoom lens 300 shown in FIG. 25 has a four-group configuration, and is provided with a first lens group 301 that has negative refractive power (lenses 301a to 301f), a second lens group 302 that has positive refractive power (lenses 302a to 302c), a third lens group 303 that has positive refractive power (lenses 303a to 303c) and a fourth lens group 304 that has positive refractive power (lenses 304a to 304d), in the order as seen from the side with the longer conjugate distance.

Furthermore, when changing magnification from the wide angle end (FIG. 25) to the telephoto end (FIG. 26), the first lens group 301 moves to the side having the shorter conjugate distance, the second lens group 302 moves to the side having the longer conjugate distance, the third lens group 303 moves to the side having the longer conjugate distance, and the fourth lens group 204 moves to the side having the longer conjugate distance.

Working Example 6 is a design example having $F_{NO}=2.4$ at the wide angle end, a focal length f=28.93 and a half angle of view of 30.9°. The values of the above noted Expressions (13) to (22) in Working Example 6 are as follows:

$bfw/fw=2.79$ Expression (13)

$fw/f1g=-0.38$ Expression (14)

$fw/f2g=0.29$ Expression (15)

$fw/f3g=0.245$ Expression (16)

$fw/f4g=0.096$ Expression (17)

$(1/f1abe1)/(1/frear)=-0.012$ Expression (18)

$nd11=1.784$ Expression (19)

$nd4=1.834$ Expression (20)

$vd4=37.3$ Expression (21)

$f4r/bfw=3.75.$ Expression (22)

Next, specific figures are shown in Table 13, and zoom data is shown in Table 14. In the example of Table 13, r1 to r12 is the first lens group, r13 to r19 is the second lens group, r20 to r27 is the third lens group, r28 to r35 is the fourth lens group, and r15 is the aperture stop.

TABLE 13

| ri | di | Nd | vd |
|---|---|---|---|
| r1 = 100.250 | d1 = 3.4 | n1 = 1.78472 | v1 = 25.72 |
| r2 = 62.092 | d2 = 8.7 | | |
| r3 = 102.718 | d3 = 13.7 | n2 = 1.58913 | v2 = 61.25 |
| r4 = −412.312 | d4 = 0.8 | | |
| r5 = 90.301 | d5 = 2.6 | n3 = 1.49700 | v3 = 81.61 |
| r6 = 37.482 | d6 = 15.6 | | |
| r7 = −153.337 | d7 = 2.1 | n4 = 1.49700 | v4 = 81.61 |
| r8 = 58.722 | d8 = 7.3 | | |
| r9 = 337.645 | d9 = 2.1 | n5 = 1.49700 | v5 = 81.61 |
| r10 = 76.109 | d10 = 0.9 | | |
| r11 = 57.062 | d11 = 7.3 | n6 = 1.71736 | v6 = 29.50 |
| r12 = 187.320 | d12 = Variable | | |
| r13 = 58.649 | d13 = 2.7 | n7 = 1.88300 | v7 = 40.80 |
| r14 = 35.295 | d14 = 23.7 | | |
| r15 = 0.000 | d15 = 1.0 | | |
| r16 = 216.102 | d16 = 4.5 | n8 = 1.71736 | v8 = 29.50 |
| r17 = −84.450 | d17 = 15.8 | | |
| r18 = −53.730 | d18 = 10.2 | n9 = 1.56883 | v9 = 56.04 |
| r19 = −39.951 | d19 = Variable | | |
| r20 = −44.802 | d20 = 2.7 | n10 = 1.83500 | v10 = 42.98 |
| r21 = −477.367 | d21 = 4.1 | | |
| r22 = 144.976 | d22 = 9.0 | n11 = 1.49700 | v11 = 81.61 |
| r23 = −55.671 | d23 = 0.5 | | |
| r24 = 789.245 | d24 = 5.9 | n12 = 1.49700 | v12 = 81.61 |
| r25 = −90.970 | d25 = 0.3 | | |
| r26 = 72.267 | d26 = 11.3 | n13 = 1.45650 | v13 = 90.27 |
| r27 = −217.365 | d27 = Variable | | |
| r28 = 752.473 | d28 = 2.8 | n14 = 1.83400 | v14 = 37.34 |
| r29 = 60.655 | d29 = 4.7 | | |
| r30 = 287.456 | d30 = 7.8 | n15 = 1.49700 | v15 = 81.61 |
| r31 = −85.523 | d31 = 4.9 | | |
| r32 = −45.608 | d32 = 2.6 | n16 = 1.83400 | v16 = 37.34 |
| r33 = −55.469 | d33 = 0.7 | | |
| r34 = 166.870 | d34 = 10.4 | n17 = 1.45650 | v17 = 90.27 |
| r35 = −72.557 | d35 = Variable | | |
| r36 = 0.000 | d36 = 91.5 | n18 = 1.51680 | v18 = 64.17 |

TABLE 14

| | Wide angle end | Telephoto end |
|---|---|---|
| d12 | 48.7 | 6.1 |
| d19 | 11.0 | 9.4 |
| d27 | 3.3 | 4.95 |
| d35 | 15.5 | 23.4 |

Figure 27:
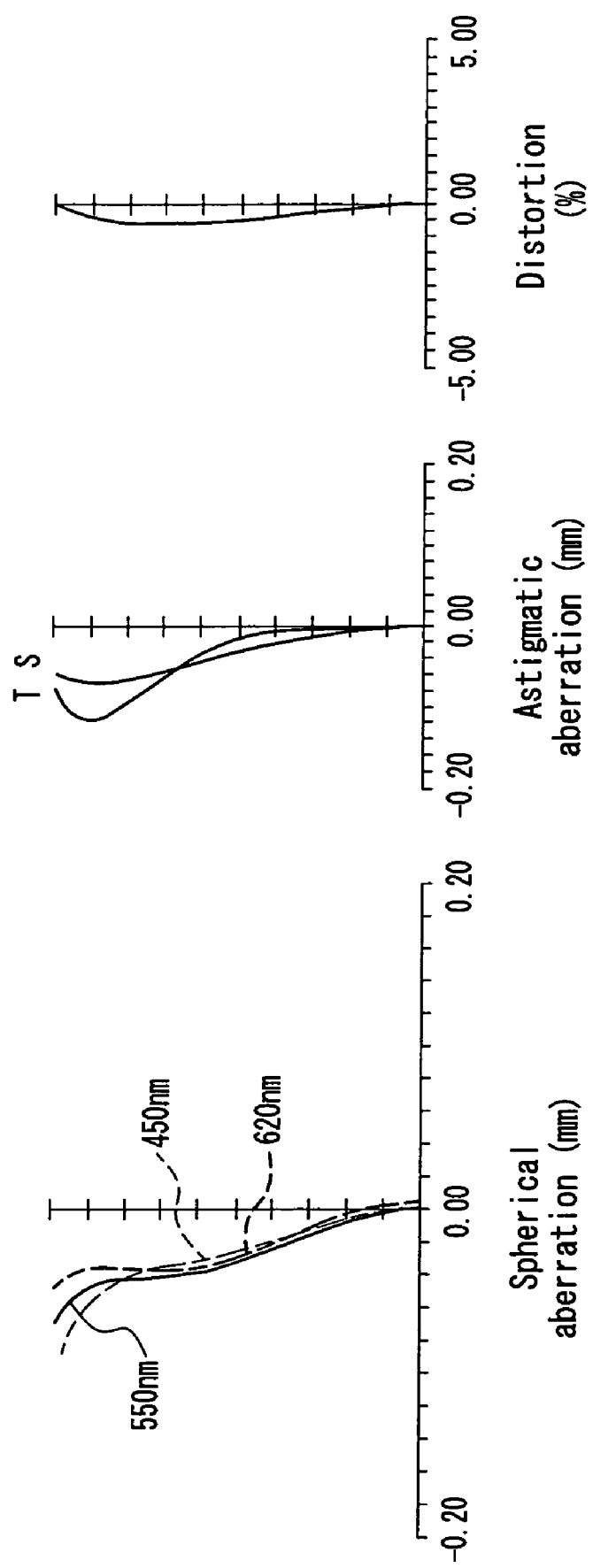
FIG. 27 shows aberration charts for the wide angle end according to Working Example 6 of the present invention.
Figure 28:
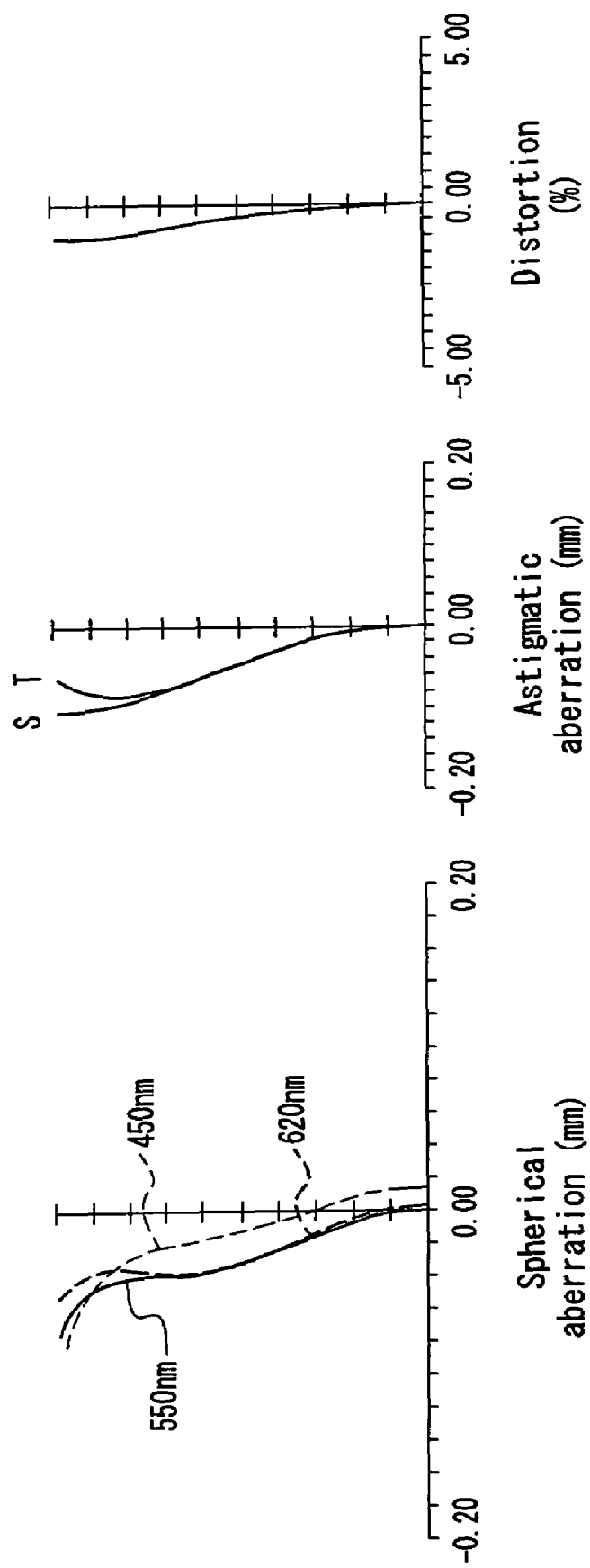
FIG. 28 shows aberration charts for the telephoto end according to Working Example 6 of the present invention.

The charts in FIG. 27 and FIG. 28 respectively show the aberration charts of the wide angle end of Working Example 6 and the telephoto end. It can be seen that the zoom lens according to Working Example 6 shows favorable performance with respect to aberration.

EMBODIMENT 5

Figure 29:
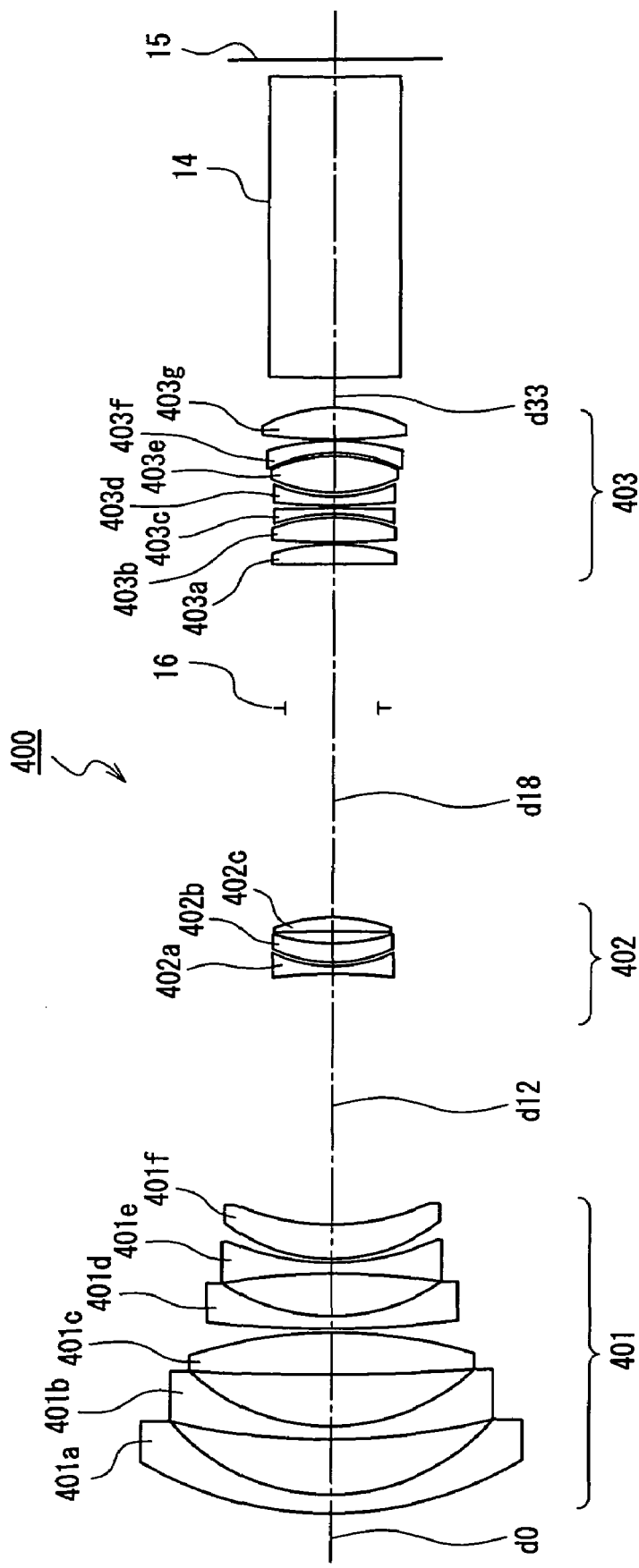
FIG. 29 is a view of the configuration of the wide angle end of a wide angle lens according to Embodiment 5 of the present invention.

FIG. 29 shows a view of a configuration of a wide angle lens according to Embodiment 5. A wide angle lens 400 shown in the diagram has a three-group configuration that is provided, as seen from the side having the longer conjugate distance, with a first lens group 401 that has negative refractive power (lens 401a to 401f), a second lens group 402 (lens 402a to 402c) and a third lens group 403 that has positive refractive power (lens 403a to 403g). The refractive power of the second lens group 402 is weaker than that of the first lens group 401 and the third lens group 403. More specifically, it is preferable that the refractive power of the second lens group 402 is less than about ⅕ the refractive power of the first lens group 401 and the third lens group 403, and may be one tenth of the power or less. This is the same in the configuration shown in FIG. 31 and FIG. 33 below.

Numeral 14 denotes a glass block such as a prism. Numeral 15 denotes an image surface, and in the case of an image-taking system denotes film or CCDs, and in the case of a projection device, it denotes LCDs, for example, which are spatial modulating elements. Furthermore, an aperture stop 16 is disposed between the second lens group 402 and the third lens group 403. It should be noted that in the example of this diagram, the side with the longer conjugate distance is the side that is opposite the image surface 15 (similarly with FIG. 31 and FIG. 33).

When the wide angle lens 400 changes magnification from near to far, the first lens group 401 and the third lens group 403 move toward the side having the shorter conjugate distance, and the second lens group 402 moves so as to reduce an interval d12 between the second lens group 402 and the first lens group 401.

The first lens group 401 is constituted by six lenses, a negative lens 401a, a negative lens 401b, a positive lens 401c, a negative lens 401d, a negative lens 401e and a positive lens 401f, in that order from the side having the longer conjugate distance. The second lens group 402 is constituted by three lenses, a negative lens 402a, a positive lens 402b and a positive lens 402c, in that order from the side having the longer conjugate distance. When the projection distance changes, the second lens group 402 changes the interval between it and the first lens group 401 and the third lens group 403 to correct aberrations.

The third lens group 403 has positive refractive power. Since the third lens group 403 has a significant influence on distortion and lateral chromatic aberration, it is configured to suppress these aberrations effectively.

Thus, a wide angle lens that has a long back focus is realized by configuring the wide angle lens 400 with three groups, the first lens group 401, which has negative refractive power, the second lens group 402, which has weak refractive power, and the third lens group 403, which has positive refractive power, in that order as seen from the side having the longer conjugate distance.

The wide angle lens 400 is described more specifically below. The wide angle lens 400 is based on a reverse telephoto-type (retro focus-type) lens that is constituted by lens groups having negative, positive refractive power. Reverse telephoto-type lenses are characterized in that a long back focus may be obtained easily, however its optical performance is easily altered with changes in the projection distance. Thus, in the present embodiment, design alterations have been made to the focusing method with respect to changes in projection distance.

More specifically, when the magnification is changed from near to far, the wide angle lens 400 of the present embodiment is set such that in addition to moving all the lens groups from the first lens group 401 to the third lens group 403 in the direction of the optical axis, the second lens group 402 is provided with movement that is different from the movement of the first lens group 401 and the third lens group 403. That is to say, the second lens group 402 is moved so as to reduce the air space between the first lens group 401 and the second lens group 402, and to increase the air space between the second lens group 402 and the third lens group 403. Thus, as is described in detail below, the wide angle lens 400 is arranged such that its optical performance does not change with respect to changes in the projection distance.

The second lens group 402 has refractive power that is weaker than the refractive power of the first lens group 401 and the third lens group 403. The second lens group 402 is constituted by the lens 402a, which is a concave lens, and the lenses 402b and 402c, which are convex lenses, however a glass material that has a low refractive power is used for the concave lens, and a glass material that has a high refractive index is used for the convex lenses. Since the refractive power of the second lens group 402 is weak, although the power of the convex lenses and the concave lens is the same, the concave lens that has a low refractive index generates a large aberration, and as a result, the second lens group 402 generates positive spherical aberration.

The first lens group 401 has negative refractive power, but since the axial ray is low and there are many lenses provided to constitute the first lens group 401, the first lens group corrects the spherical aberration to a sufficiently small value. Because the axial ray from the third lens group 403 passes through a high position, and the Petzval Sum may be suppressed to a small value, a glass material that has a low refractive index is used for the convex lens and thus the third lens group 403 generates negative spherical aberration. In this way, the spherical aberration of the first lens group 401 is ±zero, that of the second lens group 402 is positive, and that of the third lens group 403 is negative, and thus the entire body from the first lens group 401 to the third lens group 403 balances the spherical aberration.

In order to suppress the overall aberration of the entire wide angle lens 400 to a small value, the aberration that is generated by the lens groups and the interval between the lens groups is important. When considering the side having the longer conjugate distance, the first lens group 11 suppresses the spherical aberration to a small value, and thus even if the interval with the lens group 402 changes, there is no change in the spherical aberration of the entire wide angle lens 400.

On the other hand, because the second lens group 402 has positive spherical aberration, if the interval with the third lens group 403 increases, then the influence of the plus spherical aberration of the second lens group 402 increases and the entire wide angle lens 400 attains plus spherical aberration.

However, the height of the principal ray of the second lens group 402 is high, and the second lens group 402 has a greater influence on astigmatic aberration than on spherical aberration, and thus fluctuations in aberration with movement of the second lens group 402 appear in prominent astigmatic aberration rather than spherical aberration. Thus, if such fluctuations in astigmatic aberration due to movement of the second lens group 402 are utilized, then by moving the second lens group 402, it is possible to correct fluctuations in aberration caused by fluctuations in the projection distance. If, for example, the second lens group 402 is fixed with respect to the first lens group 401 and the third lens group 403, then astigmatic aberration is generated when the magnification is changed from near to far, but this cannot be corrected.

That is to say, when the magnification is changed from near to far, when the lens groups from the first lens group 401 to the third lens group 403 are moved to the side having the shorter conjugate distance, the wide angle lens 400 of the present embodiment is able to handle fluctuations in the projection distance by moving the second lens group 402 along the optical axis such that the air space with the first lens group 401 is reduced and can correct astigmatic aberration.

In addition to this configuration, if the air equivalent back focus at infinity of the wide angle lens 400 is bf, and the focal length of the wide angle lens is f, then by satisfying Expression (23) below, it is possible to achieve a long back focus while realizing a wide angle lens in which changes in performance due to changes in projection distance are decreased $$4 < bf/f < 6. \tag{23}$$

Expression (23) prescribes the ratio of back focus with respect to the focal length of the entire lens system, and prescribes the back focus required for the projecting lens used in the projector.

In particular, if the projector uses reflective-type elements for the spatial modulating elements, then in addition to the color combining prism, a prism block for guiding the illuminated light is disposed between the projecting lens and the spatial modulating elements. Thus, a long back focus is required for the projecting lens used in a projector.

More specifically, when the lower limit of Expression (23) is not met, it may be impossible to obtain the necessary space between the projecting lens and the spatial modulating elements, and it may be impossible to configure the projector. Furthermore, if the upper limit is exceeded, then the overall length, and the outer diameter increases, and it may be impossible to make the lens more compact.

The present embodiment is configured such that when changing magnification from near to far, all the lens groups from the first lens group 401 to the third lens group 403 move in the direction of the optical axis, and such that the second lens group 402 moves differently from the first lens group 401 and the third lens group 403. In this configuration, when changing the magnification from near to far, it is preferable that the first lens group 401 and the third lens group 403 move in the same way on the optical axis. Accordingly, the first lens group 401 and third lens group 403 move together during focusing while being fixed with respect to each other, and thus it is possible to simplify the lens barrel construction.

A configuration of the present embodiment that is preferable in terms of optical performance is described below. When the focal length of the first lens group 401 is f1g, the focal length of the second lens group 402 is f2g, the focal length of the third lens group 403 is f3g, and the focal length of the wide angle lens 400 is f, it is preferable that the present embodiment satisfies Expressions (24) to (26) below $$-0.4 < f/f1g < -0.15 \tag{24}$$

$$-0.2 < f/f2g < 0.05 \tag{25}$$

$$0.15 < f/f3g < 0.25. \tag{26}$$

By satisfying Expressions (24) to (26), it is possible to realize a wide angle lens that is compact, and in which distortion aberration and chromatic aberration is corrected favorably. Expression (24) is an expression that prescribes the focal length of the first lens group 401 by the ratio to the focal length of the entire lens, and when the lower limit is not met, it may be impossible to correct the Petzval Sum, and curvature of field and astigmatic aberration increase. When the upper limit is exceeded, it may be impossible to ensure the back focus, and if an attempt is made to ensure the back focus, then the entire optical length of the zoom lens increases, as does the outer diameter of the first lens group 401.

Expression (25) is an expression that prescribes the focal length of the second lens group 402 by the ratio to the focal length of the entire lens. When the lower limit is not met, it may become impossible to correct astigmatic aberration that occurs due to changes in the projection distance by moving the second lens group 402. When the upper limit is exceeded, it may be impossible to ensure the back focus.

Expression (26) is an expression that prescribes the focal length of third lens group 403 the ratio to the focal length of the entire lens. When the lower limit is not met, the entire length of the lens increases, and when the upper limit is exceeded, it may be impossible to ensure the back focus, and it may also be impossible to correct distortion aberration or lateral chromatic aberration.

Next, it is preferable that the wide angle lens 400 of the present embodiment satisfies Expressions (27) and (28) below:

$$-0.025 < (1/f1/abe1)/(1/f3g) < -0.008 \tag{27}$$

$$1.7 < nd11 < 1.79 \tag{28}$$

where f1 is the focal length of the front negative lens, as seen from the side having the longer conjugate distance (the lens 401a of the first lens group 401), where abe1 is the Abbe number and where nd11 is the refractive index at the d line, and where f3g is the focal length of the third lens group 403.

When the third lens group 403 corrects chromatic aberration, blue lateral chromatic aberration is over-corrected. The lens that cancels out this over-correction of blue lateral chromatic aberration is the negative lens 401a, which is at the front as seen from the side having the longer conjugate distance. The amount of blue lateral chromatic aberration that is generated by the negative lens 401a cancels out the over-correction of the blue lateral chromatic aberration that is generated at the third lens group and it is possible to suppress the lateral chromatic aberration to a small value.

Expression (27) represents the relationship between the amount of blue lateral chromatic aberration that is generated by the negative lens 401 (f1/abe1) to the amount of over-correction of the blue lateral chromatic aberration that is generated by the third lens group 403 (f3g). When the lower limit is not met, correction of the blue lateral chromatic aberration and correction of the red lateral chromatic aberration become insufficient. When the upper limit is exceeded, over-correction of the blue lateral chromatic aberration increases.

It is preferable that the refractive index of the negative lens 401a is high, and that it has a small Abbe number. However, a glass material such as was noted above is characterized in that the internal transmittance degrades. Expression (28) prescribes the refractive index of the negative lens 401a. When the lower limit is not met, it may be impossible to reduce the over-correction of the blue lateral chromatic aberration, and when the upper limit is exceeded, the interal transparency ratio decreases, and the color balance worsens.

Next, the four lenses on the side having the shorter conjugate distance (the lenses 403d to 403g of the third lens group) are arranged in order, from the side having the longer conjugate distance, of a negative meniscus lens whose convex surface faces the side having the longer conjugate distance (the lens 403d), a positive lens (the lens 403e), a negative meniscus lens whose convex surface faces the side having the shorter conjugate distance (the lens 403f) and a positive lens (the lens 403g). It is preferable to satisfy the Expressions (29) to (31) below:

$$nd4>1.75 \tag{29}$$

$$vd4>35 \tag{30}$$

$$1<f4r/bf<1.5 \tag{31}$$

where nd4 is the refractive index at the d line of the negative meniscus lens 403d, which is on the side having the longer conjugate distance, where vdf is the Abbe number, where f4r is the focal length of the four lenses from the side having the shorter conjugate distance (lenses 403d to 403g), and where bf is the air equivalent back focus that does not include the prisms or the cover glass.

With this configuration, it is possible to suppress distortion aberration and lateral chromatic aberration to a small value. The lenses on the side having the shorter conjugate distance generate large distortion aberrations and lateral chromatic aberrations, and their power and shape are very important for correcting this.

f4r/bf represents the ratio of the focal length of the four lenses on the side having the shorter conjugate distance to the air equivalent back focus that does not include prisms or a cover glass, and relates to the correction of the distortion aberration and the lateral chromatic aberration, the entire lens length, and the outer diameter of the lens on the side having the longer conjugate distance. By facing the convex surfaces of the two negative meniscus lenses in different directions, they may be applied advantageously to reduce lateral chromatic aberration and distortion aberration. That is to say, the negative meniscus lens whose convex surface faces the side having the longer conjugate distance may be used effectively to correct distortion aberration and the negative meniscus lens whose convex surface faces the side having the shorter conjugate distance may be used effectively to correct lateral chromatic aberration.

Expression (29) and (30) are expressions that prescribe the conditions for suppressing over-correction of blue lateral chromatic aberration through the refractive index and the Abbe number of the negative meniscus lens on the side having the longer conjugate distance. Expression (29) represents the refractive index of the negative meniscus lens on the side having the longer conjugate distance, and when the lower limit is not met, curvature of the field increases. Expression (30) represents the Abbe number of the negative meniscus lens on the side having the longer conjugate distance, and when the lower limit is not met, the lateral chromatic aberration increases. Furthermore, in Expression (30), it is more preferable if vd4>40 is satisfied.

Expression (31) represents the situation in which the focal lengths of the four lenses 403d to 403g, which are on the side having the smaller conjugate distance, are larger than the air equivalent back focus that does not include the prism or the cover glass. It shows use of the lens in a manner in which when an F number light beam is incident on the four lenses from the side having the shorter conjugate distance the light converges toward the side having the shorter conjugate distance. When the lower limit is not met, the outer diameter of the lens on the side having the longer conjugate distance increases, and the distortion aberration and the lateral chromatic aberration increase. When the upper limit is exceeded, the overall length of the lens increases, and it becomes impossible to ensure the back focus.

Furthermore, it is preferable that all the lenses having positive refractive power that constitute the third lens group 403 are configured with a refractive index at the d line of 1.65 or less. With this configuration it is possible to suppress the Petzval Sum, and suppress curvature of the field and astigmatic aberration to small values.

It should be noted that the configuration that satisfies the above-noted Expressions (27) and (28), and the configuration that satisfies the above-noted Expressions (29) to (31) have been described under the precondition that each may be applied to the configuration that satisfies Expression (23), however the effect of satisfying these expressions, such as was described above, may be obtained even with a configuration that does not satisfy the above-noted Expression (23).

WORKING EXAMPLE 7

Working Example 7 according to the present embodiment is shown using specific values. The wide angle lens configuration according to Working Example 7 is the same as the configuration shown in FIG. 29, and in Working Example 7, $F_{NO}$=2.5, focal length f=14.85 and a half angle of view of 38.7° is one design example. The values of Expressions (23) to (31) are shown below:

| | |
|---|---|
| $bf/f$=5.13 | Expression (23) |
| $f/f1g$=−0.25 | Expression (24) |
| $f/f2g$=−0.014 | Expression (25) |
| $f/f3g$=0.217 | Expression (26) |
| $(1/f1/abe1)/(1/f3g)$=−0.012 | Expression (27) |
| nd11=1.7847 | Expression (28) |
| nd4=1.835 | Expression (29) |
| vd4=42.98 | Expression (30) |
| f4r/bf=1.32. | Expression (31) |

Specific figures are shown below in Table 15, and zoom data is shown in Table 16. In Table 15, ri (mm) is the radius of curvature of the lens surface, di (mm) is the lens thickness or the interval between lenses, ni is the refractive index of the lens at the d line, and vi is the Abbe number of the lens at the d line. This is the same in Tables 17 and 19 below. In the example of Table 15, r1 to r12 is the first lens group, r13 to r18 is the second lens group, r20 to r33 is the third lens group and r19 is the aperture stop.

TABLE 15

| ri | di | Nd | vd |
|---|---|---|---|
| r1 = 116.005 | d1 = 5.7 | n1 = 1.78472 | v1 = 25.72 |
| r2 = 68.385 | d2 = 16.6 | | |
| r3 = 190.024 | d3 = 4.5 | n2 = 1.48749 | v2 = 70.44 |
| r4 = 64.342 | d4 = 16.0 | | |
| r5 = 670.298 | d5 = 13.5 | n3 = 1.58913 | v3 = 61.25 |
| r6 = −140.817 | d6 = 1.0 | | |
| r7 = 360.131 | d7 = 3.6 | n4 = 1.49700 | v4 = 81.61 |
| r8 = 60.146 | d8 = 13.0 | | |
| r9 = −294.790 | d9 = 3.6 | n5 = 1.49700 | v5 = 81.61 |
| r10 = 79.331 | d10 = 1.0 | | |
| r11 = 52.996 | d11 = 11.3 | n6 = 1.74950 | v6 = 35.04 |
| r12 = 78.491 | d12 = Variable | | |
| r13 = −225.898 | d13 = 3.0 | n7 = 1.61800 | v7 = 63.39 |
| r14 = 39.064 | d14 = 1.0 | | |
| r15 = 40.507 | d15 = 6.0 | n8 = 1.71736 | v8 = 29.50 |
| r16 = 57.648 | d16 = 3.0 | | |
| r17 = 954.029 | d17 = 5.5 | n9 = 1.58144 | v9 = 40.89 |
| r18 = −57.015 | d18 = Variable | | |
| r19 = 0.000 | d19 = 45.7 | | |

TABLE 15-continued

| ri | di | Nd | vd |
|---|---|---|---|
| r20 = −403.167 | d20 = 6.3 | n10 = 1.62004 | v10 = 36.37 |
| r21 = −61.612 | d21 = 0.3 | | |
| r22 = 222.298 | d22 = 7.6 | n11 = 1.49700 | v11 = 81.61 |
| r23 = −64.222 | d23 = 0.8 | | |
| r24 = −52.091 | d24 = 2.6 | n12 = 1.69680 | v12 = 55.46 |
| r25 = −388.361 | d25 = 0.5 | | |
| r26 = 180.162 | d26 = 3.3 | n13 = 1.83500 | v13 = 42.98 |
| r27 = 45.123 | d27 = 1.3 | | |
| r28 = 50.711 | d28 = 12.0 | n14 = 1.45650 | v14 = 90.27 |
| r29 = −47.813 | d29 = 1.0 | | |
| r30 = −40.794 | d30 = 3.2 | n15 = 1.83400 | v15 = 37.34 |
| r31 = −76.870 | d31 = 0.3 | | |
| r32 = 165.101 | d32 = 10.0 | n16 = 1.49700 | v16 = 81.61 |
| r33 = −48.307 | d33 = Variable | | |
| r34 = 0.000 | d34 = 93.5 | n17 = 1.51680 | v17 = 64.17 |
| r35 = 0.000 | d35 = 9.2 | | |

TABLE 16

| Projection distance | 1000 | 2000 | 3000 |
|---|---|---|---|
| d0 | 1000 | 2000 | 3000 |
| d12 | 79.78 | 78.48 | 78.28 |
| d18 | 64.04 | 65.34 | 65.54 |
| d33 | 5.661 | 5.549 | 5.512 |

Figure 30:
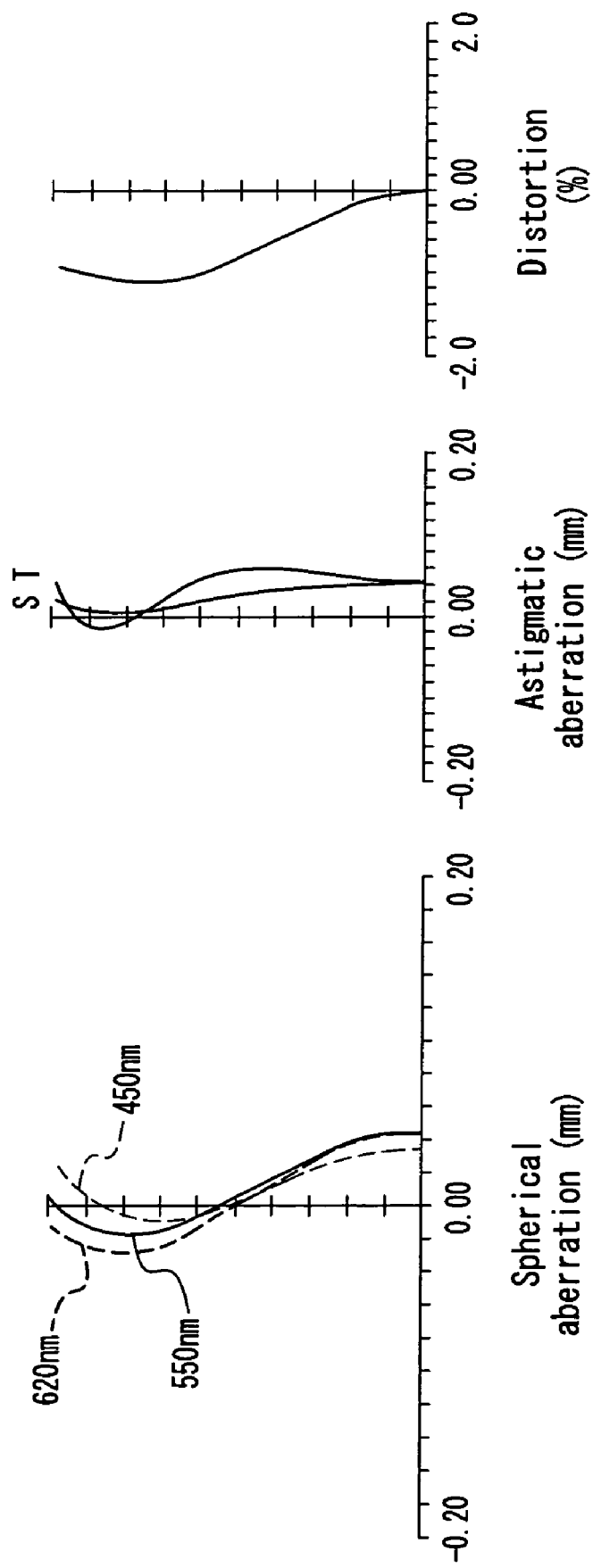
FIG. 30 shows aberration charts according to Working Example 7 of the present invention.

The charts in FIG. 30 show the spherical aberration (mm), astigmatic aberration (mm) and distortion aberration (%) of Working Example 7, and these are the same for FIG. 32 and FIG. 34 below. As can be seen in FIG. 30, the wide angle lens according to Working Example 7 shows favorable performance with respect to aberration.

WORKING EXAMPLE 8

Figure 31:
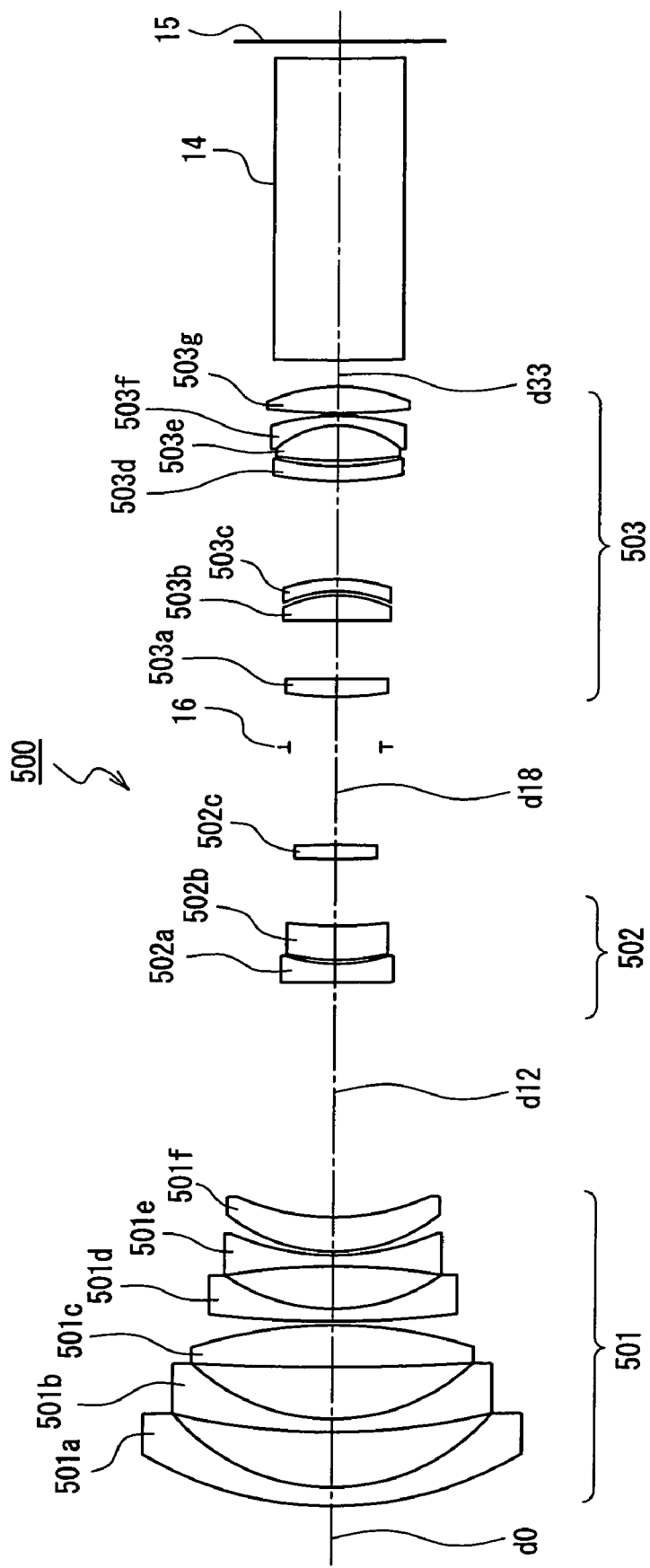
FIG. 31 is a view of the configuration of a wide angle lens according to Working Example 8 of the present invention.

FIG. 31 is a view of a configuration of a wide angle lens according to Working Example 8. A wide angle lens 500 shown in FIG. 31 has a three-group configuration, and is provided with a first lens group 501 that has negative refractive power (lens 501a to 501f), a second lens group 502 that has weak refractive power (lens 502a to 501c) and a third lens group 503 that has positive refractive power (lens 503a to 503g), in the order as seen from the side with the longer conjugate distance. The basic configuration is the same as the wide angle lens 400 shown in FIG. 29.

Working Example 8 has $F_{NO}$=2.5, a focal length f=15.33 and a half angle of view of 36.7°. The values of the above noted Expressions (23) to (31) are shown below:

$bf/f$=4.89      Expression (23)

$f/f1g$=−0.22      Expression (24)

$f/f2g$=−0.016      Expression (25)

$f/f3g$=0.192      Expression (26)

$(1/f1/abe1)/(1/f3g)$=−0.0128      Expression (27)

$nd11$=1.7847      Expression (28)

$nd4$=1.835      Expression (29)

$vd4$=37.2      Expression (30)

$f4r/bf$=1.28.      Expression (31)

Specific figures are shown below in Table 17, and zoom data is shown in Table 18. In the example of Table 17, r1 to r12 is the first lens group, r13 to r18 is the second lens group, r20 to r33 is the third lens group and r19 is the aperture stop.

TABLE 17

| ri | di | Nd | vd |
|---|---|---|---|
| r1 = 103.779 | d1 = 5.8 | n1 = 1.78472 | v1 = 25.72 |
| r2 = 65.775 | d2 = 18.1 | | |
| r3 = 158.849 | d3 = 4.4 | n2 = 1.49700 | v2 = 81.61 |
| r4 = 75.613 | d4 = 14.5 | | |
| r5 = 405.447 | d5 = 12.8 | n3 = 1.58913 | v3 = 61.25 |
| r6 = −163.568 | d6 = 1.0 | | |
| r7 = 294.509 | d7 = 3.5 | n4 = 1.49700 | v4 = 81.61 |
| r8 = 60.801 | d8 = 13.8 | | |
| r9 = −396.870 | d9 = 3.5 | n5 = 1.49700 | v5 = 81.61 |
| r10 = 85.754 | d10 = 1.0 | | |
| r11 = 51.094 | d11 = 12.2 | n6 = 1.74950 | v6 = 35.04 |
| r12 = 66.005 | d12 = Variable | | |
| r13 = 14684.672 | d13 = 5.3 | n7 = 1.61800 | v7 = 63.40 |
| r14 = 38.696 | d14 = 1.0 | | |
| r15 = 51.369 | d15 = 12.0 | n8 = 1.71736 | v8 = 29.50 |
| r16 = 109.984 | d16 = 21.8 | | |
| r17 = 226.742 | d17 = 4.3 | n9 = 1.49700 | v9 = 81.60 |
| r18 = 126.175 | d18 = Variable | | |
| r19 = 0.000 | d19 = 15.6 | | |
| r20 = 80.270 | d20 = 6.6 | n10 = 1.64769 | v10 = 33.84 |
| r21 = 1067.340 | d21 = 18.5 | | |
| r22 = −414.593 | d22 = 8.0 | n11 = 1.49700 | v11 = 81.61 |
| r23 = −37.826 | d23 = 1.0 | | |
| r24 = −37.398 | d24 = 3.5 | n12 = 1.69680 | v12 = 55.46 |
| r25 = −77.336 | d25 = 31.0 | | |
| r26 = 100.586 | d26 = 5.1 | n13 = 1.83400 | v13 = 37.20 |
| r27 = 65.686 | d27 = 1.9 | | |
| r28 = 114.898 | d28 = 11.0 | n14 = 1.45650 | v14 = 90.30 |
| r29 = −31.889 | d29 = 0.2 | | |
| r30 = −31.868 | d30 = 3.2 | n15 = 1.83400 | v15 = 37.20 |
| r31 = −74.308 | d31 = 0.2 | | |
| r32 = 158.251 | d32 = 8.7 | n16 = 1.49700 | v16 = 81.60 |
| r33 = −62.224 | d33 = Variable | | |
| r34 = 0.000 | d34 = 93.5 | n17 = 1.51680 | v17 = 64.17 |
| r35 = 0.000 | d35 = 10.0 | | |

TABLE 18

| Projection distance | 1000 | 2000 | 3000 |
|---|---|---|---|
| d0 | 1000 | 2000 | 3000 |
| d12 | 76.418 | 75.318 | 75.018 |
| d18 | 29.981 | 31.08 | 31.381 |
| d33 | 3.978 | 3.45 | 3.299 |

Figure 32:
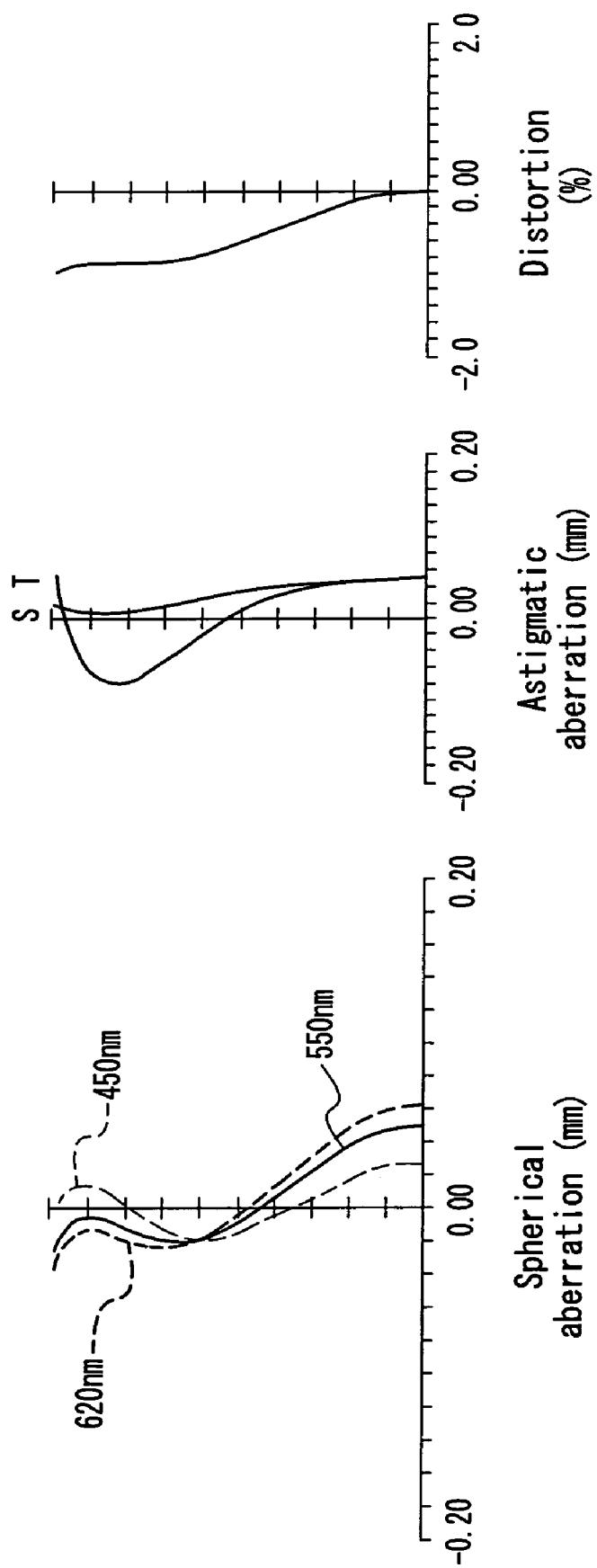
FIG. 32 shows aberration charts according to Working Example 8 of the present invention.

The charts in FIG. 32 show the performance of Working Example 8 with respect to various aberrations and it can be seen that the wide angle lens according to Working Example 8 shows favorable performance with respect to aberration.

WORKING EXAMPLE 9

Figure 33:
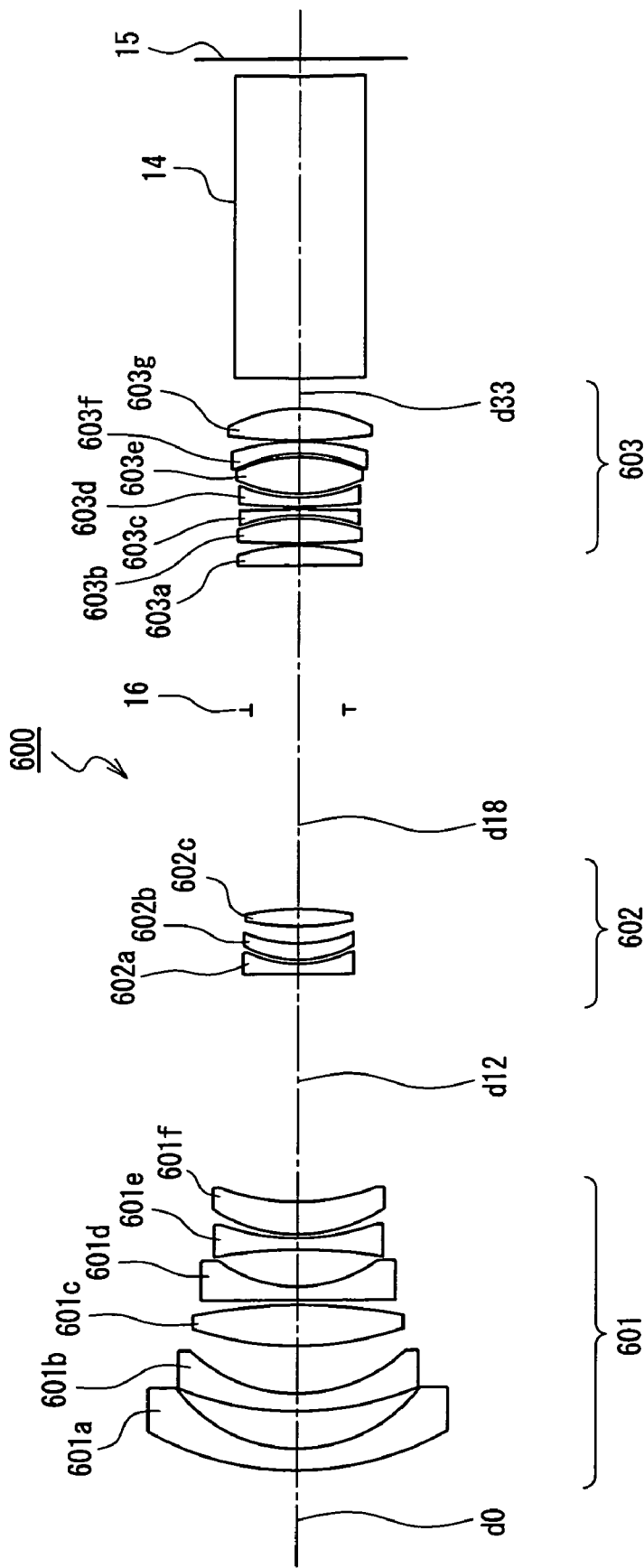
FIG. 33 is a view of the configuration of a wide angle lens according to Working Example 9 of the present invention.

FIG. 33 is a view of a configuration of a wide angle lens according to Working Example 9. A wide angle lens 600 shown in FIG. 33 has a three-group configuration, and is provided with a first lens group 601 that has negative refractive power (lens 601a to 601f), a second lens group 602 that has weak refractive power (lens 602a to 601c) and a third lens group 603 that has positive refractive power (lens 603a to 603g), in the order as seen from the side with the longer conjugate distance. The basic configuration is the same as the wide angle lens 400 shown in FIG. 29.

In Working Example 9, $F_{NO}$=2.5, a focal length f=14.87 and a half angle of view of 38.7°. The values of the above noted Expressions (23) to (31) are shown below:

$bf/f=5.13$　　　　　　　　　　　　　Expression (23)

$f/f1g=-0.336$　　　　　　　　　　　Expression (24)

$f/f2g=-0.0304$　　　　　　　　　　Expression (25)

$f/f3g=0.208$　　　　　　　　　　　Expression (26)

$(1/f1/abe1)/(1/f3g)=-0.0208$　　　Expression (27)

$nd11=1.7847$　　　　　　　　　　　Expression (28)

$nd4=1.835$　　　　　　　　　　　　Expression (29)

$vd4=42.98$　　　　　　　　　　　　Expression (30)

$f4r/bf=1.32.$　　　　　　　　　　　Expression (31)

Specific figures are shown below in Table 19, and zoom data is shown in Table 20. In the example of Table 19, r1 to r12 is the first lens group, r13 to r18 is the second lens group, r20 to r33 is the third lens group and r19 is the aperture stop.

TABLE 19

| ri | di | Nd | vd |
|---|---|---|---|
| r1 = 102.196 | d1 = 5.7 | n1 = 1.78472 | v1 = 25.72 |
| r2 = 50.643 | d2 = 13.0 | | |
| r3 = 108.506 | d3 = 4.5 | n2 = 1.48749 | v2 = 70.44 |
| r4 = 53.567 | d4 = 15.9 | | |
| r5 = 168.848 | d5 = 13.5 | n3 = 1.58913 | v3 = 61.25 |
| r6 = −185.570 | d6 = 1.0 | | |
| r7 = −998.071 | d7 = 3.6 | n4 = 1.49700 | v4 = 81.61 |
| r8 = 47.844 | d8 = 12.0 | | |
| r9 = −196.997 | d9 = 3.6 | n5 = 1.49700 | v5 = 81.61 |
| r10 = 85.511 | d10 = 1.0 | | |
| r11 = 51.604 | d11 = 11.3 | n6 = 1.74950 | v6 = 35.04 |
| r12 = 87.625 | d12 = Variable | | |
| r13 = 640.032 | d13 = 3.0 | n7 = 1.61800 | v7 = 63.39 |
| r14 = 40.218 | d14 = 1.0 | | |
| r15 = 41.292 | d15 = 6.0 | n8 = 1.71736 | v8 = 29.50 |
| r16 = 52.118 | d16 = 5.4 | | |
| r17 = 98.819 | d17 = 5.5 | n9 = 1.58144 | v9 = 40.89 |
| r18 = −98.560 | d18 = Variable | | |
| r19 = 0.000 | d19 = 45.7 | | |
| r20 = −924.647 | d20 = 6.3 | n10 = 1.62004 | v10 = 36.37 |
| r21 = −74.737 | d21 = 0.3 | | |
| r22 = 236.715 | d22 = 7.6 | n11 = 1.49700 | v11 = 81.61 |
| r23 = −55.254 | d23 = 0.8 | | |
| r24 = −51.097 | d24 = 2.6 | n12 = 1.69680 | v12 = 55.46 |
| r25 = −676.690 | d25 = 0.5 | | |
| r26 = 198.825 | d26 = 3.3 | n13 = 1.83500 | v13 = 42.98 |
| r27 = 44.573 | d27 = 1.3 | | |
| r28 = 49.226 | d28 = 12.0 | n14 = 1.45650 | v14 = 90.27 |
| r29 = −46.103 | d29 = 1.0 | | |
| r30 = −40.409 | d30 = 3.2 | n15 = 1.83400 | v15 = 37.34 |
| r31 = −74.935 | d31 = 0.3 | | |
| r32 = 149.243 | d32 = 10.0 | n16 = 1.49700 | v16 = 81.61 |
| r33 = −50.445 | d33 = Variable | | |
| r34 = 0.000 | d34 = 93.5 | n17 = 1.51680 | v17 = 64.17 |
| r35 = 0.000 | d35 = 10.0 | | |

TABLE 20

| Projection distance | 1000 | 2000 | 3000 |
|---|---|---|---|
| d0 | 1000 | 2000 | 3000 |
| d12 | 73.33 | 71.73 | 71.23 |
| d18 | 60.90 | 62.50 | 63.00 |
| d33 | 4.736 | 4.752 | 4.753 |

Furthermore, when X is the amount of offset from the lens apex at the position of a radial distance h of the aperture from the optical axis, the shape of the aspherical surface is a rotatably symmetrical aspherical surface that is represented by Formula 1 below Formula 1

$$X = \frac{h^2/r}{1+\{1-(h/r)^2\}^{1/2}} + \sum_{i=4}^{10} Ai \cdot h^i.$$

Figure 34:
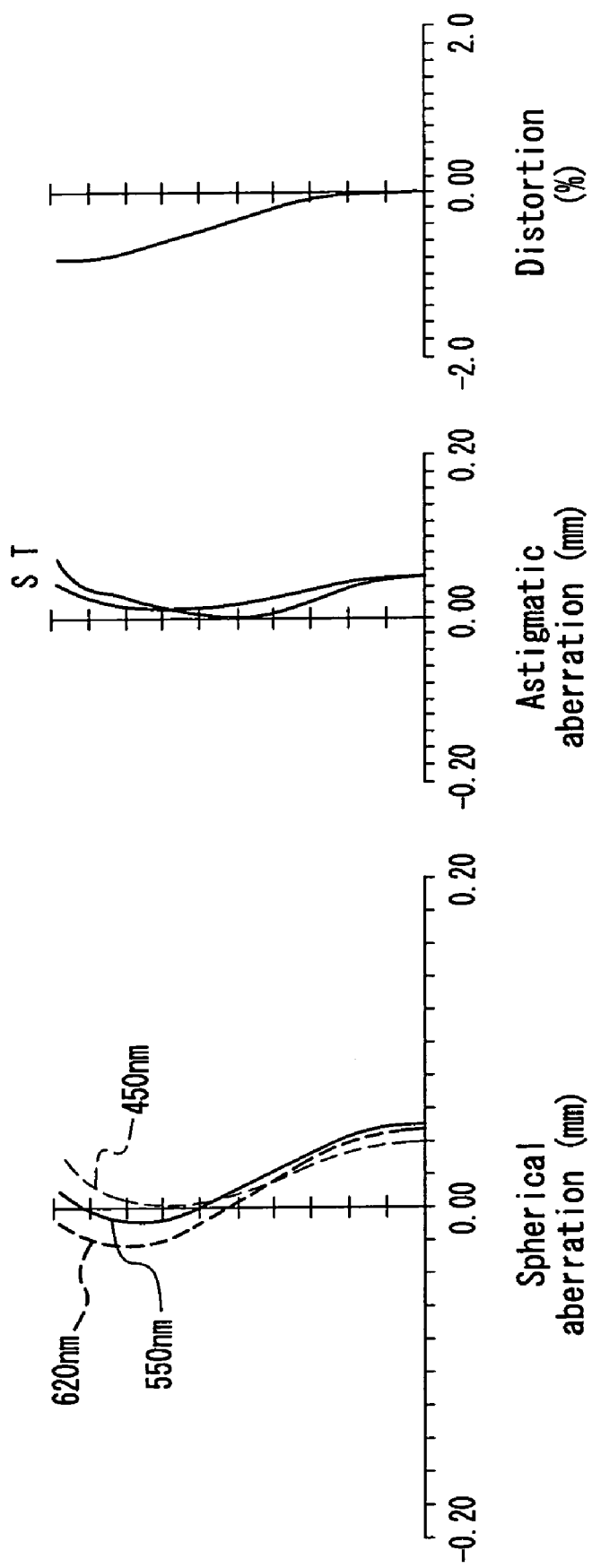
FIG. 34 shows aberration charts according to Working Example 9 of the present invention.

The aspherical coefficients of the surfaces are shown below
Aspherical coefficients of five faces $A4=9.45575\times10^{-007}$ $A6=-1.53739\times10^{-010}$ $A8=1.08192\times10^{-013}.$ The charts in FIG. 34 show the performance of Working Example 9 with respect to the various aberrations and it can be seen that the wide angle lens according to Working Example 9 shows favorable performance with respect to aberration.

EMBODIMENT 6

Figure 35:
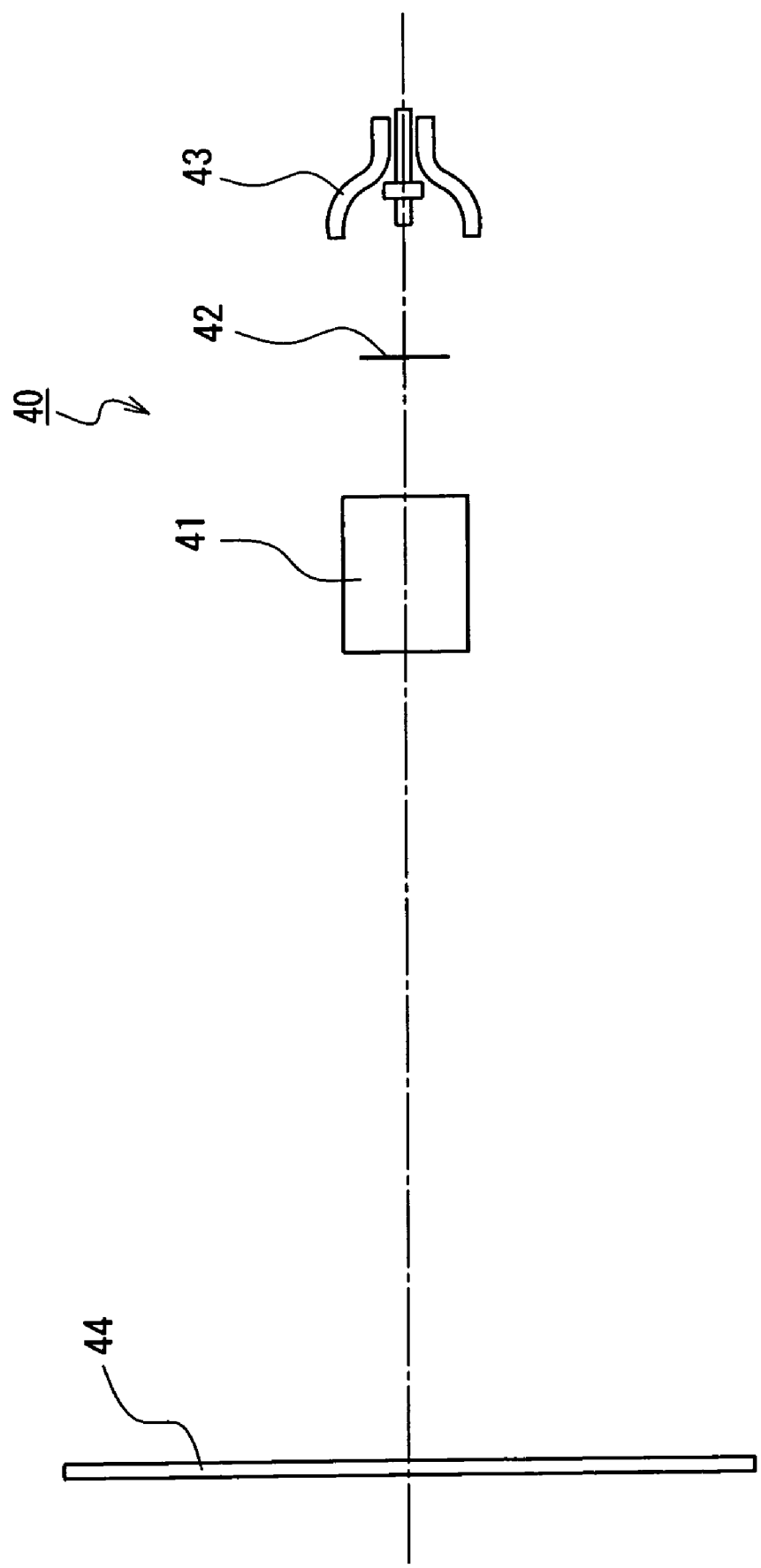
FIG. 35 is a view of the configuration of a video enlarging/projecting system according to Embodiment 6 of the present invention.

FIG. 35 is a view of a configuration of a video enlarging/projecting system 40 according to Embodiment 6 of the present invention. The video enlarging/projecting system 40 is provided with a projecting lens 41 that is constituted by any zoom lens or wide angle lens according to Embodiments 1 to 5, a spatial optical modulating element 42 for forming an optical image, and a light source 43.

Numeral 44 denotes a focus surface for the image that is projected. The optical image that is formed by the spatial optical modulating element 42 that is illuminated by the light source 43 is enlarged and projected onto the focus surface 44.

The video enlarging projecting system 40 according to the present embodiment uses any of the zoom lenses or wide angle lenses according to the Embodiments 1 to 5, as the projecting lens 41, and thus it is possible to obtain a screen that has little distortion or color bleeding.

EMBODIMENT 7

Figure 36:
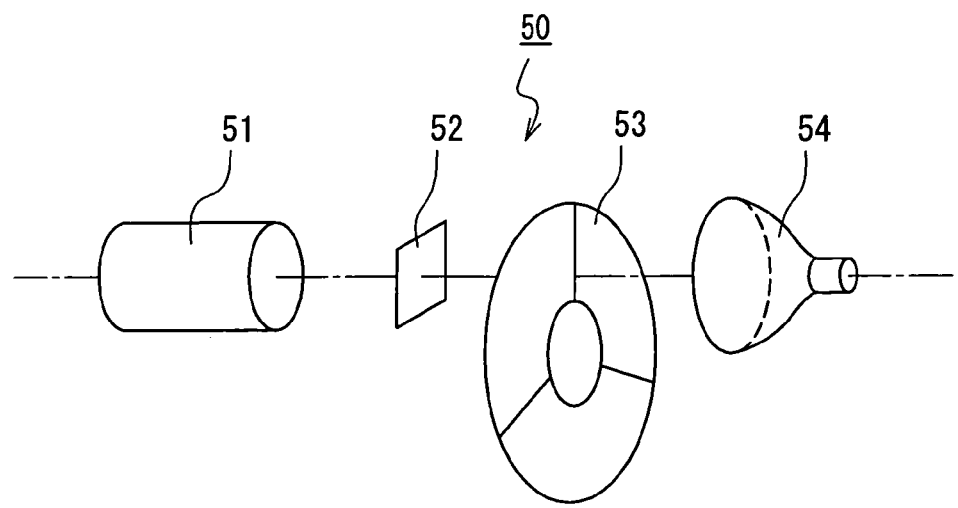
FIG. 36 is a view of the configuration of a video projector according to Embodiment 7 of the present invention.

FIG. 36 is a view of a configuration of a video projector 50 according to Embodiment 7 of the present invention. The video projector 50 is provided with a projecting lens 51 that is constituted by any zoom lens or wide angle lens according to Embodiments 1 to 5, a spatial optical modulating element 52 for forming an optical image, rotating means 53 and a light source 54.

Each of three types of color optical images, blue, green and red, is temporally separated and formed on the spatial optical modulating element 52. The rotating means 53 temporally restricts the optical image to the three colors of blue, green and red by rotating a filter that corresponds to blue, green and red.

Light from the light source 54 is temporally broken down into the three colors of blue, green and red by the rotating means 53, and illuminates the spatial optical modulating element 52. The three types of color optical images, blue, green and red, are temporally separated and formed on the spatial optical modulating element 52, and enlarged and projected by the projecting lens 51.

By using a zoom lens according to any one of Embodiment 1 to 3 as the projecting lens 51, it is possible to obtain a screen that is bright, and that has little distortion or color bleeding. By using the zoom lens of Embodiment 4, it is possible to realize a compact video projector by which an image that is bright and that has little distortion or image bleeding may be obtained. By using the wide angle lens of Embodiment 5, it is possible to realize a video projector that is capable of use over a short projection distance.

EMBODIMENT 8

Figure 37:
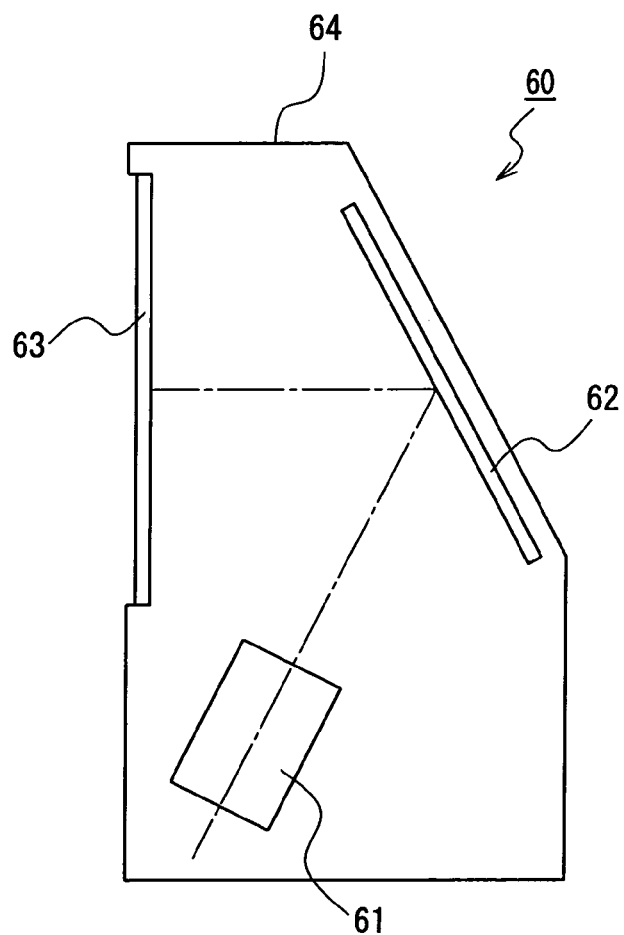
FIG. 37 is a view of the configuration of a rear projector according to Embodiment 8 of the present invention.

FIG. 37 is a view of a configuration of a rear projector 60 according to Embodiment 8 of the present invention. The rear projector 60 is provided with a video projector 61 in which a zoom lens or a wide angle lens according to any one of Embodiments 1 to 5 is used, a mirror 62 for bending light, a transmissive-type screen 63, and a casing 64.

The image projected from the video projector 60 is reflected by the mirror 62, and the image is formed on the transmissive-type screen 63. When a zoom lens according to any one of Embodiments 1 to 3 is used in the video projector 60, it is possible to realize a high definition rear projector. When the wide angle lens according to Embodiment 4 is used, it is possible to realize a compact high definition rear projector, and when the wide angle lens according to Embodiment 5 is used, it is possible to make a compact rear projector.

EMBODIMENT 9

Figure 38:
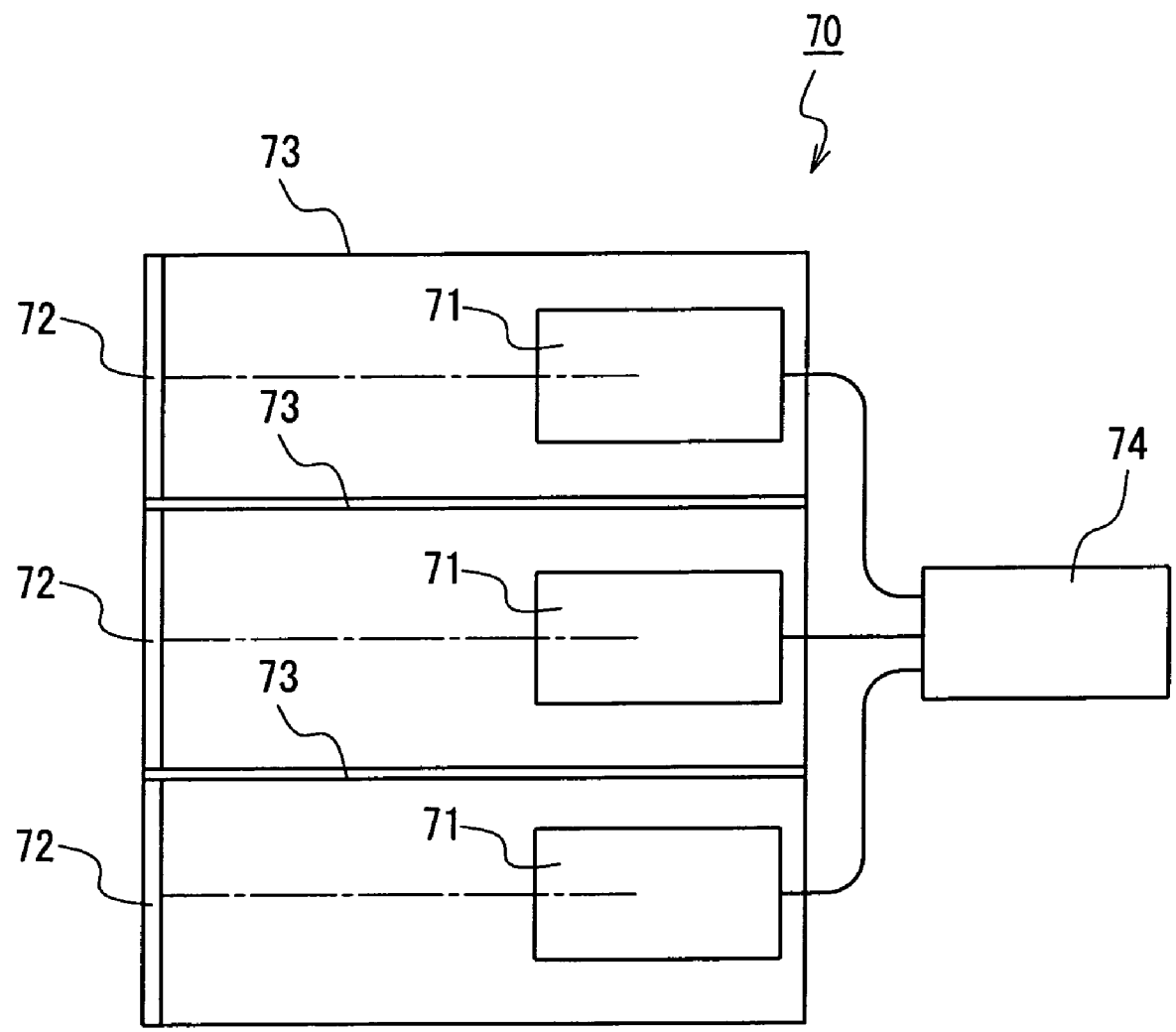
FIG. 38 is a view of the configuration of a multivision system according to Embodiment 9 of the present invention.

FIG. 38 is a view of the configuration of a multivision system 70 according to Embodiment 9 of the present invention. The multivision system 70 shown in the diagram is provided with video projectors 71, in which a zoom lens or wide angle lens according to any one of Embodiments 1 to 5 is used, transmissive-type screens 72, casings 73, and an image separation circuit 74 for separating an image.

An image signal is processed and separated by the image separation circuit 74, and sent to a plurality of the video projectors 71. The image that is projected from the video projectors 71 is formed on the transmissive-type screen 72. With the present embodiment, when a zoom lens according to any one of Embodiments 1 to 3 is used in the video projectors 71, it is possible to realize a multivision system in which the joins between the images are smooth, and which presents no unpleasant offset. When the zoom lens of Embodiment 4 is used, it is possible to realize a multivision system in which the joins between the images are smooth, in which there is no unpleasant offset and that is compact. When the wide angle lens of Embodiment 5 is used, it is possible to realize a compact rear projector.

It should be noted that Embodiments 6 to 9 have been described with examples in which a zoom lens or a wide angle lens according to any one of Embodiments 1 to 5 is used in the video projecting/enlarging system and the like, however, they may also be used in optical devices such as video cameras, film cameras and digital cameras that form image information on image-taking means such as film and CCDs.

INDUSTRIAL APPLICABILITY

According to the invention as described above, since the present invention has a lens that has positive refractive power on the side of the second lens group, which has negative refractive power, that has the longer conjugate distance, it is possible to suppress distortion aberration to a small value. Thus, by using the zoom lens according to the present invention, it is possible to realize a bright, high definition video enlarging/projecting system, video projector, rear projector and multivision system.

The invention claimed is:

1. A zoom lens comprising at least three lens groups that are arranged in order of a first lens group that has positive refractive power, and a second lens group that has negative refractive power, as seen from the side having the longer conjugate distance;

wherein the first lens of the lenses of the second lens group as seen from the side having the longer conjugate distance has positive refractive power;

wherein the arrangement of the refractive power of the lenses of the second lens group is one of: (a) positive, negative, negative, positive, negative or (b) positive, negative, negative, negative, positive, negative, as seen from the side having the longer conjugate distance; and wherein the zoom lens does not have a joined surface.

2. The zoom lens according to claim 1, wherein the following relationship is satisfied:

$$-0.6 < f2g/f2\text{top} < -0.15$$

where f2top is the focal length of a first lens, as seen from the side having the longer conjugate distance, of the lenses of the second lens group, and where f2g is the focal length of the second lens group.

3. The zoom lens according to claim 1, wherein the following relationship is satisfied:

$$0.25 < f\text{rear}/f2\text{top} < 0.95$$

where f2top is the focal length of a first lens, as seen from the side having the longer conjugate distance, of the lenses of the second lens group, and where frear is the focal length of the lens group on the side having the shorter conjugate distance, with respect to an aperture stop.

4. The zoom lens according to claim 1, wherein the front lens, as seen from the side having the longer conjugate distance, is a negative lens, and wherein the following relationships are satisfied:

$$-0.018 < (1/f1/abe1)/(1/f\text{rear}) < 0$$

$$1.7 < nd11 < 1.79$$

where f1 is the focal length of the negative lens, where abe1 is the Abbe number and where nd11 is the refractive index at the d line, and where frear is the focal length of the lens group on the side having the shorter conjugate distance, with respect to an aperture stop.

5. The zoom lens according to claim 1, wherein four lenses, as seen from the side having the shorter conjugate distance. comprises:

from the side having the longer conjugate distance, a negative meniscus lens whose convex surface faces the side having the longer conjugate distance, a positive lens, a negative meniscus lens whose convex surface faces the side having the shorter conjugate distance and a positive lens, wherein the following relationships are satisfied:

$$nd4 > 1.75$$

$$vd4 > 40$$

$$1 < f4r/bfw < 4$$

where nd4 is the refractive index at the d line of the negative meniscus lens that is on the side having the longer conjugate distance, where vd4 is the Abbe number, where f4r is the focal length of the four lenses and where bfw is the air equivalent back focus that does not include a prism and a cover glass when at the wide angle end.

6. The zoom lens according to claim 1,
wherein the first lens group that has positive refractive power, the second lens group that has a negative refractive index and the third lens group that has a positive refractive index, are arranged in that order from the side having the longer conjugate distance;
wherein when changing magnification from the wide angle end to the telephoto end, the first lens group, the second lens group and the third lens group move along the optical axis;
wherein the first lens group moves monotonically toward the side having the longer conjugate distance, the second lens group moves monotonically toward the side having the shorter conjugate distance and the third lens group moves monotonically toward the side having the longer conjugate distance; and
wherein the following relationship is satisfied:

$$1.6 < bfw/fw < 2.4$$

where bfw is the air equivalent back focus of the zoom lens at the wide angle end when at infinity and where fw is the focal length of the zoom lens at the wide angle end.

7. The zoom lens according to claim 6,
wherein the following relationships are satisfied:

$$0.05 < fw/f1g < 0.2$$

$$-0.9 < fw/f2g < -0.6$$

$$0.5 < fw/f3g < 0.7$$

where f1g is the focal length of the first lens group, where f2g is the focal length of the second lens group, where f3g is the focal length of the third lens group, and where fw is the focal length of the zoom lens at the wide angle end.

8. The zoom lens according to claim 1,
wherein the first lens group that has positive refractive power, the second lens group that has a negative refractive index and the third lens group that has a positive refractive index, are arranged in that order from the side having the longer conjugate distance;
wherein when changing magnification from the wide angle end to the telephoto end, the first lens group, the second lens group and the third lens group move along the optical axis;
wherein the first lens group moves monotonically toward the side having the longer conjugate distance, the second lens group moves monotonically toward the side having the shorter conjugate distance and the third lens group moves monotonically toward the side having the longer conjugate distance; and
wherein the following relationship is satisfied:

$$1 < bfw/fw < 1.8$$

where bfw is the air equivalent back focus of the zoom lens at the wide angle end when at infinity and where fw is the focal length of the zoom lens at the wide angle end.

9. The zoom lens according to claim 8,
wherein the following relationships are satisfied:

$$0.3 < fw/f1g < 0.4$$

$$-1.6 < fw/f2g < 1.3$$

$$0.7 < fw/f3g < 0.9$$

where f1g is the focal length of the first lens group, where f2g is the focal length of the second lens group, where f3g is the focal length of the third lens group, and where fw is the focal length of the zoom lens at the wide angle end.

10. The zoom lens according to claim 1, comprising the first lens group that has positive refractive power, the second lens group that has a negative refractive index and a third lens group that has a positive refractive index, arranged in that order from the side having the longer conjugate distance;
wherein when changing magnification from the wide angle end to the telephoto end, the first lens group, the second lens group and the third lens group move along the optical axis;
wherein the first lens group moves monotonically toward the side having the longer conjugate distance, the second lens group moves monotonically toward the side having the shorter conjugate distance and the third lens group moves monotonically toward the side having the longer conjugate distance; and
wherein the following relationship is satisfied:

$$0.5 < bfw/fw < 1.3$$

where bfw is the air equivalent back focus of the zoom lens at the wide angle end when at infinity and where fw is the focal length of the zoom lens at the wide angle end.

11. The zoom lens according to claim 10,
wherein the following relationships are satisfied:

$$0.45 < fw/f1g < 0.6$$

$$-2.0 < fw/f2g < -1.6$$

$$0.9 < fw/f3g < 1.3$$

where f1g is the focal length of the first lens group, where f2g is the focal length of the second lens group, where f3g is the focal length of the third lens group, and where fw is the focal length of the zoom lens at the wide angle end.

12. The zoom lens according to claim 1,
wherein the Abbe number of all lenses having positive refractive power that are arranged on the side having the shorter conjugate distance with respect to an aperture stop is at least 80.

13. The zoom lens according to claim 1,
wherein the Abbe number of all lenses having negative refractive power that are arranged on the side having the shorter conjugate distance with respect to an aperture stop is at least 35.

14. The zoom lens according to claim 1,
wherein the first lens group that has positive refractive power, the second lens group that has a negative refractive index and the third lens group that has a positive refractive index, arranged in that order from the side having the longer conjugate distance;

wherein when changing magnification from the wide angle end to the telephoto end, the first lens group, the second lens group and the third lens group move along the optical axis;

wherein the first lens group moves monotonically toward the side having the longer conjugate distance, the second lens group moves monotonically toward the side having the shorter conjugate distance and the third lens group moves monotonically toward the side having the longer conjugate distance and an aperture stop moves in conjunction with the third lens group; and wherein the following relationship is satisfied:

$$|(DG1-DG3)/fw|<0.15$$

where DG1 is the amount that the first lens group moves from the wide angle end to the telephoto end, where DG3 is the amount that the third lens group moves from the wide angle end to the telephoto end and where fw is the focal length of the zoom lens at the wide angle end.

15. The zoom lens according to claim 1, wherein the first lens group that has positive refractive power, the second lens group that has a negative refractive index and the third lens group that has a positive refractive index, arranged in that order from the side having the longer conjugate distance;

wherein when changing magnification from the wide angle end to the telephoto end, the first lens group is fixed, and the second lens group and the third lens group move along the optical axis;

wherein the second lens group moves monotonically toward the side having the shorter conjugate distance and the third lens group moves monotonically toward the side having the longer conjugate distance and an aperture stop moves in conjunction with the third lens group; and wherein the following relationship is satisfied:

$$|DG3/fw|<0.15$$

where DG3 is the amount that the third lens group moves from the wide angle end to the telephoto end and where fw is the focal length of the zoom lens at the wide angle end.

16. The zoom lens according to claim 1,
wherein the zoom lens is a projecting lens for a projector.

17. The zoom lens according to claim 1,
wherein the magnification ratio of the entire lens system is used in a range of −0.00058 times to −0.0188 times.

18. The zoom lens according to claim 1,
wherein the F number is 2.5 or 2.4.

19. The zoom lens according to claim 1,
wherein the zoom ratio is 1.5, 1.6 or 1.65.

20. A video enlarging/projecting system comprising:
a projecting lens in which the zoom lens according to claim 1 is used;
a light source, and
a spatial optical modulating element that is illuminated by light irradiated from the light source, and that forms an optical image,
wherein the projecting lens projects the optical image that is formed on the spatial optical modulating element.

21. A video projector comprising:
a projecting lens in which the zoom lens according to claim 1 is used;
a light source;
means for temporally restricting light from the light source to three colors of blue, green and red, and
a spatial optical modulating element that is ilhuninated by light irradiated from the light source, and that forms an optical image that corresponds to three colors of blue, green and red that temporally change.

22. A rear projector comprising:
a video projector according to claim 21,
a mirror that bends light that is projected from a projecting lens, and
a transmissive-type screen for reflecting an image of projected light.

23. A multivision system comprising:
a plurality of systems comprising:
a video projector according to claim 21,
a transmissive-type screen for reflecting an image of projected light, and
a casing; and further comprising
an image separating circuit for separating images.

* * * * *